US012812601B2

(12) United States Patent
Shibaike et al.

(10) Patent No.: US 12,812,601 B2
(45) Date of Patent: Nov. 24, 2026

(54) TERMINAL AND COMMUNICATION METHOD

(71) Applicant: Panasonic Intellectual Property Corporation of America, Torrance, CA (US)

(72) Inventors: Naoya Shibaike, Kanagawa (JP); Hidetoshi Suzuki, Kanagawa (JP); Ayako Horiuchi, Kanagawa (JP); Yang Kang, Singapore (SG); Akihiko Nishio, Osaka (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 557 days.

(21) Appl. No.: 17/765,793

(22) PCT Filed: Jul. 15, 2020

(86) PCT No.: PCT/JP2020/027572

§ 371 (c)(1),
(2) Date: Mar. 31, 2022

(87) PCT Pub. No.: WO2021/065153

PCT Pub. Date: Apr. 8, 2021

(65) Prior Publication Data

US 2022/0369291 A1 Nov. 17, 2022

(30) Foreign Application Priority Data

Oct. 4, 2019 (JP) ................................. 2019-184039

(51) Int. Cl.
*H04W 72/02* (2009.01)
*H04W 28/26* (2009.01)
(Continued)

(52) U.S. Cl.
CPC ........... *H04W 72/02* (2013.01); *H04W 28/26* (2013.01); *H04W 72/0446* (2013.01); *H04W 72/20* (2023.01)

(58) Field of Classification Search
CPC ................. H04W 72/02; H04W 28/26; H04W 72/0446; H04W 72/20; H04W 4/40;
(Continued)

(56) References Cited

U.S. PATENT DOCUMENTS

2018/0098322 A1 4/2018 Yoon
2019/0289615 A1* 9/2019 Lee ....................... H04W 36/06
(Continued)

FOREIGN PATENT DOCUMENTS

CN 112436927 A * 3/2021 ............ H04W 72/20
JP 2019-184039 A 10/2019

OTHER PUBLICATIONS

LG Electronics Inc., Smaller periodicity on PC5 based V2V, 3GPP TSG-RAN WG2 #95bis, Kaohsiung, Taiwan, Aug. 22-26, 2016, R2-167030. (Year: 2016).*
(Continued)

*Primary Examiner* — Charles C Jiang
(74) *Attorney, Agent, or Firm* — Seed Intellectual Property Law Group LLP

(57) ABSTRACT

Provided is a terminal comprising: a control circuit that determines first information including a second value that is obtained by dividing an interval of a time resource to be reserved by a first value and second information that represents, when there are a plurality of candidates in the first value and at least one of association with the second value and the first information, one of the at least one candidate; and a transmission circuit that transmits the first information and the second information.

14 Claims, 27 Drawing Sheets

| Resource reservation field in SCI format 1 | Indicated value $X$ | Condition |
|---|---|---|
| '0001', '0010', ···, '0101' | Decimal equivalent of the field | The higher layer decides to keep the resource for the transmission of the next transport block and the value $X$ meets $1<=X<=5$. |
| '0110' | 0.5 | The higher layer decides to keep the resource for the transmission of the next transport block and the value $X$ is 0.5. |
| '0111' | 0.4 | The higher layer decides to keep the resource for the transmission of the next transport block and the value $X$ is 0.4. |
| '1000' | 0.25 | The higher layer decides to keep the resource for the transmission of the next transport block and the value $X$ is 0.25. |
| '1001' | 0.2 | The higher layer decides to keep the resource for the transmission of the next transport block and the value $X$ is 0.2. |
| '1010' | 0.1 | The higher layer decides to keep the resource for the transmission of the next transport block and the value $X$ is 0.2. |
| '1011' | 0.05 | The higher layer decides to keep the resource for the transmission of the next transport block and the value $X$ is 0.05. |
| '0000' | 0 | The higher layer decides not to keep the resource for the transmission of the next transport block. |
| '1100' '1101', '1110', '1111' | Reserved | |

(51) Int. Cl.
*H04W 72/0446* (2023.01)
*H04W 72/20* (2023.01)

(58) Field of Classification Search
CPC .... H04W 76/14; H04W 72/53; H04L 1/1819; H04L 1/1893; H04L 1/1896; H04L 1/1887
See application file for complete search history.

(56) References Cited

U.S. PATENT DOCUMENTS

2020/0229171 A1* 7/2020 Khoryaev ............... H04W 4/40
2020/0288435 A1* 9/2020 Kwak .................. H04L 5/0094
2020/0288471 A1* 9/2020 Yoon ................. H04W 56/0005
2021/0075552 A1* 3/2021 Huang .................. H04L 1/1854

OTHER PUBLICATIONS

3GPP, "3rd Generation Partnership Project; Technical Specification Group Radio Access Network; Evolved Universal Terrestrial Radio Access (E-UTRA); Medium Access Control (MAC) protocol specification (Release 13)," 3GPP TS 36.321 V13.3.0, Sep. 2016. (93 pages).

Extended European Search Report, dated Nov. 10, 2022, for European Patent Application No. 20872907.9. (10 pages).

LG Electronics Inc., "Smaller periodicity on PC5 based V2V," R2-167030, Agenda Item: 8.13.4, 3GPP TSG RAN WG2 #95 bis, Kaohsiung, Taiwan, Aug. 22-26, 2016. (2 pages).

3GPP, "3rd Generation Partnership Project; Technical Specification Group Radio Access Network; NR; NR and NG-RAN Overall Description; Stage 2 (Release 15)," 3GPP TS 38.300 V15.6.0, Jun. 2019, 99 pages.

3GPP, "3rd Generation Partnership Project; Technical Specification Group Radio Access Network; NR; Physical channels and modulation (Release 15)," 3GPP TS 38.211 V15.6.0, Jun. 2019, 97 pages.

3GPP, "3rd Generation Partnership Project; Technical Specification Group Radio Access Network; NR; Study on NR Vehicle-to-Everything (V2X) (Release 16)," 3GPP TR 38.885 V16.0.0, Mar. 2019, 122 pages.

3GPP, "3rd Generation Partnership Project; Technical Specification Group Services and System Aspects; System Architecture for the 5G System; Stage 2 (Release 16)," 3GPP TS 23.501 V16.1.0, Jun. 2019, 368 pages.

International Search Report, mailed Aug. 25, 2020, for International Application No. PCT/JP2020/027572, 6 pages. (with English translation).

Motorola Mobility, "Introduction of V2X," Change Request, R1-1703432, 3GPP TSG-RAN WG1 Meeting #88, Athens Greece, Feb. 13-17, 2017, 38 pages.

* cited by examiner

| Resource reservation field in SCI format 1 | Indicated value *X* | Condition |
|---|---|---|
| '0001', '0010', …, '1010' | Decimal equivalent of the field | The higher layer decides to keep the resource for the transmission of the next transport block and the value *X* meets $1 \leq X \leq 10$. |
| '1011' | 0.5 | The higher layer decides to keep the resource for the transmission of the next transport block and the value *X* is 0.5. |
| '1100' | 0.2 | The higher layer decides to keep the resource for the transmission of the next transport block and the value *X* is 0.2. |
| '0000' | 0 | The higher layer decides not to keep the resource for the transmission of the next transport block. |
| '1101', '1110', '1111' | Reserved | |

FIG. 7

| Resource reservation field in SCI format 1 | Indicated value *X* | Bit"0" W=100 | Bit"1" W=20 |
|---|---|---|---|
| '0001', '0010', ···, '1010' | Decimal equivalent of the field | 100Xms | 20Xms |
| '1011' | 0.5 | 50ms | 10ms |
| '1100' | 0.2 | 20ms | 4ms |
| '0000' | 0 | – | – |
| '1101', '1110', '1111' | Reserved | – | – |

FIG. 12

| Resource reservation field in SCI format 1 | Indicated value *X* | Bit"00" W=100 | Bit"01" W=5 | Bit"10" W=25 | Bit"11" W=40 |
|---|---|---|---|---|---|
| '0001', '0010', ···, '1010' | Decimal equivalent of the field | 100Xms | 5Xms | 25Xms | 40Xms |
| '1011' | 0.5 | 50ms | 2.5ms (2 or 3 ms) | 12.5ms (12 or 13ms) | 20ms |
| '1100' | 0.2 | 20ms | 1ms | 5ms | 8ms |
| '0000' | 0 | – | – | – | – |
| '1101', '1110', '1111' | Reserved | – | – | – | – |

FIG. 13

| Resource reservation field in SCI format 1 | Indicated value *X* | Condition |
|---|---|---|
| '0001', '0010', ···, '0101' | Decimal equivalent of the field | The higher layer decides to keep the resource for the transmission of the next transport block and the value *X* meets 1＜=X＜=5. |
| '0110' | 0.5 | The higher layer decides to keep the resource for the transmission of the next transport block and the value *X* is 0.5. |
| '0111' | 0.4 | The higher layer decides to keep the resource for the transmission of the next transport block and the value *X* is 0.4. |
| '1000' | 0.25 | The higher layer decides to keep the resource for the transmission of the next transport block and the value *X* is 0.25. |
| '1001' | 0.2 | The higher layer decides to keep the resource for the transmission of the next transport block and the value *X* is 0.2. |
| '1010' | 0.1 | The higher layer decides to keep the resource for the transmission of the next transport block and the value *X* is 0.2. |
| '1011' | 0.05 | The higher layer decides to keep the resource for the transmission of the next transport block and the value *X* is 0.05. |
| '0000' | 0 | The higher layer decides not to keep the resource for the transmission of the next transport block. |
| '1100' '1101', '1110', '1111' | Reserved | |

FIG. 14

| | 1st slot | 2nd slot | 3rd slot | 4th slot |
|---|---|---|---|---|
| Pattern A | sub-channel#0 | sub-channel#0,1,2 | sub-channel#0,1,2 | sub-channel#0,1,2 |
| Pattern B | sub-channel#1,2 | sub-channel#1,2 | sub-channel#3,4 | sub-channel#3,4 |
| Pattern C | sub-channel#1 | sub-channel#1,2 | sub-channel#1,2,3,4 | sub-channel#1,2,3,4 |
| Pattern D | sub-channel#1,2,3,4 | sub-channel#1,2,3,4 | sub-channel#1,2,3,4 | sub-channel#1,2,3,4 |

FIG. 27

TERMINAL AND COMMUNICATION METHOD

TECHNICAL FIELD

The present disclosure relates to a terminal and a communication method.

BACKGROUND ART

A communication system called the 5th Generation Mobile Communication System (5G) has been studied. It has been considered for 5G to flexibly provide functions for use cases that require an increase in high-speed communication traffic, an increase in the number of terminals to be connected, high reliability, and/or low latency. The 3rd Generation Partnership Project (3GPP), which is an international standard development organization, has been studying development of communication systems in terms of both enhancement of the Long Term Evolution (LTE) system and New Radio (NR).

3GPP has studied support for vehicle to everything (V2X) in the LTE system, and has been studying the support for V2X also in NR, in which a band broader than in the LTE system is available (see, for example, Non Patent Literature 1).

CITATION LIST

Non Patent Literature

NPL 1
3GPP TR 38.885 V16.0.0, "Study on NR Vehicle-to-Everything (V2X) (Release 16), 2019-03

SUMMARY OF INVENTION

There is scope for further study, however, on a method for improving efficiency of resource allocation (e.g., at least one of a time resource and a frequency resource) in radio communication.

One non-limiting and exemplary embodiment facilitates providing a terminal and a communication method each capable of improving efficiency of resource allocation in radio communication.

A terminal according to an embodiment of the present disclosure includes: control circuitry, which, in operation, determines first information and second information, the first information including a second value obtained by dividing, by a first value, an interval for a time resource to be reserved, the second information indicating one candidate, when a plurality of candidates is present for at least one side of an association between the second value and the first information, and/or the first value, the one candidate being a candidate among the plurality of candidates; and transmission circuitry, which, in operation, transmits the first information and the second information.

It should be noted that general or specific embodiments may be implemented as a system, an apparatus, a method, an integrated circuit, a computer program, a storage medium, or any selective combination thereof.

According to an exemplary embodiment of the present disclosure, it is possible to improve efficiency of resource allocation in radio communication.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF DRAWINGS

FIG. 7 illustrates an exemplary association between Resource reservation and X;

FIG. 12 illustrates an exemplary association among Resource reservation, X, and W in Operation Example 1-1;

FIG. 13 illustrates another exemplary association among Resource reservation, X, and W in Operation Example 1-1;

FIG. 14 illustrates an exemplary association between Resource reservation and X in Operation Example 1-2;

FIG. 27 illustrates pattern examples of a frequency resource in Operation Example 7-4.

DESCRIPTION OF EMBODIMENTS

Hereinafter, embodiments of the present disclosure will be described in detail with reference to the accompanying drawings.

<5G NR System Architecture and Protocol Stack>

3GPP has been working at the next release for the 5th generation cellular technology, simply called 5G, including the development of a new radio access technology (NR) operating in frequencies ranging up to 100 GHz. The first version of the 5G standard was completed at the end of 2017, which allowed proceeding to 5G NR standard-compliant trials and commercial deployments of terminals (e.g., smartphones).

Figure 1:
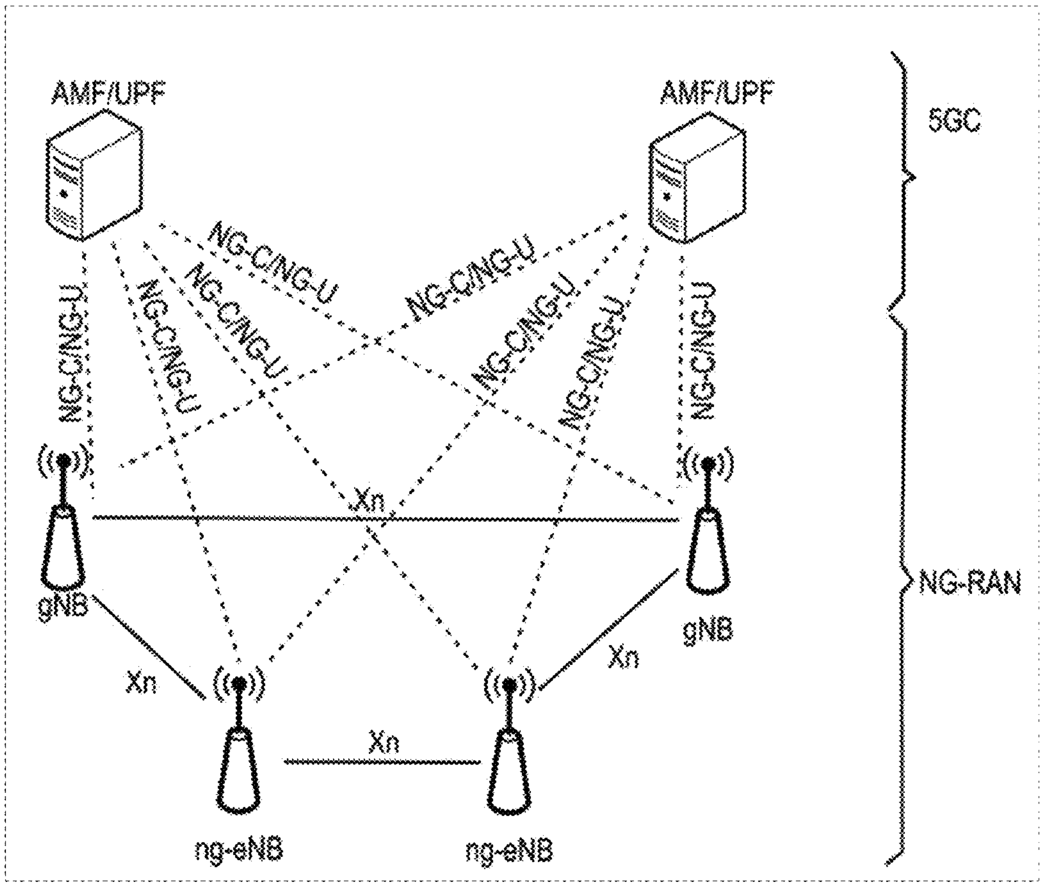
FIG. 1 illustrates an exemplary architecture for a 3GPP NR system.

For example, the overall system architecture assumes an NG-RAN (Next Generation-Radio Access Network) that includes gNBs, providing the NG-radio access user plane (SDAP/PDCP/RLC/MAC/PHY) and control plane (RRC) protocol terminations towards the UE. The gNBs are interconnected with each other by means of the Xn interface. The gNBs are also connected by means of the Next Generation (NG) interface to the NGC (Next Generation Core), more specifically to the AMF (Access and Mobility Management Function) (e.g., a particular core entity performing the AMF) by means of the NG-C interface and to the UPF (User Plane Function) (e.g., a particular core entity performing the UPF) by means of the NG-U interface. The NG-RAN architecture is illustrated in FIG. 1 (see e.g., 3GPP TS 38.300 v15.6.0, section 4).

The user plane protocol stack for NR (see e.g., 3GPP TS 38.300, section 4.4.1) includes the PDCP (Packet Data Convergence Protocol, see section 6.4 of TS 38.300), RLC (Radio Link Control, see section 6.3 of TS 38.300) and MAC (Medium Access Control, see section 6.2 of TS 38.300) sublayers, which are terminated in the gNB on the network side. Additionally, a new Access Stratum (AS) sublayer (SDAP, Service Data Adaptation Protocol) is introduced above the PDCP (see e.g., sub-clause 6.5 of 3GPP TS 38.300). A control plane protocol stack is also defined for NR (see for instance TS 38.300, section 4.4.2). An overview of the Layer 2 functions is given in sub-clause 6 of TS 38.300. The functions of the PDCP, RLC, and MAC sublayers are listed respectively in sections 6.4, 6.3, and 6.2 of TS 38.300. The functions of the RRC layer are listed in sub-clause 7 of TS 38.300.

For instance, the Medium-Access-Control layer handles logical-channel multiplexing, and scheduling and scheduling-related functions, including handling of different numerologies.

The physical layer (PHY) is for example responsible for coding, PHY HARQ processing, modulation, multi-antenna processing, and mapping of the signal to the appropriate physical time-frequency resources. The physical layer also handles mapping of transport channels to physical channels. The physical layer provides services to the MAC layer in the form of transport channels. A physical channel corresponds to the set of time-frequency resources used for transmission of a particular transport channel, and each transport channel is mapped to a corresponding physical channel. Examples of the physical channel include a Physical Random Access Channel (PRACH), a Physical Uplink Shared Channel (PUSCH), and a Physical Uplink Control Channel (PUCCH) as uplink physical channels, and a Physical Downlink Shared Channel (PDSCH), a Physical Downlink Control Channel (PDCCH), and a Physical Broadcast Channel (PBCH) as downlink physical channels.

Use cases/deployment scenarios for NR could include enhanced mobile broadband (eMBB), ultra-reliable low-latency communications (URLLC), and massive machine type communication (mMTC), which have diverse requirements in terms of data rates, latency, and coverage. For example, eMBB is expected to support peak data rates (20 Gbps for downlink and 10 Gbps for uplink) and user-experienced data rates in the order of three times what is offered by IMT-Advanced. On the other hand, in case of URLLC, the tighter requirements are put on ultra-low latency (0.5 ms for UL and DL each for user plane latency) and high reliability ($1-10^{-5}$ within 1 ms). Finally, mMTC may preferably require high connection density (1,000,000 devices/km$^2$ in an urban environment), large coverage in harsh environments, and extremely long-life battery for low cost devices (15 years).

Therefore, the OFDM numerology (e.g., subcarrier spacing, OFDM symbol duration, cyclic prefix (CP) duration, and number of symbols per scheduling interval) that is suitable for one use case might not work well for another. For example, low-latency services may preferably require a shorter symbol duration (and thus larger subcarrier spacing) and/or fewer symbols per scheduling interval (aka, TTI) than an mMTC service. Furthermore, deployment scenarios with large channel delay spreads may preferably require a longer CP duration than scenarios with short delay spreads. The subcarrier spacing should be optimized accordingly to retain the similar CP overhead. NR may support more than one value of subcarrier spacing. Correspondingly, subcarrier spacings of 15 kHz, 30 kHz, and 60 kHz . . . are being considered at the moment. The symbol duration $T_u$ and the subcarrier spacing $\Delta f$ are directly related through the formula $\Delta f=1/T_u$. In a similar manner as in LTE systems, the term "resource element" can be used to denote a minimum resource unit being composed of one subcarrier for the length of one OFDM/SC-FDMA symbol.

In the new radio system 5G-NR for each numerology and carrier a resource grid of subcarriers and OFDM symbols is defined respectively for uplink and downlink. Each element in the resource grid is called a resource element and is identified based on the frequency index in the frequency domain and the symbol position in the time domain (see 3GPP TS 38.211 v15.6.0).

<Functional Split Between NG-RAN and 5GC in 5G NR>

Figure 2:
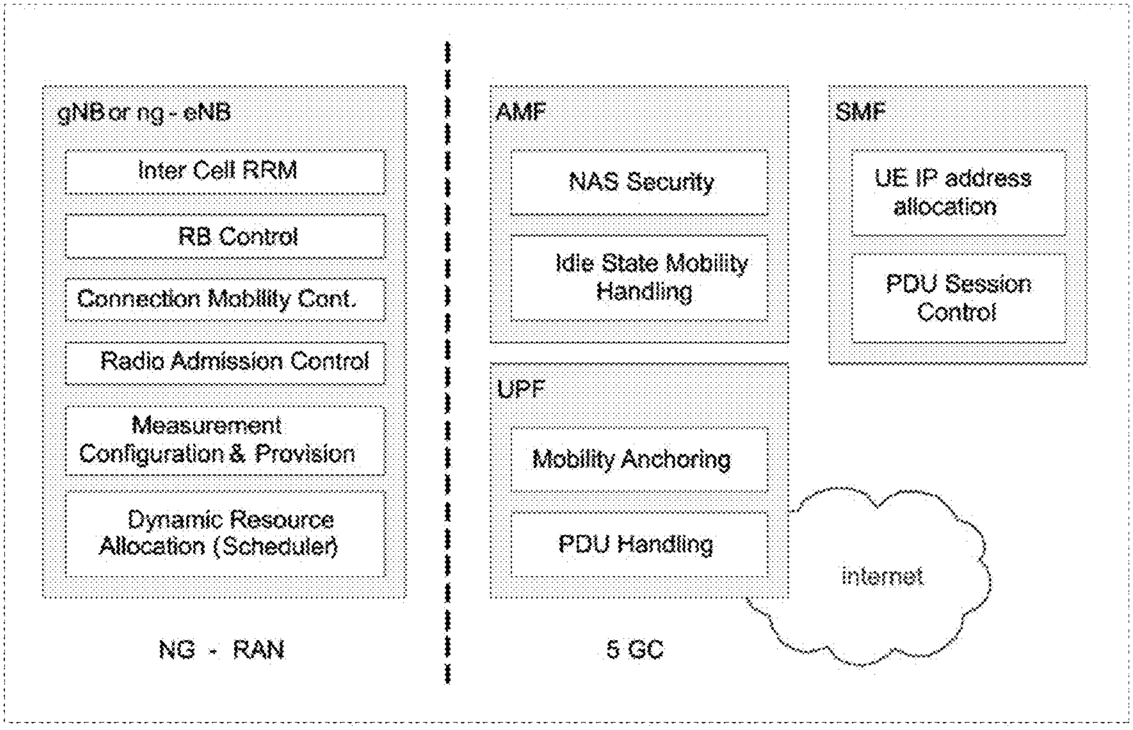
FIG. 2 is a schematic diagram illustrating a functional split between NG-RAN and 5GC.

FIG. 2 illustrates the functional split between the NG-RAN and the 5GC. A logical node of the NG-RAN is gNB or ng-eNB. The 5GC includes logical nodes AMF, UPF, and SMF.

For example, gNB and ng-eNB hosts the following main functions:

- Radio Resource Management functions such as Radio Bearer Control, Radio Admission Control, Connection Mobility Control, and dynamic allocation (scheduling) of both uplink and downlink resources to a UE;
- IP header compression, encryption, and integrity protection of data;
- Selection of an AMF during UE attachment in such a case when no routing to an AMF can be determined from the information provided by the UE;
- Routing user plane data towards the UPF;
- Routing control plane information towards the AMF;
- Connection setup and release;
- Scheduling and transmission of paging messages;
- Scheduling and transmission of system broadcast information (originated from the AMF or an operation management maintenance function (OAM: Operation, Admission, Maintenance));
- Measurement and measurement reporting configuration for mobility and scheduling;
- Transport level packet marking in the uplink;
- Session management;
- Support of network slicing;
- QoS flow management and mapping to data radio bearers;

Support of UEs in the RRC_INACTIVE state;
Distribution function for NAS messages;
Radio access network sharing;
Dual connectivity; and
Tight interworking between NR and E-UTRA.

The Access and Mobility Management Function (AMF) hosts the following main functions:

Function of Non-Access Stratum (NAS) signaling termination;
NAS signaling security;
Access Stratum (AS) security control;
Inter-Core Network (CN) node signaling for mobility between 3GPP access networks;
Idle mode UE reachability (including control and execution of paging retransmission);
Registration area management;
Support of intra-system and inter-system mobility;
Access authentication;
Access authorization including check of roaming rights;
Mobility management control (subscription and policies);
Support of network slicing; and
Session Management Function (SMF) selection.

In addition, the User Plane Function (UPF) hosts the following main functions:

Anchor Point for intra-/inter-RAT mobility (when applicable);
External Protocol Data Unit (PDU) session point for interconnection to a data network;
Packet routing and forwarding;
Packet inspection and a user plane part of Policy rule enforcement;
Traffic usage reporting;
Uplink classifier to support routing traffic flows to a data network;
Branching point to support multi-homed PDU session;
QoS handling for user plane (e.g., packet filtering, gating, UL/DL rate enforcement);
Uplink traffic verification (SDF to QoS flow mapping); and
Function of downlink packet buffering and downlink data indication triggering.

Finally, the Session Management Function (SMF) hosts the following main functions:

Session management;
UE IP address allocation and management;
Selection and control of UPF;
Configuration function for traffic steering at the User Plane Function (UPF) to route traffic to a proper destination;
Control part of policy enforcement and QoS; and
Downlink data indication.

<RRC Connection Setup and Reconfiguration Procedure>

Figure 3:
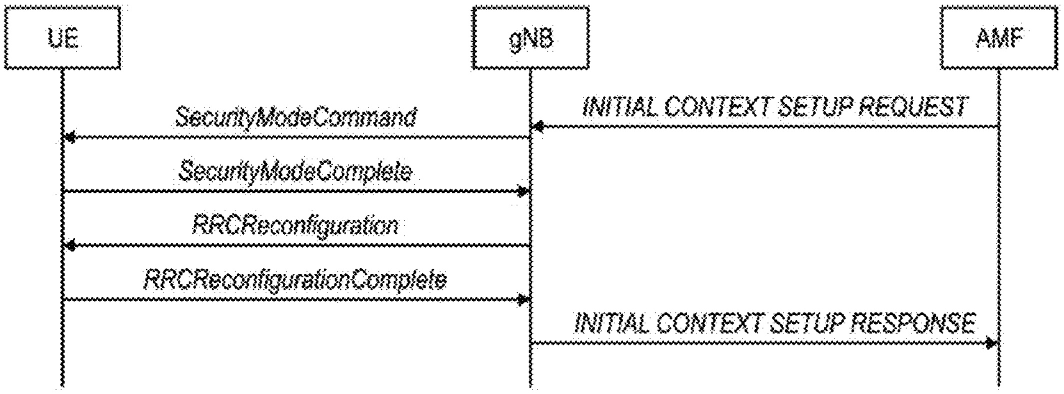
FIG. 3 is a sequence diagram for RRC connection setup/reconfiguration procedures.

FIG. 3 illustrates some interactions between a UE, gNB, and AMF (a 5GC Entity) performed in the context of a transition of the UE from RRC_IDLE to RRC_CONNECTED for the NAS part (see TS 38 300 v15.6.0).

The RRC is higher layer signaling (protocol) used to configure the UE and gNB. With this transition, the AMF prepares UE context data (which includes, for example, a PDU session context, security key, UE Radio Capability, UE Security Capabilities, and the like) and sends it to the gNB with an INITIAL CONTEXT SETUP REQUEST. Then, the gNB activates the AS security with the UE. This activation is performed by the gNB transmitting to the UE a SecurityModeCommand message and by the UE responding to the gNB with the SecurityModeComplete message. Afterwards, the gNB performs the reconfiguration to setup the Signaling Radio Bearer 2, SRB2, and Data Radio Bearer(s), DRB(s) by means of transmitting to the UE the RRCReconfiguration message and, in response, receiving by the gNB the RRCReconfigurationComplete from the UE. For a signaling-only connection, the steps relating to the RRCReconfiguration are skipped since SRB2 and DRBs are not set up. Finally, the gNB informs the AMF that the setup procedure is completed with INITIAL CONTEXT SETUP RESPONSE.

Thus, the present disclosure provides a 5th Generation Core (5GC) entity (e.g., AMF, SMF, or the like) including control circuitry, which, in operation, establishes a Next Generation (NG) connection with a gNodeB, and a transmitter, which, in operation, transmits an initial context setup message to the gNodeB via the NG connection such that a signaling radio bearer between the gNodeB and a User Equipment (UE) is set up. Specifically, the gNodeB transmits Radio Resource Control (RRC) signaling including a resource allocation configuration Information Element (IE) to the UE via the signaling radio bearer. Then, the UE performs an uplink transmission or a downlink reception based on the resource allocation configuration.

<Usage Scenarios of IMT for 2020 and Beyond>

Figure 4:
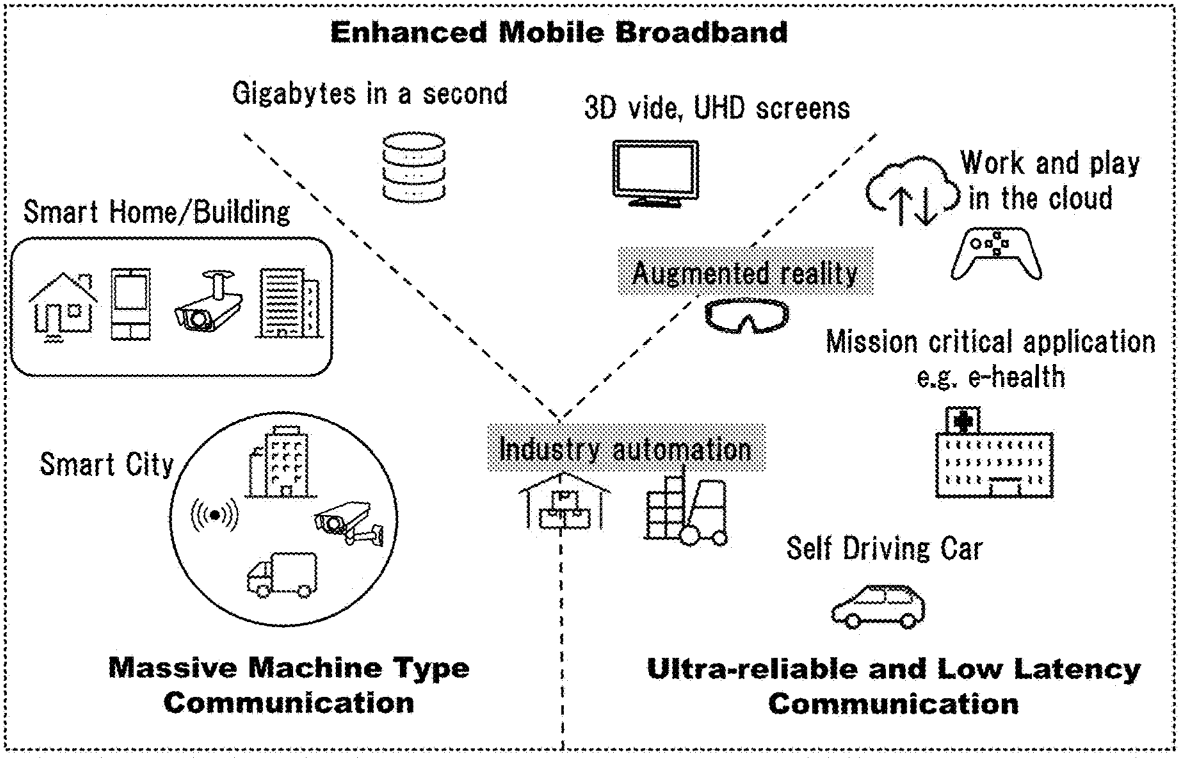
FIG. 4 is a schematic diagram illustrating usage scenarios of enhanced mobile broadband (eMBB), massive machine type communications (mMTC), and ultra reliable and low latency communications (URLLC)

FIG. 4 illustrates some of the use cases for 5G NR. In 3rd generation partnership project new radio (3GPP NR), three use cases are being considered that have been envisaged to support a wide variety of services and applications by IMT-2020. The specification for the phase 1 of enhanced mobile-broadband (eMBB) has been concluded. In addition to further extending the eMBB support, the current and future work would involve the standardization for ultra-reliable and low-latency communications (URLLC) and massive machine-type communications (mMTC). FIG. 4 illustrates some examples of envisioned usage scenarios for IMT for 2020 and beyond (see e.g., ITU-R M.2083 FIG. 2).

The URLLC use case has stringent requirements for capabilities such as throughput, latency and availability. The URLLC use case has been envisioned as one of the enablers for future vertical applications such as wireless control of industrial manufacturing or production processes, remote medical surgery, distribution automation in a smart grid, transportation safety, etc. Ultra-reliability for URLLC is to be supported by identifying the techniques to meet the requirements set by TR 38.913. For NR URLLC in Release 15, key requirements include a target user plane latency of 0.5 ms for UL (uplink) and 0.5 ms for DL (downlink). The general URLLC requirement for one transmission of a packet is a BLER (block error rate) of 1E-5 for a packet size of 32 bytes with a user plane latency of 1 ms.

From the physical layer perspective, reliability can be improved in a number of possible ways. The current scope for improving the reliability involves defining separate CQI tables for URLLC, more compact DCI formats, repetition of PDCCH, etc. However, the scope may widen for achieving ultra-reliability as the NR becomes more stable and developed (for NR URLLC key requirements). Particular use cases of NR URLLC in Rel. 15 include Augmented Reality/Virtual Reality (AR/VR), e-health, e-safety, and mission-critical applications.

Moreover, technology enhancements targeted by NR URLLC aim at latency improvement and reliability improvement. Technology enhancements for latency improvement include configurable numerology, non slot-based scheduling with flexible mapping, grant free (configured grant) uplink, slot-level repetition for data channels, and downlink pre-emption. Pre-emption means that a transmission for which resources have already been allocated is stopped, and the already allocated resources are used for another transmission that has been requested later, but has lower latency/higher priority requirements. Accordingly, the already granted transmission is pre-empted by a later transmission. Pre-emption is applicable independent of the particular service type. For example, a transmission for a service-type A (URLLC) may be pre-empted by a transmission for a service type B (such as eMBB). Technology enhancements with respect to reliability improvement include dedicated CQI/MCS tables for the target BLER of 1E-5.

The use case of mMTC (massive machine type communication) is characterized by a very large number of connected devices typically transmitting a relatively low volume of non-delay sensitive data. Devices are required to be low cost and to have a very long battery life. From NR perspective, utilizing very narrow bandwidth parts is one possible solution to have power saving from UE perspective and enable long battery life.

As mentioned above, it is expected that the scope of reliability in NR becomes wider. One key requirement to all the cases, for example, for URLLC and mMTC, is high reliability or ultra-reliability. Several mechanisms can improve the reliability from radio perspective and network perspective. In general, there are a few key potential areas that can help improve the reliability. Among these areas are compact control channel information, data/control channel repetition, and diversity with respect to frequency, time and/or the spatial domain. These areas are applicable to reliability improvement in general, regardless of particular communication scenarios.

For NR URLLC, further use cases with tighter requirements have been identified such as factory automation, transport industry and electrical power distribution. The tighter requirements are higher reliability (up to $10^{-6}$ level), higher availability, packet sizes of up to 256 bytes, time synchronization down to the order of a few µs where the value can be one or a few µs depending on frequency range and short latency in the order of 0.5 to 1 ms in particular a target user plane latency of 0.5 ms, depending on the use cases.

Moreover, for NR URLLC, several technology enhancements from physical layer perspective have been identified. Among these are PDCCH (Physical Downlink Control Channel) enhancements related to compact DCI, PDCCH repetition, increased PDCCH monitoring. Moreover, UCI (Uplink Control Information) enhancements are related to enhanced HARQ (Hybrid Automatic Repeat Request) and CSI feedback enhancements. Also PUSCH enhancements related to mini-slot level hopping and retransmission/repetition enhancements are possible. The term "mini-slot" refers to a Transmission Time Interval (TTI) including a smaller number of symbols than a slot (a slot comprising fourteen symbols).

<QoS Control>

The 5G QoS (Quality of Service) model is based on QoS flows and supports both QoS flows that require guaranteed flow bit rate (GBR QoS flows) and QoS flows that do not require guaranteed flow bit rate (non-GBR QoS Flows). At NAS level, the QoS flow is thus the finest granularity of QoS differentiation in a PDU session. A QoS flow is identified within a PDU session by a QoS flow ID (QFI) carried in an encapsulation header over NG-U interface.

For each UE, 5GC establishes one or more PDU Sessions. For each UE, the NG-RAN establishes at least one Data Radio Bearer (DRB) together with the PDU Session, e.g., as illustrated above with reference to FIG. 3. Further, additional DRB(s) for QoS flow(s) of that PDU session can be subsequently configured (it is up to NG-RAN when to do so). The NG-RAN maps packets belonging to different PDU sessions to different DRBs. NAS level packet filters in the UE and in the 5GC associate UL and DL packets with QoS Flows, whereas AS-level mapping rules in the UE and in the NG-RAN associate UL and DL QoS Flows with DRBs.

Figure 5:
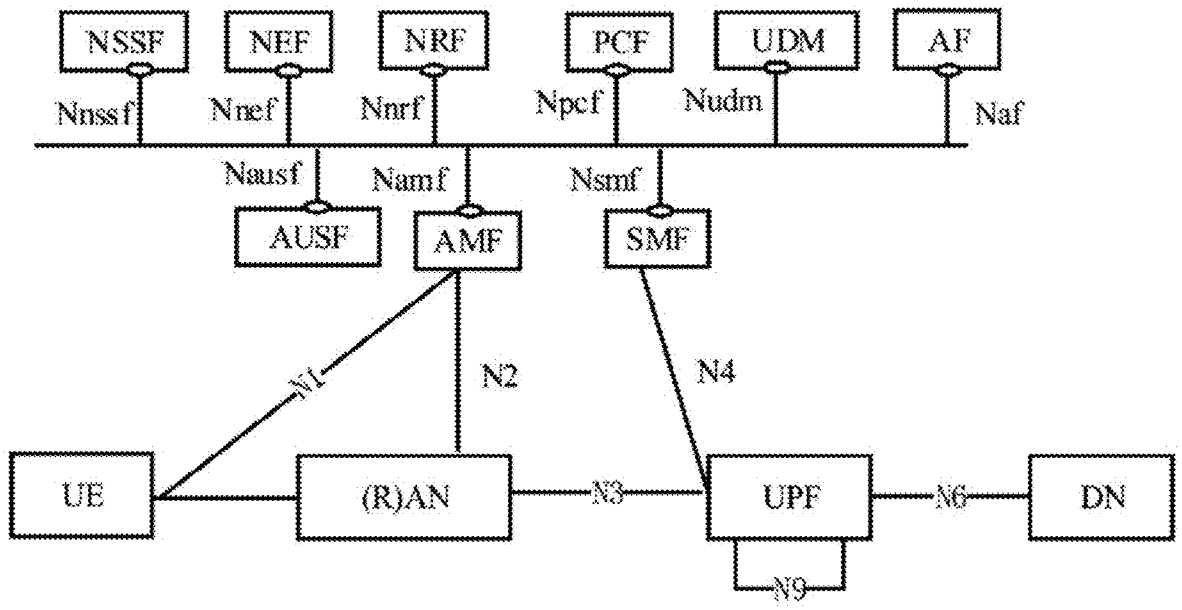
FIG. 5 is a block diagram illustrating an exemplary 5G system architecture for non-roaming scenarios.

FIG. 5 illustrates a 5G NR non-roaming reference architecture (see TS 23.501 v16.1.0, section 4.23). An Application Function (AF), e.g., an external application server hosting 5G services, exemplarily described in FIG. 4, interacts with the 3GPP Core Network in order to provide services, for example to support application influence on traffic routing, accessing Network Exposure Function (NEF) or interacting with the Policy framework for policy control (see Policy Control Function, PCF), e.g., QoS control. Based on operator deployment, Application Functions considered to be trusted by the operator can be allowed to interact directly with relevant Network Functions. Application Functions not allowed by the operator to access directly the Network Functions use the external exposure framework via the NEF to interact with relevant Network Functions.

FIG. 5 illustrates further functional units of the 5G architecture, namely Network Slice Selection Function (NSSF), Network Repository Function (NRF), Unified Data Management (UDM), Authentication Server Function (AUSF), Access and Mobility Management Function (AMF), Session Management Function (SMF), and Data Network (DN), e.g., operator services, Internet access or 3rd party services. All of or a part of the core network functions and the application services may be deployed and running on cloud computing environments.

In the present disclosure, thus, an application server (for example, AF of the 5G architecture), is provided that includes: a transmitter, which, in operation, transmits a request containing a QoS requirement for at least one of URLLC, eMMB and mMTC services to at least one of functions (for example NEF, AMF, SMF, PCF, UPF, etc.) of the 5GC to establish a PDU session including a radio bearer between a gNodeB and a UE in accordance with the QoS requirement; and control circuitry, which, in operation, performs the services using the established PDU session.

[V2X]

Vehicle to Vehicle (V2V), Vehicle to Infrastructure (V2I), Vehicle to Pedestrian (V2P), or Vehicle to Network (V2N) communication is assumed as V2X, for example.

In the V2V, V2I, or V2P, for example, terminals (or also referred to as user equipment (UE)) can perform direct transmission and reception with each other using a link called "sidelink (SL)" or "PC5" without a network with a base station (BS: also referred to as gNB in NR and eNB in LTE). Further, communication through a link between a base station and a terminal (e.g., referred to as "Uu"), for example, is assumed in the V2N.

A resource used in the sidelink is configured depending on a SL Band width part (BWP) and a resource pool.

The SL BWP is, for example, a frequency band available to a terminal for the sidelink. The SL BWP may be configured separately from a Downlink (DL) BWP and an Uplink (UL) BWP, for example, which are configured for a link (e.g., Uu link) between a base station and a terminal. Note that, the frequency bands possibly overlap with each other between the SL BWP and the UL BWP.

The resource pool includes, for example, a resource in the frequency domain (e.g., also referred to as frequency direction or frequency axis) and time domain (e.g., also referred to as time direction or time axis) specified in a resource of the SL BWP. For example, a plurality of resource pools may be configured to a single terminal.

[Sidelink in NR]

For NR V2X, studies have been conducted on supporting, for example, unicast, groupcast, and broadcast in sidelink transmission and reception.

In unicast, one-to-one transmission from a transmitter terminal (e.g., also called transmitter UE or Tx UE) to a receiver terminal (e.g., receiver UE or Rx UE) is assumed, for example. In groupcast, transmission from a transmitter terminal to a plurality of receiver terminals included in a certain group is assumed, for example. In broadcast, transmission from a transmitter terminal without specifying a receiver terminal is assumed, for example.

Further, studies have been carried out on configuring, for example, the following channels for NR sidelink.

<Physical SL Control Channel: PSCCH>

In PSCCH, a control signal called sidelink control information (SCI) is transmitted and received, for example. The SCI includes, for example, information on transmission and reception of a data signal (e.g., physical SL shared channel (PSSCH)) such as resource allocation information for PSSCH.

In addition, the SCI may include, for example, information (e.g., Layer 1 source ID) on a transmitter terminal (i.e., transmission source terminal) and information (e.g., Layer 1 destination ID) on a receiver terminal (i.e., transmission destination terminal). Such information specifies the transmitter terminal and the receiver terminal.

<PSSCH>

In PSSCH, a data signal is transmitted and received, for example.

<Physical SL Feedback Channel: PSFCH>

In PSFCH, a feedback signal (e.g., hybrid automatic repeat request (HARQ) feedback) for PSSCH (e.g., data signal) is transmitted and received, for example. The feedback signal may include, for example, a response signal indicating ACK or NACK (e.g., also referred to as ACK/NACK information or HARQ-ACK). The feedback signal is considered to be applied, for example, to a case where PSSCH is transmitted and received in unicast and groupcast. The ACK and NACK may be respectively referred to as HARQ-ACK and HARQ-NACK, for example.

<Physical SL Broadcast Channel: PSBCH>

In PSBCH, a broadcast signal is transmitted and received.

[Communication Mode of Sidelink]

Sidelink communication includes, for example, two modes (e.g., Mode 1 and Mode 2).

In Mode 1, a base station determines (i.e., schedules) a resource that a terminal uses for sidelink (referred to as an SL resource, for example).

In Mode 2, a terminal determines the SL resource from resources in a resource pool configured in advance. In other words, a base station does not schedule the SL resource in Mode 2.

Mode 1 is intended to be used, for example, in an environment where the base station and the terminal are connected and the terminal performing sidelink communication can receive an indication from the base station. In Mode 2, for example, the terminal can perform transmission without an indication from the base station, so that the sidelink communication is possible with a terminal under a different operator or a terminal outside coverage.

Sidelink has been Described, Thus Far.

For example, periodic transmission of a signal in the time domain is assumed in the V2X of LTE. From this assumption, for example, in addition to a time resource (e.g., slot) for a signal indicated by the SCI, a time resource located rearward of this time resource may be reserved for a terminal. The SCI indicating the resource to be reserved for terminal (i.e., allocated resource) can be received in another terminal in addition to an allocation target terminal (i.e., transmission destination terminal of the SCI), for example. In other words, the resource reserved by the SCI can be detected in another terminal different from the allocation target terminal. Each terminal can reduce the collision-probability of resources by, for example, avoiding use of the resource reserved for the other terminal in selecting a resource to be used.

For example, a format of the SCI (e.g., "SCI format 1"), which is a control signal transmitted in PSCCH, includes the following information.

"Priority" (e.g., 3 Bits):

"Priority" is information indicating the priority of a Transport Block (TB) transmitted in PSSCH.

"Resource Reservation" (e.g., 4 Bits):

"Resource reservation" is information indicating a time interval between the TB included in PSCCH transmitted in the same slot as PSCCH where the SCI is mapped and PSSCH including a subsequent TB. For example, "Resource reservation" is information indicating an interval between resources respectively corresponding to the current TB and the subsequent TB (i.e., interval between TBs (may be also referred to as "inter-TB interval")).

"Frequency Resource Location of Initial Transmission and Retransmission:"

"Frequency resource location of initial transmission and retransmission" is information for allocating a resource in the frequency domain in units of sub-channels. For example, use of a frequency resource indicated in this information may be assumed for a terminal, in both of a slot where the SCI is mapped and a reserved slot located rearward of this slot. Incidentally, in the frequency domain, contiguous sub-channels may be mapped. The number of bits of "Frequency resource location of initial transmission and retransmission" is, for example, expressed as follows.

[1]

$$\left\lceil \log_2\left(N^{SL}_{subchannel}\left(N^{SL}_{subchannel}+1\right)/2\right)\right\rceil_{bits} \quad \text{(Expression 1)}$$

Provided that, $N_{subchannel}^{SL}$ indicates, for example, the sum of the number of sub-channels in a resource pool.

"Time Gap Between Initial Transmission and Retransmission" (e.g. 4 Bits):

"Time gap between initial transmission and retransmission" is information indicating a time interval (e.g., also referred to as a gap) between initial transmission and retransmission of the same TB.

"Modulation and Coding Scheme" (e.g. 5 Bits):

"Modulation and coding scheme" is information indicating a modulation and coding scheme (MCS).

"Retransmission Index" (e.g. 1 Bit):

"Retransmission index" is information indicating whether it is the initial transmission or the retransmission.

In LTE, resources of a plurality of TBs are allocated (i.e., reserved) based on, for example, the information on the SCI described above. In one example, in LTE, the resources of four slots may be reserved: transmission of TB (e.g., initial transmission) in the slot where the SCI is mapped; retransmission of the TB; transmission of a subsequent TB different from the TB (e.g., initial transmission); and retransmission of the subsequent TB.

The information included in SCI format 1 has been described above.

Figure 6:
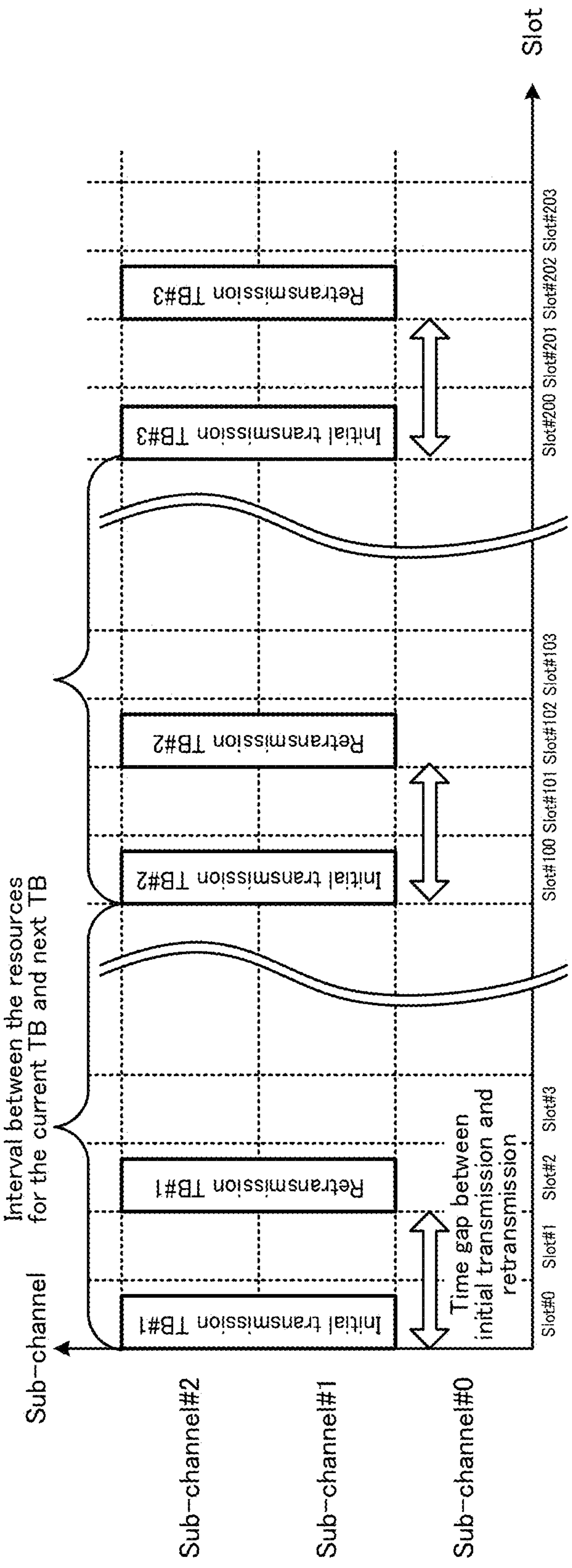
FIG. 6 illustrates an example of resource allocation.

FIG. 6 illustrates an example of resource allocation using the SCI.

In FIG. 6, by way of example, a time resource corresponding to 1 ms is referred to as a "slot," but units of time resources corresponding to 1 ms are not limited to the slot. For example, in LTE, the time resource corresponding to 1 ms is called a "subframe."

In FIG. 6, by way of example, sub-channels #1 and #2 are mapped to the terminal in the frequency domain. The sub-channel(s) may be indicated to terminal by, for example, "Frequency resource location of initial transmission and retransmission." Further, for the terminal, the initial transmission of TB #1 in the time domain is assigned to slot #0.

Further, in FIG. 6, by way of example, an inter-TB interval indicated by "Resource reservation" in the SCI that indicates slot #0 assigned for the initial transmission of TB #1 is set to 100 ms (e.g., time interval of 100 slots). In addition, in FIG. 6, by way of example, a time interval (or gap) between the initial transmission and the retransmission indicated by "Time gap between initial transmission and retransmission" in the SCI that indicates slot #0 assigned for the initial transmission of TB #1 is set to 2 ms (e.g., time interval of two slots).

In the resource allocation in the time domain illustrated in FIG. 6, slots having an interval of 100 ms starting from slot #0 (e.g., slot #0, slot #100, slot #200, and so forth) and slots having an interval of 100 ms starting from slot #2 (e.g., slot #2, slot #102, slot #202, and so forth) are reserved for the terminal based on, for example, the information included in the SCI transmitted in slot #0. Further, in the resource allocation in the frequency domain illustrated in FIG. 6, sub-channels #1 and #2 for each of the reserved slots are reserved for the terminal based on, for example, the above information included in the SCI.

In addition, in FIG. 6, for example, a terminal may fail to receive the SCI transmitted in slot #0 and may successfully receive the SCI transmitted in slot #2. In this case, for example, "Retransmission index" included in the SCI transmitted in slot #2 indicates, to the terminal, that the TB transmitted in slot #2 is a retransmitted TB, and "Time gap between initial transmission and retransmission" also included in the SCI indicates, to the terminal, the time interval between the initial transmission and the retransmission (e.g., time interval of 2 ms or two slots). For example, based on these indications, the terminal can identify (i.e., recognize or determine) the time resource allocated for the initial transmission of the TB as slot #0 in which reception of the SCI has failed. Thus, even when the terminal fails to receive the SCI, the slot with a period of 100 ms starting from slot #0 and the slot with a period of 100 ms starting from slot #2, and sub-channels #1 and #2 for each of these slots are reserved for the terminal.

LTE V2X has been Described, Thus Far.

However, a method for reserving (or allocating) resources in NR V2X sidelink has not been fully discussed. Accordingly, an embodiment of the present disclosure will describe a method for improving the efficiency of resource allocation (or resource reservation) in sidelink communication, the resource including a time resource (e.g., interval or gap) or a frequency resource (e.g., sub-channel).

Embodiment 1

In the present embodiment, a configuration method of a time resource in sidelink communication will be described.

In LTE, when "Resource reservation" is indicated to a terminal (e.g., a receiver terminal) by the SCI, the terminal determines an inter-TB interval, referring to, for example, an association, which is illustrated in FIG. 7, between "Resource reservation" and value "X" relating to the inter-TB interval (the association may be represented in, e.g., a table). For example, the value "X" illustrated in FIG. 7 is a value obtained by dividing the inter-TB interval by 100. The association between "Resource reservation" and "X" illustrated in FIG. 7 may be indicated (or configured) from a base station to each terminal by, for example, a higher layer.

In one example, the terminal may configure an interval of X×100 ms with 20 ms, 50 ms or 100X ms (X times 100, where X is an integer from 1 to 10), referring to the association illustrated in FIG. 7. In LTE (e.g., FIG. 7), among the intervals configured to the terminal, 20 ms (X=0.2) is the shortest interval, and 1000 ms (X=10) is the longest interval.

Meanwhile, in NR, it is required to support more various traffic types than in LTE. Hence, in NR, for example, it may be assumed that an interval similar to the interval that can be configured in LTE (e.g., FIG. 7) is insufficient. For example, in NR, an interval is possibly configured which is shorter than the shortest interval=20 ms configurable in LTE (e.g., FIG. 7). Alternatively, in NR, an interval is possibly configured which is longer than the longest interval=1000 ms configurable in LTE (e.g., FIG. 7).

Thus, in an embodiment of the present disclosure, a description will be given of a method for configuring a time resource (e.g., interval) in the sidelink communication more flexibly.

[Overview of Communication System]

A communication system according to the present embodiment includes base station 100 and terminal 200.

Figure 8:
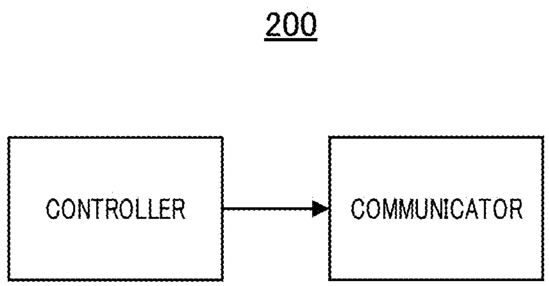
FIG. 8 is a block diagram illustrating a configuration example of part of a terminal.

FIG. 8 is a block diagram illustrating a configuration example of part of terminal 200 according to the present embodiment. In terminal 200 illustrated in FIG. 8, a controller (e.g., corresponding to control circuitry) determines first information including a second value (X) obtained by dividing, by a first value (W), an interval for a time resource to be reserved by a first value (W), and second information indicating one candidate, when a plurality of candidates is present for at least one side of an association between the second value and the first information (e.g., see a table to be described later), and the first value, while the one candidate is among the plurality of candidates for the at least one side. A communicator (e.g., corresponding to communication circuitry) transmits the first information and the second information (e.g., SCI).

Alternatively, in terminal 200 illustrated in FIG. 8, the communicator (e.g., corresponding to reception circuitry) receives first information including a second value (X) obtained by dividing, by a first value (W), an interval for a time resource to be reserved, and second information (e.g., SCI) indicating one candidate, when a plurality of candidates is present for at least one side of an association between the second value and the first information (e.g., see a table to be described later), and the first value (W), while the one candidate is among the plurality of candidates for the at least one side. The controller (e.g., corresponding to control circuitry) determines the interval (e.g., X×W), based on the first information and the second information.

[Configuration of Base Station]

Figure 9:
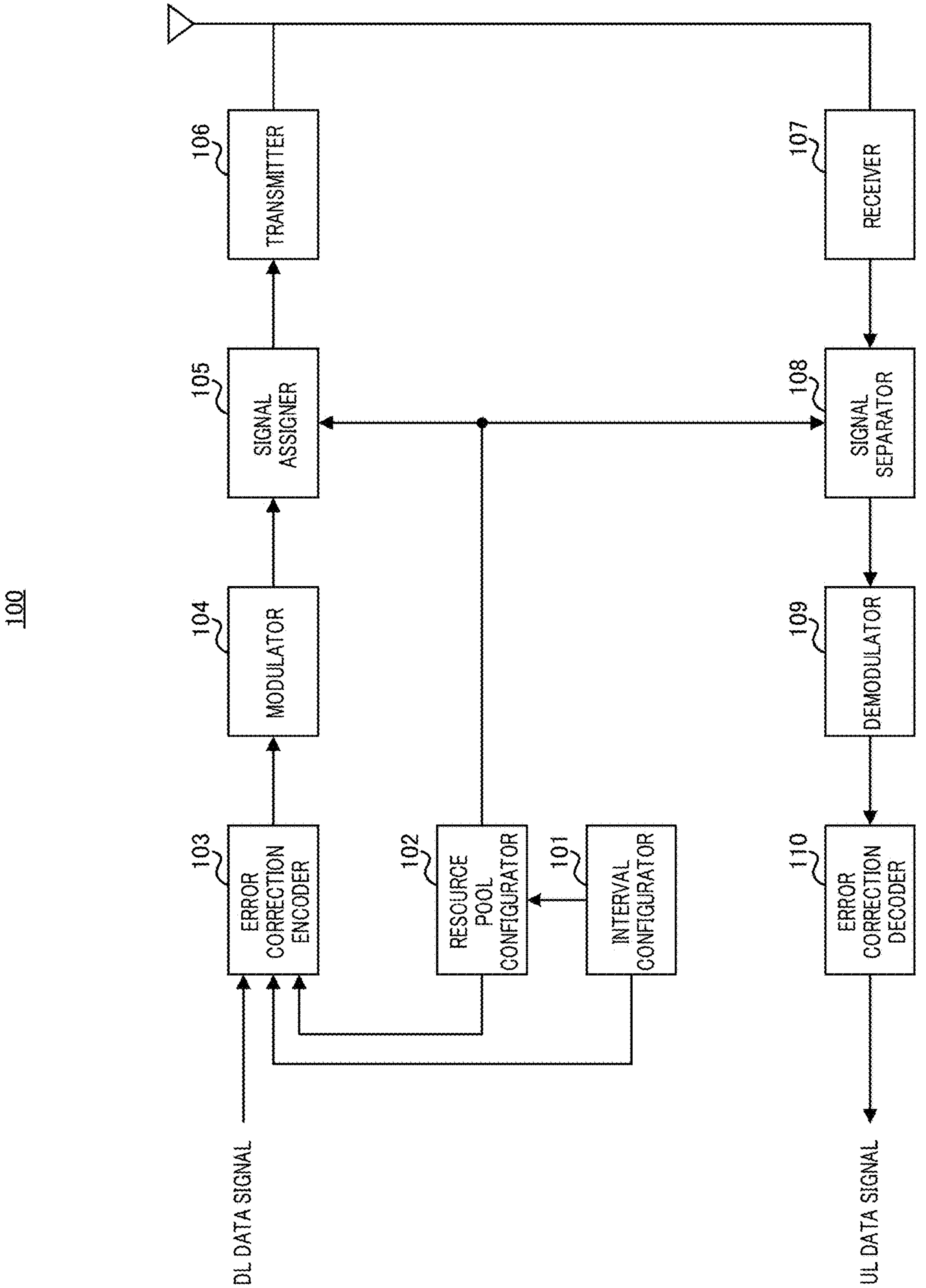
FIG. 9 is a block diagram illustrating a configuration example of a base station.

FIG. 9 is a block diagram illustrating a configuration example of base station 100 according to the present embodiment. In FIG. 9, base station 100 includes interval configurator 101, resource pool configurator 102, error correction encoder 103, modulator 104, signal assigner 105, transmitter 106, receiver 107, signal separator 108, demodulator 109, and error correction decoder 110.

Interval configurator 101 configures a candidate for an interval (i.e., time interval) (hereinafter may be referred to as an "interval candidate") between different TBs (e.g., new TBs). Interval configurator 101 may configure an interval candidate for each resource pool to be allocated to terminal 200, for example. Interval configurator 101 outputs information on the configured interval candidate (hereinafter referred to as "interval-candidate information") to resource pool configurator 102. Interval configurator 101 also outputs higher layer signaling including the interval-candidate information to error correction encoder 103.

Resource pool configurator 102 configures, for each terminal 200, a resource pool to be used for sidelink. For example, resource pool configurator 102 may generate information on the time resource and the frequency resource of the resource pool (hereinafter, referred to as "resource pool-configuration information"), based on the interval-candidate information input from interval configurator 101. Resource pool configurator 102 outputs higher layer signaling including the resource pool-configuration information to error correction encoder 103. Resource pool configurator 102 also outputs the resource pool-configuration information to signal assigner 105 and signal separator 108.

Error correction encoder 103 takes a transmission data signal (DL data signal) and the higher layer signaling input from interval configurator 101 and resource pool configurator 102 as input, performs error correction encoding on the input signal, and outputs the encoded signal to modulator 104.

Modulator 104 performs modulation processing on the signal input from error correction encoder 103 and outputs the modulated data signal to signal assigner 105.

Signal assigner 105 assigns the data signal (e.g., DL data signal or higher layer signaling) input from modulator 104 to, for example, the resource available on a link (e.g., Uu link) between base station 100 and terminal 200. The formed transmission signal is output to transmitter 106.

For example, signal assigner 105 identifies (i.e., recognizes) a slot available for sidelink communication, based on the information input from resource pool configurator 102. In a case where terminal 200 cannot perform transmission and reception at the same time in the link used for DL data (e.g., Uu link) and sidelink, for example, signal assigner 105 may then assign the data signal to a resource not used for sidelink.

Note that, the configuration of the resource pool may be different for each terminal 200. In this case, the slot available on the Uu link is different for each terminal 200.

Transmitter 106 performs radio transmission processing, such as up-conversion, on the signal input from signal assigner 105, and transmits the signal to terminal 200 via an antenna.

Receiver 107 receives the signal transmitted from terminal 200 via the antenna, performs radio reception processing such as down-conversion, and outputs the signal to signal separator 108.

Signal separator 108, for example, identifies the slot available on the Uu link and the slot available for the sidelink communication based on the information input from resource pool configurator 102. Signal separator 108 then separates the signal assigned to the resource available on the Uu link, which is input from receiver 107. Signal separator 108 outputs the separated signal (e.g., UL data signal) to demodulator 109.

Demodulator 109 performs demodulation processing on the signal input from signal separator 108, and outputs the resulting signal to error correction decoder 110.

Error correction decoder 110 decodes the signal input from demodulator 109, and obtains the received data signal (UL data signal) from terminal 200.

Note that, in the example illustrated in FIG. 9, base station 100 includes interval configurator 101 and resource pool configurator 102 and generates the higher layer signaling including the interval-candidate information and the resource pool-configuration information; however, the present disclosure is not limited to this. For example, at least one of the interval-candidate information and the resource pool-configuration information may be configured by an application layer called Pre-configured, for example, or may be configured in a subscriber identity module (SIM) in advance. In this case, base station 100 may use the preliminary configured information without generating the interval-candidate information or the resource pool-configuration information. For example, base station 100 may recognize, based on the preliminary configured resource pool-configuration information, the slot available between base station 100 and terminal 200, and may output information indicating the slot available between base station 100 and terminal 200 to signal assigner 105 and signal separator 108.

Further, the present disclosure is not limited to a case where the configuration of the time resource (e.g., information on the interval) in the sidelink communication is configured (or indicated) from base station 100 to terminal 200 by, for example, the higher layer signaling (e.g., RRC) or the MAC. For example, in a case where the configuration of the time resource in the sidelink communication (e.g., information on the interval) is specified in a specification (or standard), or configured in the SIM or the application layer, terminal 200 is operable without configuration from base station 100.

Further, in one example, when the mode of sidelink communication is "Mode 1," it is assumed that the information included in the SCI transmitted by the terminal in the sidelink is generated by base station 100. Thus, in Mode 1, base station 100 may generate SCI based on, for example, the interval-candidate information and the resource pool-configuration information (the same processing as in SCI generator 210 of terminal 200 described later), and transmit the resulting SCI to terminal 200. Incidentally, the SCI may be included, for example, in the higher layer signaling and/or a physical layer signal (e.g., PDCCH).

[Configuration of Terminal]

Figure 10:
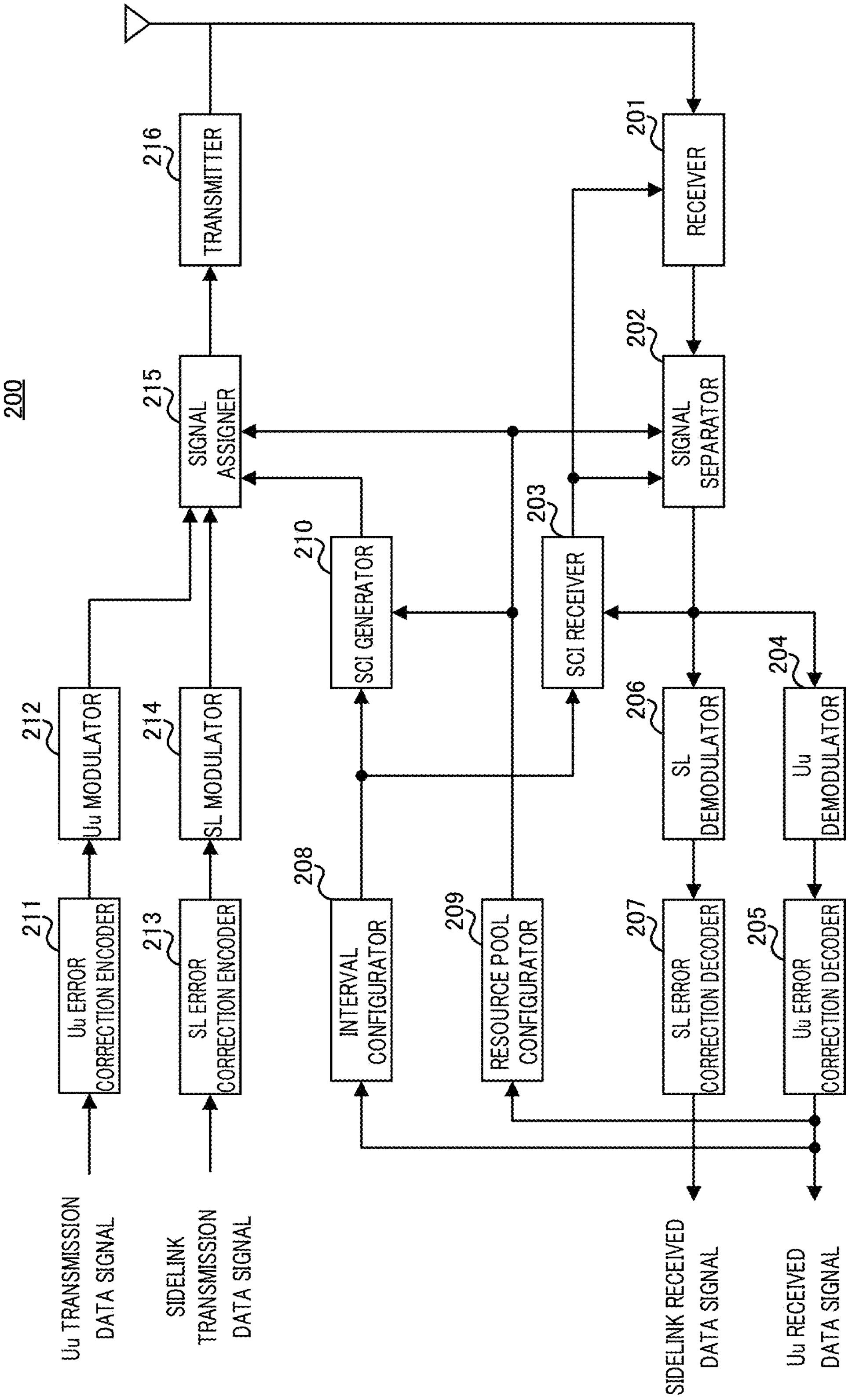
FIG. 10 is a block diagram illustrating a configuration example of the terminal.

FIG. 10 is a block diagram illustrating a configuration example of terminal 200 according to the present embodiment. In FIG. 10, terminal 200 includes receiver 201, signal separator 202, SCI receiver 203, Uu demodulator 204, Uu error correction decoder 205, SL demodulator 206, SL error correction decoder 207, interval configurator 208, resource pool configurator 209, SCI generator 210, Uu error correction encoder 211, Uu modulator 212, SL error correction encoder 213, SL modulator 214, signal assigner 215, and transmitter 216.

The control circuitry illustrated in FIG. 8 may include, for example, SCI receiver 203, interval configurator 208, resource pool configurator 209, and SCI generator 210. Further, the communication circuitry illustrated in FIG. 8 may include, for example, receiver 201 and transmitter 216.

Receiver 201 receives a received signal via an antenna, and outputs the signal to signal separator 202 after performing reception processing, such as down-conversion, on the signal.

In addition, receiver 201 identifies the time resource to receive a signal of the sidelink transmitted from a certain terminal 200 (i.e., transmitter terminal) based on, for example, interval information (described later) input from SCI receiver 203. Receiver 201 may configure a status of terminal 200 to a reception status at the identified time-resource, for example.

Signal separator 202 separates a signal component corresponding to the link (e.g., Uu link) between base station 100 and terminal 200 from the signal input from receiver 201, based on the resource pool-configuration information input from resource pool configurator 209, and outputs the separated signal component to Uu demodulator 204.

In addition, signal separator 202 separates signal components of sidelink from the signal input from receiver 201, based on the resource pool-configuration information. Signal separator 202 then outputs, for example, a PSCCH signal among the signal components of sidelink to SCI receiver 203. Signal separator 202 also separates a PSSCH signal addressed to terminal 200 from the signal components of sidelink input from receiver 201 based on resource allocation information input from SCI receiver 203, and outputs the separated signal to SL demodulator 206.

SCI receiver 203 demodulates and decodes the PSCCH signal component input from signal separator 202. For example, when SCI receiver 203 attempts to demodulate and decode the PSCCH signal and successfully decodes the signal (i.e., when SCI included in the PSCCH is detected), SCI receiver 203 outputs, to signal separator 202, the resource allocation information of the PSSCH addressed to terminal 200 included in the SCI. Note that, SCI receiver 203 may determine whether the information included in the SCI is information addressed to terminal 200, based on, for example, destination information included in the SCI.

Further, SCI receiver 203 identifies an interval between time resources to which the PSSCH addressed to terminal 200 is assigned, for example. In one example, SCI receiver 203 may determine the interval based on information such as interval-candidate information input from interval configurator 208, "Resource reservation" included in the SCI addressed to terminal 200, or information related to determination of the interval (described later). SCI receiver 203 outputs information indicating the determined interval (e.g., interval information) to receiver 201.

Uu demodulator 204 performs demodulation processing on the signal input from signal separator 202, and outputs the resulting demodulated signal to Uu error correction decoder 205.

Uu error correction decoder 205 decodes the demodulated signal input from Uu demodulator 204, outputs the obtained higher layer signaling to interval configurator 208 and resource pool configurator 209, and outputs the obtained received data signal (or referred to as a Uu received data signal).

SL demodulator 206 performs demodulation processing on the signal input from signal separator 202, and outputs the resulting demodulated signal to SL error correction decoder 207.

SL error correction decoder 207 decodes the demodulated signal input from SL demodulator 206, and performs error detection such as a cyclic redundancy check (CRC) on the decoded signal. When the decoded signal has no error, SL error correction decoder 207 outputs the obtained received data signal (or referred to as a sidelink received data signal).

Interval configurator 208 configures an interval candidate to the signal (e.g., TB) of sidelink transmitted by terminal 200 based on, for example, the interval-candidate information included in the higher layer signaling input from Uu error correction decoder 205. Interval configurator 208 outputs, to SCI receiver 203 and SCI generator 210, interval-candidate information indicating the configured interval-candidate.

Resource pool configurator 209, for example, configures a resource pool (e.g., time resource and frequency resource) used by terminal 200 for sidelink based on the resource pool-configuration information included in the higher layer signaling input from Uu error correction decoder 205. The resource pool to be configured may include, for example, one or both of a resource used by terminal 200 for transmission and a resource used by terminal 200 for reception. Resource pool configurator 209 outputs resource pool-configuration information to SCI generator 210, signal separator 202, and signal assigner 215.

SCI generator 210 generates SCI including information on the configured resource based on, for example, the information input from resource pool configurator 209 (e.g., information indicating the resource available for sidelink) and information input from interval configurator 208. SCI generator 210 may determine, for example, information on an interval (e.g., value of "Resource reservation") or a frequency resource. The SCI may include, for example, information on the determined resource, information for identifying transmitter terminal 200 (e.g., transmission source ID), and information for identifying receiver terminal 200 (e.g., transmission destination ID). SCI generator 210 outputs the generated SCI to signal assigner 215.

For example, when the mode of sidelink communication is "Mode 2," terminal 200 generates SCI in SCI generator 210. Further, for example, in a case where base station 100 generates SCI and transmits the SCI to terminal 200 when the mode of sidelink communication is "Mode 1," terminal 200 may generate SCI based on the SCI transmitted from base station 100.

Uu error correction encoder 211 takes a Uu-link transmission data signal (UL data signal) as input, performs error correction encoding on the transmission data signal, and outputs the encoded signal to Uu modulator 212.

Uu modulator 212 modulates the signal input from Uu error correction encoder 211, and outputs the modulated signal to signal assigner 215.

SL error correction encoder 213 takes a sidelink transmission data signal (sidelink data signal) as input, performs error correction encoding on the transmission data signal, and outputs the encoded signal to SL modulator 214.

SL modulator 214 modulates the signal input from SL error correction encoder 213, and outputs the modulated signal to signal assigner 215.

Signal assigner 215 assigns, to a sidelink resource, a PSCCH signal including the SCI and a PSSCH signal including the sidelink data signal input from SL modulator 214, based on, for example, the information input from resource pool configurator 209 and the information input from SCI generator 210. Signal assigner 215 also assigns the signal input from Uu modulator 212 to a Uu-link resource (e.g., uplink data channel (Physical Uplink Shared Channel: PUSCH)), for example. Signal assigner 215 outputs the signal assigned to the resource to transmitter 216.

Transmitter 216 performs radio transmission processing, such as up-conversion, on the signal input from signal assigner 215 and transmits the signal.

In the example illustrated in FIG. 10, terminal 200 receives the higher layer signaling including the interval-candidate information and the resource pool-configuration information; however, the present disclosure is not limited to this. For example, at least one of the interval-candidate information and the resource pool-configuration information may be configured by the application layer called Pre-configured, for example, or may be configured in the SIM in advance. In this case, terminal 200 may use the preliminary configured information without receiving the interval-candidate information or the resource pool-configuration information. For example, terminal 200 may recognize the resource available between base station 100 and terminal 200 and the resource available for sidelink based on the preliminary configured resource pool-configuration information, and may use the information on the resources in signal separator 202 and signal assigner 215.

Further, in FIG. 10, a description has been given with the case where the demodulator, the error correction decoder, the error correction encoder and the modulator are provided with configuration units different between in the Uu link and the sidelink; however, the present disclosure is not limited to this, and they may be provided with configuration units common in the Uu link and the sidelink.

[Operation of Terminal 200]

Next, an Operation Example of terminal 200 (see FIG. 10) will be described.

Figure 11:
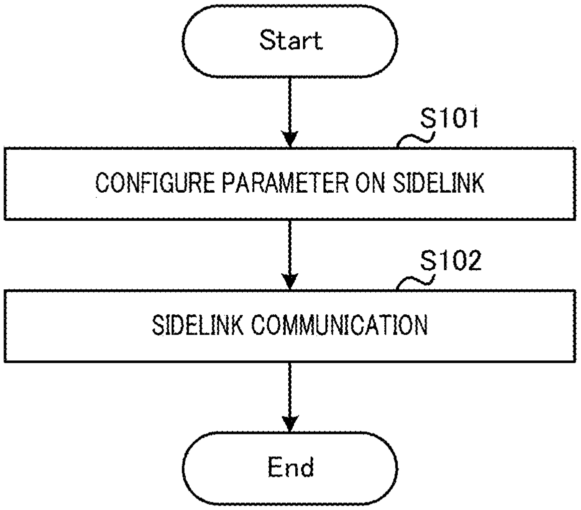
FIG. 11 is a flowchart illustrating an Operation Example of the terminal.

FIG. 11 is a flowchart illustrating exemplary processing in terminal 200.

Terminal 200 (e.g., transmitter terminal and receiver terminal) that performs transmission and reception in sidelink configures a parameter on the sidelink (S101). The parameter on the sidelink may include, for example, configurations of a time resource (e.g., inter-TB interval), a frequency resource, SL BWP, a resource pool, and a channel mapped in each slot.

The parameter on the sidelink may be indicated from the transmitter terminal to the receiver terminal by, for example, SCI. Alternatively, the parameter on the sidelink for terminal 200 may be specified in a specification (or standard), may be configured in the application layer called Pre-configured, may be configured in the SIM in advance, may be configured in a higher layer such as SIB called configured or other RRC, or may be configured in MAC, for example.

Terminal 200 performs sidelink communication (e.g., transmission and reception of data) based on the configured parameter (S102).

Next, an exemplary configuration method of the time resource (e.g., inter-TB interval) will be described.

Operation Example 1-1

In Operation Example 1-1, value "X" to indicate the inter-TB interval is configured to a value obtained by dividing a value of the inter-TB interval by W, for example.

Moreover, in Operation Example 1-1, W may be selected from among a plurality of candidates, for example.

Terminal 200, for example, determines, as the inter-TB interval, a value obtained by multiplying X indicated by "Resource reservation" and the selected W (e.g., X×W).

Note that, the value of the inter-TB interval may be indicated (or configured) to terminal 200 by the higher layer, for example. In addition, the value of W (e.g., candidate for W) may be specified in a specification (or standard), may be configured in the application layer called Pre-configured, may be configured in the SIM mounted on terminal 200, may be configured in a higher layer such as SIB called configured or other RRC, or may be configured in MAC, for example.

Further, in a case where a plurality of candidates for W is configured, for example, information indicating the value of W used (i.e., selected) by terminal 200 among the plurality of candidates for W may be included in the SCI.

Alternatively, the plurality of candidates for W may be configured in advance for terminal 200, for example. In this case, options of W may be indicated to terminal 200 by the higher layer signaling such as RRC or MAC. For example, from among candidates for W included in the options, terminal 200 may select a candidate indicated by the SCI. Further, for example, in a case where the only one option of W is indicated by the higher layer signaling, information for selecting W need not be indicated by the SCI.

In Operation Example 1-1, compared with LTE, for example, combining X and W makes it possible to increase the number of interval candidates without increasing the number of candidates for X. Thus, according to Operation Example 1-1, since the interval candidates can be dynamically configured in accordance with the value of W, for example, it is possible to support data transmission with various traffic types.

In one example, when the value of W has two patterns, terminal 200 may indicate, to another terminal 200, SCI including one-bit information indicating any of the two patterns. Moreover, for example, when the value of W has three or four patterns, terminal 200 may indicate, to another terminal 200, SCI including two-bit information indicating any of the three or four patterns. The number of information bits to indicate the candidate for W may be three or more. Further, the number of information bits to be indicated by the SCI may be determined depending on the number of candidates for W (i.e., the number of patterns).

FIG. 12 illustrates an exemplary case where the value of W is indicated by the one-bit information (e.g., 0 or 1) included in the SCI.

In FIG. 12, as candidates for W, W=100 similar to LTE and W=20 shorter than LTE are configured. For example, as illustrated in FIG. 12, W=100 is indicated by bit "0," W=20 is indicated by bit "1." Incidentally, the candidates for W are not limited to the example illustrated in FIG. 12 (W=100 or 20), and may be other values.

In FIG. 12, in a case of bit "0," the inter-TB interval is configured to 20 ms, 50 ms or 100X ms (X times 100, where X is an integer from 1 to 10), for example. Further, in FIG. 12, in the case of bit "1," the inter-TB interval is configured to 4 ms, 10 ms or 20X ms (X times 20, where X is an integer of 1 to 10), for example. Thus, in FIG. 12, as compared with FIG. 7, for example, more intervals with a wider range can be configured.

FIG. 13 illustrates an exemplary case where the value of W is indicated by two-bit information (e.g., any of 00, 01, 10, and 11) included in the SCI.

In FIG. 13, as candidates for W, W=100, similar to LTE, and W=5, W=25, and W=40 which are shorter than LTE are configured. For example, as illustrated in FIG. 13, W=100 is indicated by bit bit "00," W=5 is indicated by bit "01," W=25 is indicated by bit "10," and W=40 is indicated by bit "11." Incidentally, the candidates for W are not limited to the example illustrated in FIG. 13 (W=100, 5, 25 or 40), and may be other values.

In FIG. 13, in a case of bit "00," the inter-TB interval is configured to 20 ms, 50 ms or 100X ms (X times 100, where X is an integer from 1 to 10), for example. Further, in FIG. 13, in the case of bit "01," the inter-TB interval is configured to 1 ms, 2.5 ms or 5X ms (X times 5, where X is an integer of 1 to 10), for example. Further, in FIG. 13, in the case of bit "10," the inter-TB interval is configured to 5 ms, 12.5 ms or 25X ms (X times 25, where X is an integer of 1 to 10), for example. Further, in FIG. 13, in the case of bit "11," the inter-TB interval is configured to 8 ms, 20 ms or 40X ms (X times 40, where X is an integer of 1 to 10), for example.

Note that, for example, when the period of 2.5 ms is not assumed in sidelink, in bit “01” (W=5) illustrated in FIG. 13, the inter-TB interval=2.5 ms may be replaced with 2 ms or 3 ms. Similarly, for example, when the period of 12.5 ms is not assumed in sidelink, in bit “10” (W=25) illustrated in FIG. 13, the interval between TB=12.5 ms may be replaced with 12 ms or 13 ms.

In FIG. 13, as compared with FIGS. 7 and 12, for example, more intervals with a wider range can be configured.

Thus, in Operation Example 1-1, the value of W is made variable to configure the inter-TB interval flexibly, and thus, it is possible to support various traffic periods.

As an example, a case has been described where the inter-TB interval is calculated by using the tables illustrated in FIGS. 12 and 13 (table), but the present disclosure is not limited to this. For example, the interval may be calculated based on a bit (e.g., Resource reservation) indicated by the SCI, the value of W, and the table illustrated in FIG. 7. For example, when using the table illustrated in FIG. 7, the value of W may be set to a value different from 100. In one example, when the value of W is set to a multiple of 5, the interval (i.e., transmission period) can be configured to a multiple of 1 ms.

Further, as illustrated in FIGS. 12 and 13, when the value of W is set to 100 (e.g., the same value as in LTE) or less, the interval can be configured to a value smaller than 20 ms (e.g., the minimum value in LTE). Incidentally, in FIGS. 12 and 13, a case has been described where the value of W is set to 100 (e.g., the same value as in LTE) or less, but the value of W may be larger than 100. Such a setting of W allows the interval to be configured longer than 1000 ms (e.g., the maximum value in LTE), for example.

Operation Example 1-2

In Operation Example 1-2, for example, a plurality of candidates for associations between value “X” to indicate an inter-TB interval and information (e.g., Resource reservation) indicating X are configured (i.e., the associations are patterns of X, e.g., presented by a table).

For example, a pattern of X indicated by the SCI may be selected from among one or more candidates (e.g., a plurality of tables).

For example, terminal 200 refers to the selected pattern of X to determine, as the inter-TB interval, a value obtained by multiplying X indicated by “Resource reservation” and the W configured for terminal 200 (e.g., X×W). The value of W may be, for example, a fixed value, or may be a variable value as in Operation Example 1-1.

The plurality of candidates of the pattern of X (for example, a table) may be specified in a specification (or standard), may be configured in the application layer called Pre-configured, may be configured in the SIM mounted on terminal 200, may be configured in a higher layer such as SIB called configured or other RRC, or may be configured in MAC, for example.

In addition, in a case where a plurality of pattern candidates for X is configured, for example, information indicating a candidate used (i.e., selected) by terminal 200 among the plurality of candidates may be included in the SCI.

Alternatively, the pattern of X may be configured in advance for terminal 200, for example. In this case, options of the pattern of X may be indicated to terminal 200 by the higher layer signaling such as RRC or MAC. For example, from among combinations included in the options, terminal 200 may select a combination indicated by the SCI. Further, for example, in a case where the only one combination is indicated by the higher layer signaling, information for selecting the combination need not be indicated by the SCI.

In Operation Example 1-2, compared with LTE, for example, configuring a plurality of X patterns makes it possible to increase the number of interval candidates. Thus, according to Operation Example 1-2, since the interval candidates can be dynamically configured in accordance with the pattern of X, for example, it is possible to support data transmission with various traffic types.

In one example, when the pattern of X has two patterns, terminal 200 may indicate, to another terminal 200, SCI including one-bit information indicating any of the two patterns. Moreover, for example, when the pattern of X has three or four patterns, terminal 200 may indicate, to another terminal 200, SCI including two-bit information indicating any of the three or four patterns. The number of information bits to indicate the pattern of X may be three or more. Further, the number of information bits to be indicated by the SCI may be determined depending on the number of patterns of X (i.e., the number of patterns).

In the following, an exemplary case where the pattern of X has two patterns (i.e., when the pattern of X is indicated by the one-bit information) will be described.

Two patterns of X are, for example, a pattern illustrated in FIG. 7 and a pattern illustrated in FIG. 14. Incidentally, in FIGS. 7 and 14, “W;” that is, a value to calculate X by dividing a value of the interval or a value to calculate the value of the interval by multiplying X, is may be set to 100 similar to LTE, for example.

For example, the pattern of X illustrated in FIG. 7 (e.g., a combination of X: 0, 0.2, 0.5, or 1 to 10) may be indicated by bit “0” included in the SCI, and the pattern of X illustrated in FIG. 14 (e.g., a combination of X: 0, 0.05, 0.1, 0.2, 0.25, 0.4, 0.5 and 1 to 5) may be indicated by bit “1” included in the SCI.

By way of example, in a case of bit “0” (see FIG. 7), the inter-TB interval is configured to 20 ms, 40 ms or 100X ms (X times 100, where X is an integer from 1 to 10), for example. Further, in the case of bit “1” (see FIG. 14), the inter-TB interval is configured to 5 ms, 10 ms, 20 ms, 25 ms, 40 ms, 50 ms, or 100X ms (X times 100, where X is an integer of 1 to 5), for example. Thus, in Operation Example 1-2, as compared with the interval configuration in LTE (FIG. 7), for example, more intervals with a wider range can be configured.

In the above example, a description has been given of the case of setting the value of W to 100, but the value of W may be a value different from 100, and may be selected from among a plurality of candidates.

For example, the value of W may vary for each pattern of X. In one example, when W=20 is configured in FIG. 14, the inter-TB interval is configured to 1 ms, 2 ms, 4 ms, 5 ms, 8 ms, 10 ms, and 20 Xms (X times 20, where X is an integer of 1 to 5). The combination of the pattern of X and the value of W may be preliminary specified, for example, or may be indicated to terminal 200 by another bit (e.g., information included in the SCI) as in Operation Example 1-1.

In addition, for example, in at least one of the patterns of X, a value, such as X=0.1 or 0.05, smaller than the value of X illustrated in FIG. 7 (e.g., X=0.2) may be included, as illustrated in FIG. 14. Such a setting of X makes it possible to configure a short interval as compared with the case of FIG. 7 (e.g., in LTE).

Further, for example, in at least one of the patterns of X, the granularity of X may be configured finer than that in FIG. 7, as illustrated in FIG. 14. For example, in FIG. 7, three values are set within the range of X=0 to 0.5 whereas, in FIG. 14, seven values are set within the range of X=0 to 0.5. This setting makes it possible to, for example, increase the value that can be supported within the range where the interval is configured, as compared with the case of FIG. 7 (e.g., in LTE).

Thus, in Operation Example 1-1 and Operation Example 1-2, the transmitter terminal determines information (e.g., Resource reservation included in the SCI) indicating value "X" obtained by dividing the time interval between TBs by W. The transmitter terminal also determines information (e.g., bit included in the SCI) indicating one candidate, when a plurality of candidates is present for at least one side of a value of W (e.g., Operation Example 1-1) and an association between X and "Resource reservation" (e.g., Operation Example 1-2), the one candidate being a candidate among the plurality of candidates. The transmitter terminal then transmits the determined information to the receiver terminal.

The receiver terminal receives, for example, the information including X (e.g., Resource reservation included in the SCI). The receiver terminal also receives the information (e.g., bit included in the SCI) indicating one candidate, when a plurality of candidates is present for at least one side of a value of W (e.g., Operation Example 1-1) and an association between X and "Resource reservation" (e.g., Operation Example 1-2), the one candidate being a candidate among the plurality of candidates. The receiver terminal then determines the inter-TB interval (e.g., X×W), based on the received information.

Since the patterns of W or X can be dynamically configured in accordance with the information indicating a candidate for the at least one side of the value of W and the pattern of X, terminal 200 can dynamically configure the interval candidates and support data transmission with various traffic types.

Incidentally, in Operation Example 1-1 and Operation Example 1-2, a description has been given of the method for indicating "Resource reservation" to indicate the inter-TB interval, but Operation Example 1-1 and Operation Example 1-2 may be applied to a method for indicating "Time gap between initial transmission and retransmission."

Operation Example 1-3

In Operation Example 1-3, an inter-TB interval is configured based on either a time interval (i.e., interval) indicated by "Resource reservation" or a time interval (i.e., gap) indicated by "Time gap between initial transmission and retransmission."

For example, terminal 200 may indicate, to another terminal 200, SCI including information indicating which time interval in "Resource reservation" or in "Time gap between initial transmission and retransmission" is used for configuration (i.e., indication) of the inter-TB interval.

According to Operation Example 1-3, the interval candidates can be dynamically configured, and thus it is possible to support data transmission with various traffic types, as in Operation Example 1-1 and Operation Example 1-2.

For example, a time interval (e.g., interval or gap) used for configuration of the inter-TB interval may be indicated by the one-bit information included in the SCI (bit "0" or bit "1", e.g., additional bit). By way of example, when bit "0" is indicated, terminal 200 may configure the inter-TB interval based on the time interval indicated by "Resource reservation" (e.g., interval). On the other hand, for example, when bit "1" is indicated, terminal 200 may configure the inter-TB interval based on the time interval indicated by "Time gap between initial transmission and retransmission" (e.g., gap).

In Operation Example 1-3, for example, the configured interval may be applied to an inter-TB interval for the initial transmission, and may be applied to an interval between TB of the initial transmission and TB of the retransmission. Terminal 200 can distinguish between the initial transmission and the retransmission based on, for example, "Retransmission index."

For example, when a time period of the traffic is long (e.g., when not less than a threshold value), terminal 200 may configure, as the inter-TB interval, the time interval indicated by "Resource reservation" (e.g., interval). Further, when the time period of the traffic is short (e.g., when less than the threshold value), the terminal may configure, as the inter-TB interval, the time interval indicated by "Time gap between initial transmission and retransmission" (e.g., gap), which is a time interval shorter than the time interval indicated by Resource reservation.

In Operation Example 1-3, a plurality of candidates for W as in Operation Example 1-1 or a plurality of patterns of X as in Operation Example 1-2 are not configured; thus, it is possible to reduce signaling related to the configuration of the time resource.

Further, as a variation of Operation Example 1-3, when bit "0" is indicated, terminal 200 may configure the inter-TB interval for the initial transmission to the time interval indicated by "Resource reservation," and may configure the gap between the initial transmission and the retransmission to the interval; that is, the time interval indicated by "Resource reservation," as illustrated in FIG. 6, for example.

Operation Example 1-4

In Operation Example 1-4, the inter-TB interval is configured based on the time interval indicated by "Resource reservation" (i.e., interval).

For example, terminal 200 may indicate, to another terminal 200, the SCI including information indicating whether the time interval indicated by "Resource reservation," for the configuration (i.e., indication) of the inter-TB interval, is a value determined according to the method for determining the time interval in either "Resource reservation" or "Time gap between initial transmission and retransmission," which are specified in LTE-V2X.

According to Operation Example 1-4, the interval candidates can be dynamically configured, and thus it is possible to support data transmission with various traffic types, as in Operation Example 1-1, Operation Example 1-2, and Operation Example 2-3. In addition, the LTE-V2X specification can be utilized as much as possible.

For example, the time interval (e.g., interval or gap) used for the configuration of the inter-TB interval may be indicated by the one-bit information included in the SCI (bit "0" or bit "1," e.g., additional bit). By way of example, when bit "0" is indicated, terminal 200 may configure the inter-TB interval based on the time interval indicated by "Resource reservation" (e.g., interval) in a manner similar to "Resource reservation" in the LTE-V2X specification. Further, for example, when bit "1" is indicated, terminal 200 may configure the inter-TB interval based on the time interval indicated by "Resource reservation" (e.g., interval) in a manner similar to "Time gap between initial transmission and retransmission" in the LTE-V2X specification.

In Operation Example 1-4, for example, the configured interval may be applied to an inter-TB interval for the initial transmission, and may be applied to an interval between TB of the initial transmission and TB of the retransmission. Terminal 200 can distinguish between the initial transmission and the retransmission based on, for example, "Retransmission index."

For example, when the time period of the traffic is long (e.g., when not less than the threshold value), terminal 200 may configure the inter-TB interval based on the time interval indicated by "Resource reservation" (e.g., interval) in a manner similar to "Resource reservation" in the LTE-V2X specification. Further, when the time period of the traffic is short (e.g., when less than the threshold value), terminal 200 may configure the inter-TB interval based on the time interval indicated by "Resource reservation" (e.g., interval) in a manner similar to "Time gap between initial transmission and retransmission" in the LTE-V2X specification.

In Operation Example 1-4, a plurality of candidates for W as in Operation Example 1-1 or a plurality of patterns of X as in Operation Example 1-2 are not configured; thus, it is possible to reduce signaling related to the configuration of the time resource.

Incidentally, the information indicating the method for determining the time interval used for the configuration of the inter-TB interval is not limited to the case of being explicitly indicated by the information included in the SCI (e.g., one-bit information), and it may be implicitly indicated by, for example, the information specified for another purpose.

Operation Examples 1-1 to 1-4 have been each described, thus far.

According to the present embodiment, terminal 200 can dynamically configure the inter-TB interval among a plurality of candidates for the time interval, even when, as in NR, there are more traffic types than in LTE. Thus, according to the present embodiment, it is possible to improve efficiency of resource allocation (e.g., allocation or reservation of time resource) in radio communication (e.g., sidelink communication).

Embodiment 2

In Embodiment 1 (e.g., Operation Example 1-1 and Operation Example 1-2), a method has been described in which the value of W or the pattern of X (e.g., table illustrated in FIG. 7 or FIG. 14) is explicitly indicated by bits included in the SCI. In contrast, in the present embodiment, a method will be described in which the value of W or the pattern of X is implicitly indicated.

According to the present embodiment, the number of configurable intervals can be increased without increasing the number of bits of the SCI.

A base station and a terminal according to the present embodiment have the same basic configuration as those of base station 100 and terminal 200 according to Embodiment 1.

Hereinafter, a description will be given of an exemplary configuration method of a time resource (e.g., inter-TB interval) according to the present embodiment.

Operation Example 2-1

In Operation Example 2-1, "priority indication" or "QoS indication" included in the SCI is used to indicate the inter-TB interval. Note that, it is called "priority indication" in LTE, but it is possibly called differently in the SCI of NR (e.g., "QoS indication").

It has been studied to include information such as priority, latency, or reliability in "priority indication" or "QoS indication." It has been studied to perform control such as allocation of resources (resource allocation), collision-avoidance between terminals (congestion control), a transmission method in case of occurrence of plural data in a terminal (resolution of in-device coexistence issues), or transmission power control (power control) on the basis of "priority indication" or "QoS indication."

In Operation Example 2-1, terminal 200 may determine the value of W or the pattern of X based on, for example, "priority indication" or "QoS indication." In other words, the information included in "priority indication" or "QoS indication" is associated with a candidate for the value of W or for the pattern of X.

For example, terminal 200 identifies the latency required for terminal 200 (i.e., the desired amount of delay) based on "priority indication" or "QoS indication."

Then, when the identified latency is short (e.g., when less than a threshold value), terminal 200 may configure the inter-TB interval based on, for example, W=20 in Operation Example 1-1 or FIG. 14 in Operation Example 1-2. On the other hand, when the identified latency is long (e.g., when not less than the threshold value), terminal 200 may configure the inter-TB interval based on, for example, W=100 in Operation Example 1-1 or FIG. 7 in Operation Example 1-2.

For example, the application of W=20 or the pattern of X illustrated in FIG. 14 allows the inter-TB interval to be configured shorter as compared with W=100 or the pattern of X illustrated in FIG. 7, and thus, it makes easier to satisfy the latency required for terminal 200.

The mapping between "priority indication" or "QoS indication" and a value of W (e.g., W=20 or 100) or a pattern of X (e.g., table illustrated in FIG. 7 or 14) may be specified in a specification (or standard), may be configured in the SIM, may be configured in the application layer called Pre-configured, may be configured in a higher layer such as SIB called configured or other RRC, or may be configured in MAC.

According to Operation Example 2-1, terminal 200 can indicate the inter-TB interval without using a new bit. Further, for example, terminal 200 can configure an interval suitable for a parameter corresponding to the set value in LTE (e.g., required latency).

Operation Example 2-2

In Operation Example 2-2, Redundancy Version (RV) included in the SCI is used to indicate the inter-TB interval.

In LTE, no RV is indicated by the SCI. In contrast, in NR, retransmission control by indication of RV and New Data Indicator (NDI) has been studied for the SCI as well as downstream control information (DCI), for example.

Figure 15:
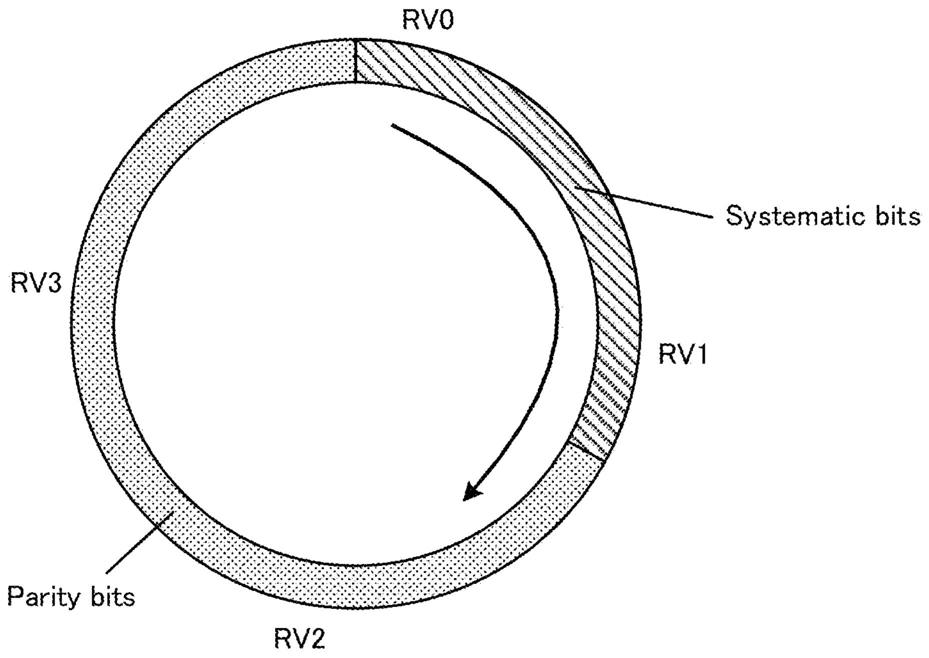
FIG. 15 illustrates an exemplary circular buffer.

For example, as illustrated in FIG. 15, a bit string, in which parity bits are added to systematic bits of the Transport Block (TB) size (TBS) determined by the indication of the MCS, is stored in a circular buffer. In the example illustrated in FIG. 15, a parity bit approximately twice as long as a systematic bit is added. Further, in the example illustrated in FIG. 15, the circular buffer is divided into four.

"RV" is a signal that indicates a bit position (e.g., either RV0, RV1, RV2, or RV3) at which data transmission is started in the circular buffer. For example, as illustrated in FIG. 15, in RV0, a transmission bit is typically started from a bit position near the beginning of systematic bits (e.g., bit position shifted by a few bits from the beginning). Further, the number of bits that can be transmitted in a single transmission determines a bit transmittable from a start position of the circular buffer.

For example, when RV0 is indicated, the transmission bit includes more systematic bits than those of other RVs; thus, RV0 is likely to be configured (i.e., selected) at the initial transmission.

Besides, in the retransmission, when a bit that does not overlap with the initial transmission is transmitted under a situation, for example, where terminal 200 can receive the signal of the initial transmission, a retransmission method called "incremental redundancy" is applied, which can improve the received quality. Thus, in the retransmission, RV1, RV2 or RV3 that does not overlap with the initial transmission (e.g., RV0) is likely to be selected. In addition, for example, as illustrated in FIG. 15, RV2 has a less bit-string that overlaps with RV0 than those of RV1 and RV3 which are adjacent to RV0. Meanwhile, for example, the greater the number of bits that can be transmitted in a single transmission (i.e., the longer the bit string) is, the more the systematic bits may be included even in RV3.

Considering such features of RV, the greater the number of bits that can be transmitted in a single transmission is, the more likely the bit string corresponding to RV3 or RV1 illustrated in FIG. 15 is included in the bit string corresponding to RV0 or RV2, for example. In other words, for example, in FIG. 15, terminal 200 (e.g., receiver terminal) possibly receives a bit included in the bit string corresponding to RV3 or RV1 by receiving the bit string corresponding to RV0 or RV2.

Hence, it is assumed that the reception property in terminal 200 is hardly deteriorated even in a case where some of the plurality of RVs (e.g., one RV) is used to indicate Win Operation Example 1-1 or to indicate the pattern of X (e.g., table) in Operation Example 1-2.

Thus, in Operation Example 2-2, terminal 200 may determine the value of W or the pattern of X based on, for example, RV. That is, RV is associated with the value of W or the pattern of X.

As Example 1 of Operation Example 2-2, terminal 200 may indicate the inter-TB interval by using the bit used for indication of RV3 as follows. Note that, in the following, by way of example, RV0 is indicated by bit "00," RV1 is indicated by bit "01," RV2 is indicated by bit "10," and RV3 is indicated by bit "11."

In Example 1, bit "11" may indicate, instead of RV3, an interval with a value different from that for other bits (e.g., bit "00," bit "01," and bit "10"), and RV0. For example, as follows, bit "11" may be associated with a short interval (e.g., W=20 or the pattern of X in FIG. 14) as compared with bits 00, 01 and 10 (e.g., W=100 or the pattern of X in FIG. 7).

00: RV0 and W=100 (or FIG. 7)
01: RV1 and W=100 (or FIG. 7)
10: RV2 and W=100 (or FIG. 7)
11: RV0 and W=20 (or FIG. 14)

For example, when the interval is long (e.g., when W=100 or the pattern of X in FIG. 7 is applied), either RV0, RV1 or RV2 can be configured, whereas one of RV0s can be configured when the interval is short (e.g., when W=20 or the pattern of X in FIG. 14 is applied). However, it is assumed that, for example, the shorter the interval is, the shorter the latency desired for a packet is. Thus, it is assumed that the shorter the interval is, the more redundant the signal transmitted in the initial transmission is, so that the receiver terminal can receive the signal at the initial transmission (i.e., succeed in reception) in many cases. Consequently, as described above, the retransmission efficiency is hardly deteriorated even when RV configurable when the interval is short is RV0 alone.

In Example 1, a case has been described in which bit "11" corresponding to RV3 is used to indicate the interval different from the bits corresponding to the other RVs, but a bit corresponding to another RV different from RV3 (e.g., RV1) may be used to indicate the interval different from the bits corresponding to the other RVs. Further, in Example 1, the case where the different interval is shorter than the other intervals has been described, but the interval may be longer than the other intervals.

Furthermore, as Example 2 of Operation Example 2-2, two of the plurality of RVs (e.g., RV1 and RV3) may be used to indicate W in Operation Example 1-1 or to indicate the pattern of X (e.g., table) in Operation Example 1-2. In the case of Example 2, instead of RV1 and RV3, RV0 or RV2 may be configured as follows:

00: RV0 and W=100 (or FIG. 7)
01: RV0 and W=20 (or FIG. 14)
10: RV2 and W=100 (or FIG. 7)
11: RV2 and W=20 (or FIG. 14)

Thus, even when a different interval is indicated instead of the indication of two states of RV (e.g., RV1 and RV3), RV can be changed upon retransmission at each different interval (e.g., each of W=20 and W=100).

Operation Example 2-3

In Operation Example 2-3, "RV" and "Retransmission index" included in the SCI are used to indicate the inter-TB interval.

"Retransmission index" is information indicating whether it is the initial transmission or the retransmission.

In Operation Example 2-3, terminal 200 may determine the value of W or the pattern of X based on, for example, "RV" and "Retransmission index" (e.g., information indicating retransmission of data). In other words, combinations of "RV" and "Retransmission index" (transmission type) are associated with a candidate for the value of W or for the pattern of X.

For example, depending on whether it is the initial transmission or the retransmission, the types of available RVs is limited, and Win Operation Example 1-1 or the pattern of X in Operation Example 1-2 is thus indicated instead.

For example, in a bit string of three bits composed of RV with two-bits and Retransmission index with one-bit, the front two bits are used for "RV," and the last one bit is used for "Retransmission index." Further, for example, "Retransmission index" (e.g., the third bit of the three bits) indicates the initial transmission in the case of zero and indicates the retransmission in the case of one. Further, for example, for "RV," either RV0 or RV3 is configured for the initial transmission whereas either RV2 or RV1 is configured for the retransmission.

In this case, RV, an interval, and a transmission type (initial transmission or retransmission) may be configured for the bit string of three-bit (e.g., 000 to 111) as follows:

000: RV0, W=100 (or FIG. 7) and initial transmission
001: RV2, W=100 (or FIG. 7) and retransmission
010: RV0, W=20 (or FIG. 14) and initial transmission
011: RV2, W=20 (or FIG. 14) and retransmission
100: RV3, W=100 (or FIG. 7) and initial transmission
101: RV1, W=100 (or FIG. 7) and retransmission 110: RV3, W=20 (or FIG. 14) and initial transmission 111: RV1, W=20 (or FIG. 14) and retransmission For example, in the initial transmission, RV0 or RV3 is selected which may include more systematic bits as compared to RV1 and RV2 whereas, in the retransmission, RV1 or RV2 is selected which may include more parity bits not included in the initial transmission.

According to Operation Example 2-3, although the number of selectable RVs in each of the initial transmission and the retransmission is reduced, RVs suitable for each of the initial and the retransmission are included in the option; thus, the deterioration of the received quality in terminal 200 can be suppressed.

Operation Example 2-4

In Operation Example 2-4, an HARQ process number included in the SCI (or may be also referred to as HARQ process ID) is used to indicate the inter-TB interval.

In NR, supporting a plurality of processes has been considered, and the HARQ process ID may be indicated by the SCI.

In Operation Example 2-4, terminal 200 may determine the value of W or the pattern of X based on, for example, the HARQ process ID. In other words, the HARQ process ID is associated with a candidate for the value of W or for the pattern of X.

For example, for each HARQ process, the value of W in Operation Example 1-1 or the pattern of X in Operation Example 1-2 (e.g., table) may be configured.

Note that, for example, a configuration method for each HARQ process may be specified in a specification (or standard), may be configured in the SIM in advance, may be configured in the application layer called Pre-configured, may be configured in a higher layer such as SIB called configured or other RRC, or may be configured in MAC.

For example, the longer an interval is, the less HARQ processes can be assigned to the interval. In other words, the shorter an interval is, the more HARQ processes can be assigned to the interval.

Thus, for example, W=100 in Operation Example 1-1 or a combination of candidates for X illustrated in FIG. 7 in Operation Example 1-2 may be configured for HARQ process #0 whereas W=20 in Operation Example 1-1 or a combination of candidates for X illustrated in FIG. 14 in Operation Example 1-2 may be configured for another HARQ process ID.

Incidentally, the above-described association between the HARQ process ID and the candidate for W or for the pattern of X is an merely example, and it is not limited to this. For example, a plurality of HARQ process IDs may be associated with W=100 in Operation Example 1-1 the pattern of X illustrated in FIG. 7 in Operation Example 1-2.

Terminal 200 may acquire a parameter for configuration of the inter-TB interval based on, for example, the HARQ process ID included in the SCI.

Operation Examples 2-1 to 2-4 have been each described, thus far.

Note that, any two or more Operation Examples may be combined from among the Operation Example 2-1 to Operation Example 2-4.

In the present embodiment, the inter-TB interval is implicitly indicated by the information specified for another purpose. Thus, according to the present embodiment, for example, in sidelink, new information need not be added to, e.g., a parameter specified in LTE in order to indicate the inter-TB interval; thus, it is possible to reduce the overhead of signaling.

Embodiment 3

In the SCI of LTE, the transmission timing is specified based on two time intervals: the inter-TB interval (e.g., corresponding to “Resource reservation”) and the gap between the initial transmission and the retransmission (e.g., “time gap between initial transmission and retransmission”) as illustrated in FIG. 6, for example.

Further, in LTE, for example, the TB of the next initial transmission (e.g., Initial transmission TB #2 in FIG. 6) is given a transmission opportunity after the interval illustrated in “Resource reservation” from the TB of the current initial transmission (e.g., Initial transmission TB #1 in FIG. 6). Thus, for example, the retransmission timing for the current TB (e.g., TB #1 in FIG. 6) can be configured until the transmission opportunity of the next TB (e.g., TB #2 in FIG. 6).

However, for example, the shorter the inter-TB interval indicated by “Resource reservation” is, the higher the possibility of overlapping the next TB transmission timing (e.g., initial transmission timing) and the current TB transmission timing (e.g., retransmission timing) is.

In addition, in NR, NDI is indicated by the SCI, and plural times of retransmission and transmission of new TB (e.g., next TB) may be indicated depending on whether the NDI is toggled or not.

Furthermore, feedback of HARQ using PSFCH has been also considered in NR. When ACK (i.e., no error) is confirmed by the feedback using PSFCH, the transmitter terminal need not ensure a resource for the retransmission, for example. Thus, in the feedback using PSFCH, for example, when the retransmission occurs, an operation such that a resource for the initial transmission is used is possible.

A base station and a terminal according to the present embodiment have the same basic configurations as those of base station 100 and terminal 200 according to Embodiment 1.

Hereinafter, an Operation Example of terminal 200 according to the present embodiment will be described.

Operation Example 3-1

In Operation Example 3-1, for example, an inter-TB interval (i.e., a time interval) to be configured for terminal 200 is configured to, among TBs with which terminal 200 communicates, a time interval between TBs adjacent to each other in the time domain.

For example, the value of W in Operation Example 1-1 or the pattern of X in Operation Example 1-2 (e.g., table) is configured for terminal 200. Terminal 200 may determine the inter-TB interval based on, for example, a configured value.

Note that, the value of W or a combination of candidates for X may be specified in a specification (or standard), may be configured in the SIM, may be configured in the application layer called Pre-configured, may be configured in a higher layer such as SIB called configured or other RRC, or may be configured in MAC.

In Operation Example 3-1, for example, when the interval configured for terminal 200 is shorter than a threshold value (e.g., interval specified in LTE), “time gap between initial transmission and retransmission” and “Retransmission index” need not be included in the SCI.

For example, when the interval configured for terminal 200 is shorter than the threshold value, the retransmission may be performed in accordance with a transmission timing based on the inter-TB interval (e.g., time interval corresponding to Resource reservation). In other words, the timing of retransmission may be configured in accordance with the inter-TB interval configured based on, for example, an indication of "Resource reservation" and the value of W in Operation Example 1-1 (or the pattern of X in Operation Example 1-2).

Figure 16:
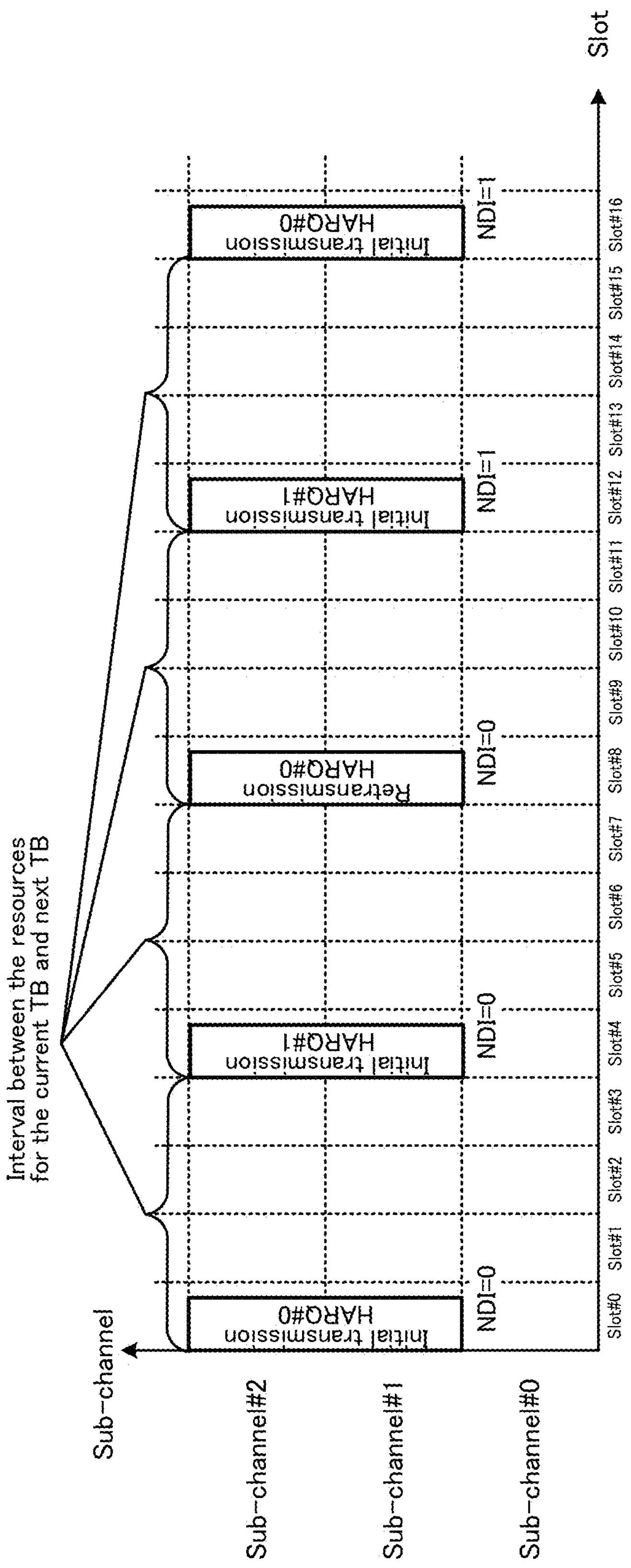
FIG. 16 illustrates an example of resource allocation in Operation Example 3-1.

FIG. 16 illustrates an example of resource allocation in Operation Example 3-1.

In FIG. 16, for example, the inter-TB interval (time interval) is configured to be four slots by the SCI transmitted in slot #0. Thus, as illustrated in FIG. 16, for example, regardless of the type of TB (e.g., HARQ process) and the transmission type (e.g., initial transmission and retransmission), the interval; that is, the time interval between TBs with adjacent transmission timings is the same (e.g., four slots).

For example, in FIG. 16, the initial transmission data of HARQ process #0 (e.g., denoted as HARQ #0) is assigned to slot #0, and the initial transmission data of HARQ process #1 (e.g., denoted as HARQ #1) is assigned to slot #4.

Further, the data of HARQ process #0 is assigned, together with the same NDI=0 as the initial transmission (slot #0), to slot #8 illustrated in FIG. 16. Thus, terminal 200 (e.g., receiver terminal) determines that the data transmission of HARQ process #0 in slot #8 is the retransmission. Further, the data of HARQ process #1 is assigned, together with the NDI=1 different from the initial transmission (slot #4), to slot #12 illustrated in FIG. 16. Thus, terminal 200 (for example, receiver terminal) determines that the data transmission of HARQ process #1 in slot #12 is the initial transmission. Similarly, the data of HARQ process #0 is assigned, together with the NDI=1 different from the retransmission (slot #8), to slot #16 illustrated in FIG. 16. Thus, terminal 200 (for example, receiver terminal) determines that the data transmission of HARQ process #0 in slot #16 is the initial transmission.

Incidentally, FIG. 16 illustrates an example in which different TBs are alternately assigned for each interval (e.g., four slots), but it is not limited to this, and the initial transmission and the retransmission of the same TB may be assigned to adjacent time resources for each interval.

According to Operation Example 3-1, regardless of whether it is the initial transmission or the retransmission, the data is assigned to, for example, the time resource (i.e., interval) configured on the basis of "Resource reservation;" thus, a resource for the retransmission need not be allocated separately.

Further, according to Operation Example 3-1, for example, "time gap between initial transmission and retransmission" and "Retransmission index" need not be included in the SCI. Thus, the length of the SCI may be reduced by, for example, removing bits for "time gap between initial transmission and retransmission" and "Retransmission index." Alternatively, some or all of bits not used for "time gap between initial transmission and retransmission" and "Retransmission index" may be configured to a fixed value used for error detection. These configurations of the SCI can improve the received quality of the SCI.

Meanwhile, some of the bits not used for "time gap between initial transmission and retransmission" and "Retransmission index" may be configured to, for example, a bit that indicates the value of W in Operation Example 1-1 or the pattern of X in Operation Example 1-2. For example, in Operation Example 1-1, two bits (four patterns) may be used to indicate W, and terminal 200 may select any of W=5, 10, 15, and 20.

Further, the bits not used for "time gap between initial transmission and retransmission" and "Retransmission index" may be used in an area for indicating the NDI or the HARQ ID.

Further, in Operation Example 3-1, for example, as illustrated in FIG. 16, regardless of the type of TB and the transmission type, the time interval between TBs is configured. Hence, according to Operation Example 3-1, for example, even when the inter-TB interval is short (e.g., when less than the threshold value), it is possible to prevent the transmission timings from overlapping between the current TB and the next TB.

Operation Example 3-2

Figure 17:
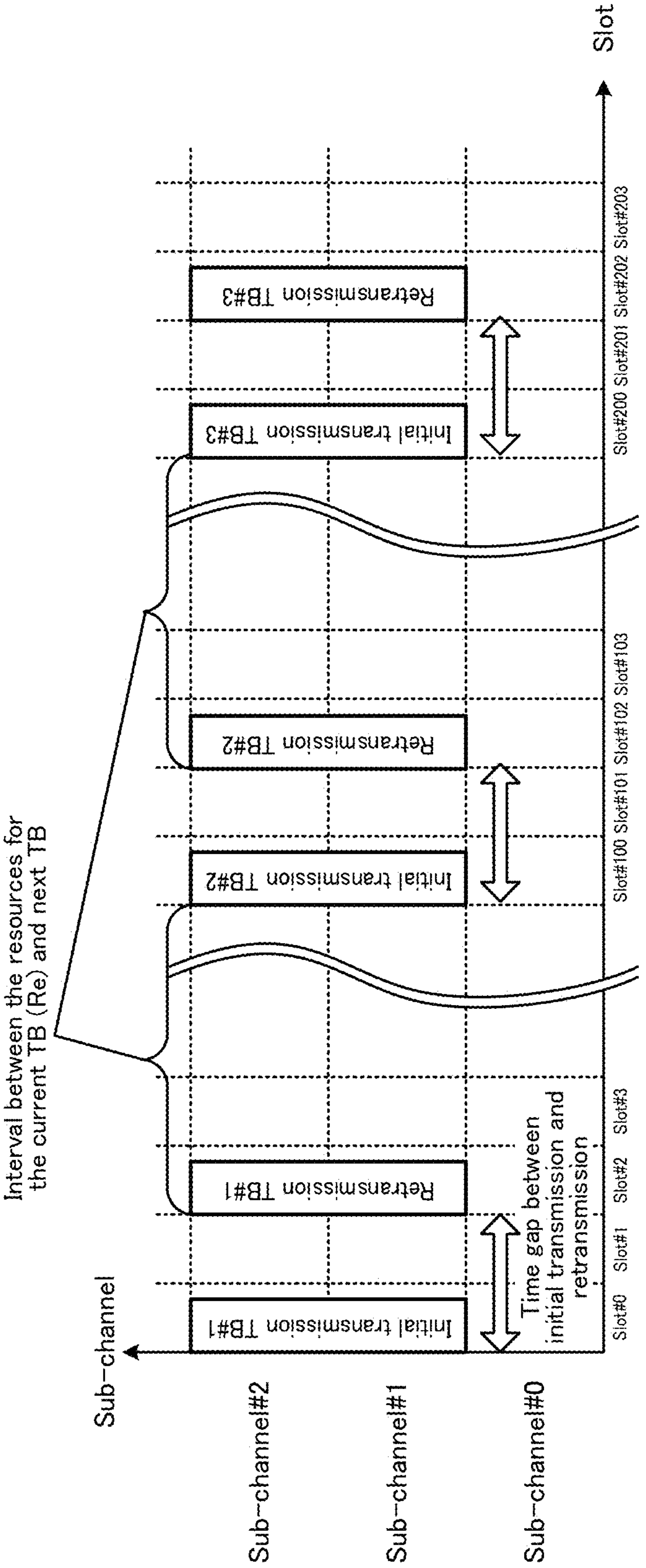
FIG. 17 illustrates an example of resource allocation in Operation Example 3-2.

In Operation Example 3-2, the inter-TB interval (time interval) indicated by Resource reservation is configured to a time interval between a retransmission timing of TB #N and an initial transmission timing of TB #N+1, as illustrated in FIG. 17, for example.

By way of example, in FIG. 17, the time interval between slot #2, which is the retransmission timing of TB #1, and slot #100, which is the initial transmission timing of TB #2 (e.g., corresponding to 98 slots), is indicated to terminal 200 by Resource reservation. Similarly, in FIG. 17, the time interval between slot #102, which is the retransmission timing of TB #2, and slot #200, which is the initial transmission timing of TB #3 (e.g., corresponding to 98 slots), is indicated to terminal 200 by Resource reservation.

In Operation Example 3-2, the time interval between the initial transmission timing of TB #N and the initial transmission timing of TB #N+1 may be configured to a value obtained by adding, for example, an interval indicated by Resource reservation and a time interval indicated by "time gap between initial transmission and retransmission" (i.e., gap). For example, in FIG. 17, the time interval between the initial transmission timing of TB #N and the initial transmission timing of TB #N+1 is configured to be 100 slots, which is an addition value of the interval indicated by Resource reservation (e.g., 98 slots) and the gap maintained by "time gap between initial transmission and retransmission" (e.g., two slots).

According to Operation Example 3-2, various intervals can be indicated in accordance with, for example, the configurations of the interval indicated by "Resource reservation" and the time interval indicated by "time gap between initial transmission and retransmission," and thereby the flexibility of resource allocation can be improved.

For example, terminal 200 may configure the interval indicated by "Resource reservation" to be longer than "time gap between initial transmission and retransmission" to indicate the various intervals.

Further, in Operation Example 3-2, as illustrated in FIG. 17, for example, after the initial transmission and retransmission of TB #N, the transmission of the next TB #N+1 is assigned. In other words, in Operation Example 3-2, the transmission of the next TB #N+1 is not assigned between the initial transmission and retransmission of TB #N. Thus, according to Operation Example 3-2, for example, even when the inter-TB interval is short (e.g., when less than the threshold value), it is possible to prevent the transmission timing from overlapping between the current TB and the next TB.

Further, in Operation Example 3-2, as illustrated in FIG. 17, for example, the interval between the retransmission timing of TB #N and the initial transmission timing of TB #N+1 transmitted after TB #N is configured by Resource reservation. Hence, for example, in Operation Example 3-2, as compared to LTE (FIG. 6), the interval indicated by Resource reservation may be shortened. Thus, in Operation Example 3-2, as compared to LTE, it is possible to reduce the information indicated by Resource reservation (e.g., pattern of interval).

Operation Example 3-1 and Operation Example 3-2 have been each described, thus far.

As above, Embodiments 1 to 3 have been each described.

In Embodiments 1 to 3, the method for configuring the time resource has been described, while a method for configuring a frequency resource will be described in following Embodiments 4 to 7.

Embodiment 4

In V2X, for example, a resource reserved by a transmitter terminal (e.g., Tx UE) is indicated to a receiver terminal (Rx UE) by the SCI. In LTE, for example, a frequency resource (e.g., sub-channel) is allocated by "Frequency resource location of initial transmission and retransmission."

The sub-channel is, for example, a resource including a plurality of resource blocks (e.g., Physical Resource Block: PRB). Allocation of sub-channels may be, for example, contiguous sub-channels. The sidelink communication is based on, for example, discrete fourier transform-spread-orthogonal frequency division multiplexing (DFT-Spread OFDM) called single-carrier communication; thus, allocating contiguous resources (e.g., sub-channel) in the frequency domain can suppress an increase of a peak-to-average power ratio (PAPR).

In LTE V2X, as illustrated in FIG. 6, for example, a plurality of time resources (e.g., slots) can be reserved. In this case, in the frequency domains in the plurality of time resources to be reserved, for example, the same frequency resource of a certain interval (e.g., sub-channels #1 and #2 in FIG. 6) can be reserved.

As described above, the indication of the reserved resource is received by, in addition to the receiver terminal, another terminal different from the receiver terminal. Consequently, the reserved resource can be recognized by the other terminal in addition to the receiver terminal for which the resource has been allocated. Another terminal, for example, monitors (or senses) another SCI different from the SCI addressed to the other terminal and performs scheduling avoiding the resource reserved by the transmitter terminal, and thereby the collision-probability of resources can be reduced. Thus, for example, when each terminal can correctly receive the initial SCI, it is easier to avoid the resource collision in allocation of a time resource subsequent to the time resource in which the SCI has been received.

Further, in LTE V2X, the SCI (or PSCCH), which is a control signal, and PSSCH, which is a data signal, are assigned to the same slot, for example.

In contrast, in NR V2X, a method called "Standalone PSCCH" has been discussed in order to avoid, for example, a collision of SCIs in the initial transmission. In "Standalone PSCCH," for example, at the initial transmission, PSCCH that transmits the SCI is transmitted (i.e., no PSSCH is transmitted), and PSSCH that transmits the data is transmitted in or after the reserved time resource next to the initial transmission.

Further, in NR V2X, for example, a method called "Single sub-channel of PSCCH+PSSCH" has been also considered. In "Single sub-channel of PSCCH+PSSCH," for example, at the initial transmission, PSCCH that transmit the SCI and PSSCH with one sub-channel are transmitted.

Figure 18:
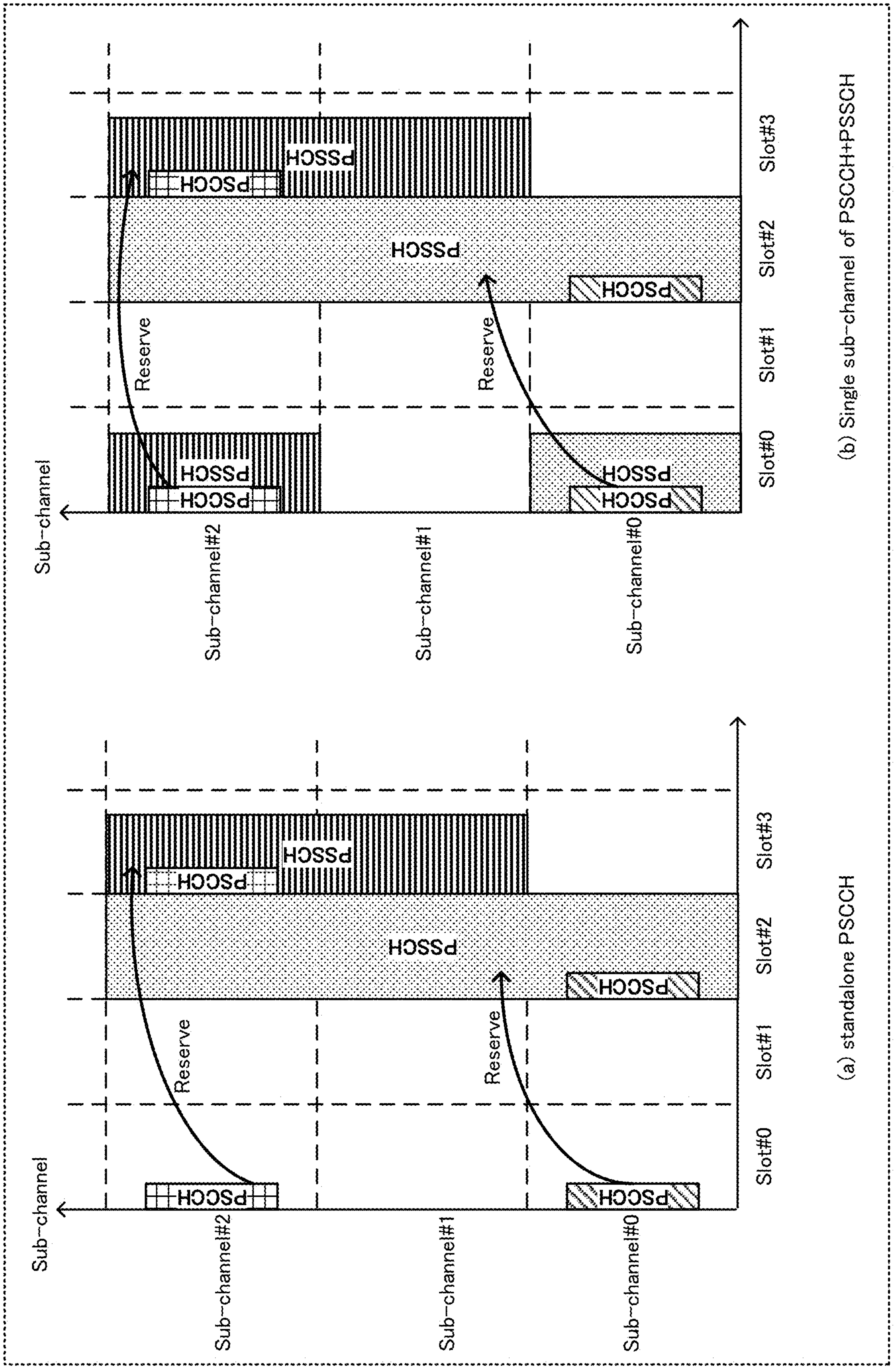
FIG. 18 illustrates examples of Standalone PSCCH and Single sub-channel of PSCCH+PSSCH.

FIG. 18 illustrates in (a) an example of Standalone PSCCH, and FIG. 18 illustrates in (b) an example of Single sub-channel of PSCCH+PSSCH.

In (a) of FIG. 18, for example, in slot #0 at which the resource reservation is started, PSCCH is transmitted while no PSSCH is transmitted. In the example illustrated in (a) of FIG. 18, each of the two transmitter terminals transmit PSCCH in sub-channel #0 and sub-channel #2 of slot #0. For example, sub-channels #0, #1, and #2 of slot #2 are reserved by the PSCCH transmitted in sub-channel #0 of slot #0, and sub-channels #1 and #2 of slot #3 are reserved by the PSCCH transmitted in sub-channel #2 of slot #0. According to the Standalone PSCCH, for example, another terminal that has received (or monitored) the PSCCH of slot #0 can recognize that sub-channels #0, #1, and #2 of slot #2 and sub-channels #1 and #2 of slot #3 are reserved resources.

In (b) of FIG. 18, for example, similarly to (a) of FIG. 18, in slot #0 at which the resource reservation is started, PSCCH is transmitted and a resource of a subsequent slot (e.g., slot #2 or slot #3) are reserved. Further, in (b) of FIG. 18, in slot #0, PSSCH is also transmitted in one sub-channel, together with the transmission of PSCCH.

The application of Standalone PSCCH or Single sub-channel of PSCCH+PSSCH allows the initial PSCCH to be transmitted in, for example, one sub-channel; thus, each terminal is more likely to receive PSCCH without collision. In one example, even when the frequency resources of PSSCHs overlap, as long as the frequency resources of PSCCHs do not overlap, each terminal can receive PSCCH without collision and another terminal can recognize the resources reserved by the transmitter terminal.

Further, as compared to Standalone PSCCH, in Single sub-channel of PSCCH+PSSCH, PSSCH is transmitted even in slot #0, which improves the utilization efficiency of resources.

Incidentally, FIG. 18 illustrates the time resources with the time interval (e.g., gap) designated by "Time gap between initial transmission and retransmission" as examples of the reserved resources. However, the reserved resource may be, for example, a time resource with a long interval as compared with the time interval designated by "Time gap between initial transmission and retransmission" (e.g., a time resource with an interval indicated by "Resource reservation").

However, there is scope for further study on a method for indicating the frequency resource when implementing Standalone PSCCH or Single sub-channel of PSSCH+PSSCH.

For example, when allocation of zero (i.e., no frequency resource is allocated) or one sub-channel is indicated in order to indicate the frequency resource based on Standalone PSCCH or Single sub-channel of PSSCH+PSSCH, a terminal cannot reserve the frequency resource to be used in the subsequent slot in some cases.

Meanwhile, in V2X, for example, there is concern that a terminal cannot receive a signal transmitted from another terminal during transmitting the signal (also referred to as "Half duplex issue"). Thus, depending on a terminal status, some terminals cannot receive PSCCH including the initial SCI. Accordingly, for example, there is room for consideration on a method for identifying the reserved resource by the PSCCH that has been successfully received, even when the terminal cannot receive the initial PSCCH or a plurality of PSCCHs.

Thus, in an embodiment of the present disclosure, a description will be given of a method for configuring a frequency resource (e.g., sub-channel) more flexibly in sidelink communication.

[Overview of Communication System]

A communication system according to the present embodiment includes base station 300 and terminal 400.

Figure 19:
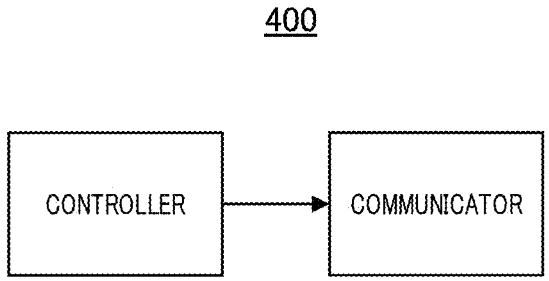
FIG. 19 is a block diagram illustrating a configuration example of part of a terminal.

FIG. 19 is a block diagram illustrating a configuration example of part of terminal 400 according to the present embodiment. In terminal 400 illustrated in FIG. 19, a controller (e.g., corresponding to control circuitry) determines first information indicating a frequency resource to be reserved, and second information indicating a mapping method for one or more channels (e.g., PSSCH) to the frequency resource. Further, a communicator (e.g., corresponding to communication circuitry) transmits the first information and the second information.

Further, in terminal 400 illustrated in FIG. 19, the communicator (e.g., corresponding to communication circuitry) receives the first information indicating the frequency resource to be reserved and the second information indicating the mapping method for the channels (e.g., PSSCH) to the frequency resource. The controller (e.g., corresponding to control circuitry) determines, based on the first information and the second information, determines the mapping of the channels.

[Configuration of Base Station]

Figure 20:
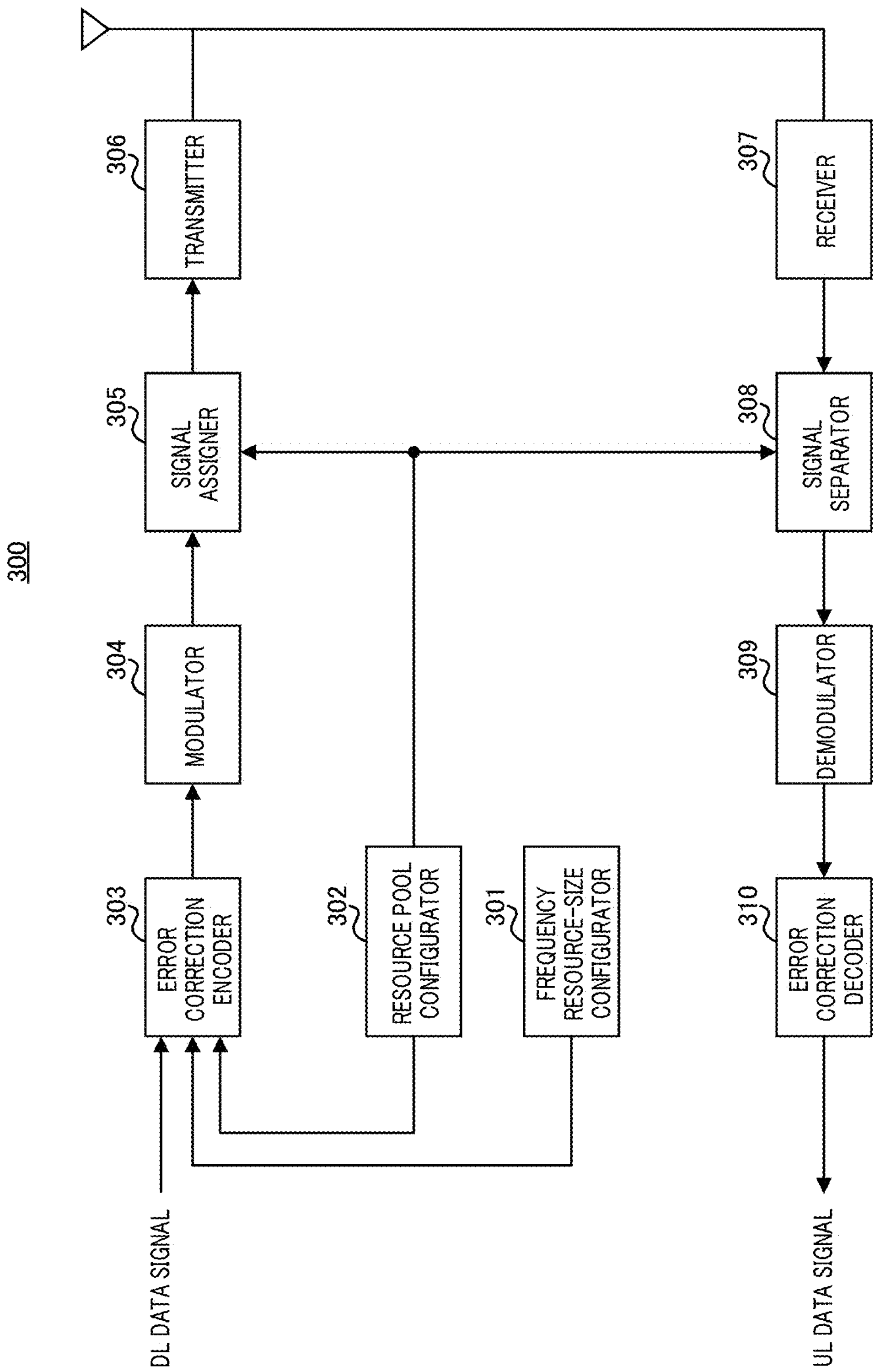
FIG. 20 is a block diagram illustrating a configuration example of a base station.

FIG. 20 is a block diagram illustrating a configuration example of base station 300 according to the present embodiment. In FIG. 20, base station 300 includes Frequency resource-size configurator 301, resource pool configurator 302, error correction encoder 303, modulator 304, signal assigner 305, transmitter 306, receiver 307, signal separator 308, demodulator 309, and error correction decoder 310.

Frequency resource-size configurator 301 determines, for example, a candidate for the size of frequency resource in a case where a signal is transmitted using some frequency resources among the frequency resources allocated for terminal 400. For example, Frequency resource-size configurator 301 may determine the candidate for frequency resource size for each resource pool allocated to terminal 400. Frequency resource-size configurator 301 outputs, to error correction encoder 303, higher layer signaling including frequency resource size configuration information indicating the determined size candidate.

The frequency resource size may be, for example, the number of sub-channels, or may be information indicating a proportion relative to an entirety of the frequency resources allocated for terminal 400 (an example will be described later).

Resource pool configurator 302 configures a resource pool used for sidelink for each terminal 400. For example, resource pool configurator 302 may generate information related to a time resource and a frequency resource of the resource pool (hereinafter referred to as the resource pool-configuration information). Resource pool configurator 302 outputs higher layer signaling including the resource pool-configuration information to error correction encoder 303. Resource pool configurator 302 also outputs the resource pool-configuration information to signal assigner 305 and signal separator 308.

Error correction encoder 303 takes a transmission data signal (DL data signal) and the higher layer signaling input from Frequency resource-size configurator 301 and resource pool configurator 302 as input, performs error correction encoding on the input signal, and outputs the encoded signal to modulator 304.

Modulator 304 performs modulation processing on the signal input from error correction encoder 303 and outputs the modulated data signal to signal assigner 305.

Signal assigner 305 assigns the data signal (e.g., DL data signal or higher layer signaling) input from modulator 304 to, for example, the resource available on a link (e.g., Uu link) between base station 300 and terminal 400. The formed transmission signal is output to transmitter 306.

For example, signal assigner 305 identifies (i.e., recognizes) a slot and a sub-channel available for sidelink communication, based on the information input from resource pool configurator 302. In a case where terminal 400 cannot perform transmission and reception at the same time in the link used for DL data (e.g., Uu link) and sidelink, for example, signal assigner 305 may then assign the data signal to a resource not used for sidelink.

Note that, the configuration of the resource pool may be different for each terminal 400. In this case, the slot available on the Uu link is different for each terminal 400.

Transmitter 306 performs radio transmission processing, such as up-conversion, on the signal input from signal assigner 305, and transmits the signal to terminal 400 via an antenna.

Receiver 307 receives the signal transmitted from terminal 400 via the antenna, performs radio reception processing such as down-conversion, and outputs the signal to signal separator 308.

Signal separator 308, for example, identifies the slot available on the Uu link, and the slot and the sub-channel available for the sidelink communication based on the information input from resource pool configurator 302. Signal separator 308 then separates the signal assigned to the resource available on the Uu link, which is input from receiver 307. Signal separator 308 outputs the separated signal (e.g., UL data signal) to demodulator 309.

Demodulator 309 performs demodulation processing on the signal input from signal separator 308, and outputs the resulting signal to error correction decoder 310.

Error correction decoder 310 decodes the signal input from demodulator 309, and obtains the received data signal (UL data signal) from terminal 400.

Note that, in the example illustrated in FIG. 20, base station 300 includes Frequency resource-size configurator 301 and resource pool configurator 302 and generates the higher layer signaling including the frequency resource size configuration information and the resource pool-configuration information; however, the present disclosure is not limited to this. For example, at least one of the frequency resource size configuration information and the resource pool-configuration information may be configured by an application layer called Pre-configured, for example, or may be configured in a subscriber identity module (SIM) in advance. In this case, base station 300 may use the preliminary configured information without generating the frequency resource size configuration information or the resource pool-configuration information. For example, base station 300 may recognize, based on the preliminary configured resource pool-configuration information, the slot available between base station 300 and terminal 400, and may output information indicating the slot available between base station 300 and terminal 400 to signal assigner 305 and signal separator 308.

Further, the present disclosure is not limited to a case where the configuration of the frequency resource (e.g., information on the frequency resource size) in the sidelink communication is configured (or indicated) from base station 300 to terminal 400 by, for example, the higher layer signaling (e.g., RRC) or the MAC. For example, in a case where the configuration of the frequency resource in the sidelink communication is specified in a specification (or standard), or configured in the SIM or the application layer, terminal 400 is operable without configuration from base station 300.

Further, in one example, when the mode of sidelink communication is "Mode 1," it is assumed that the information included in the SCI transmitted by the terminal in the sidelink is generated by base station 300. Thus, in Mode 1, base station 300 may generate SCI based on, for example, the frequency resource size configuration information and the resource pool-configuration information (the same processing as in SCI generator 410 of terminal 400 described later), and transmit the resulting SCI to terminal 400. Incidentally, the SCI may be included, for example, in the higher layer signaling and/or a physical layer signal (e.g., PDCCH).

[Configuration of Terminal]

Figure 21:
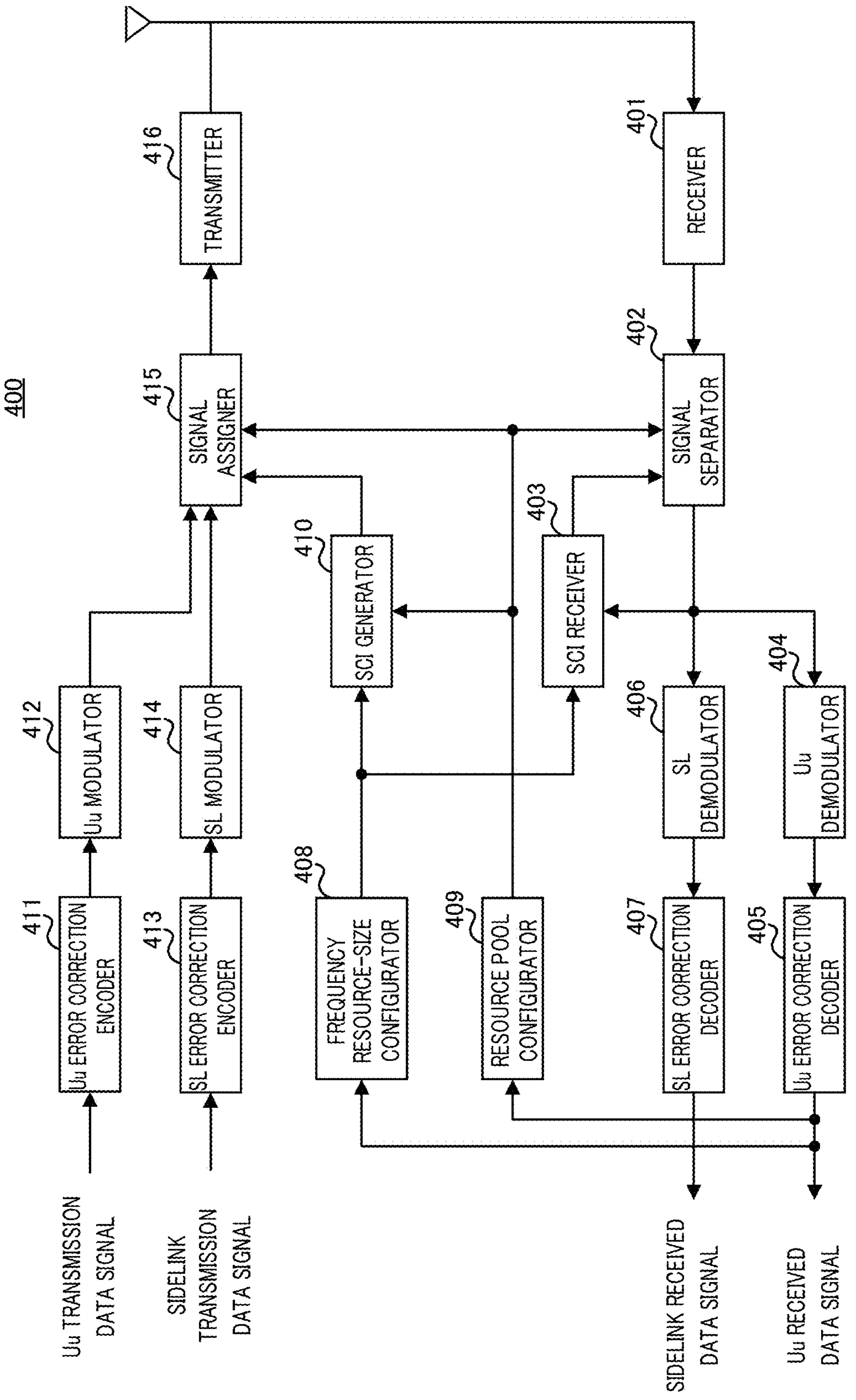
FIG. 21 is a block diagram illustrating a configuration example of the terminal.

FIG. 21 is a block diagram illustrating a configuration example of terminal 400 according to the present embodiment. In FIG. 21, terminal 400 includes receiver 401, signal separator 402, SCI receiver 403, Uu demodulator 404, Uu error correction decoder 405, SL demodulator 406, SL error correction decoder 407, Frequency resource-size configurator 408, resource pool configurator 409, SCI generator 410, Uu error correction encoder 411, Uu modulator 412, SL error correction encoder 413, SL modulator 414, signal assigner 415, and transmitter 416.

The control circuitry illustrated in FIG. 19 may include, for example, SCI receiver 403, Frequency resource-size configurator 408, resource pool configurator 409, and SCI generator 410. Further, the communication circuitry illustrated in FIG. 19 may include, for example, receiver 401 and transmitter 416.

Receiver 401 receives a received signal via an antenna, and outputs the signal to signal separator 402 after performing reception processing, such as down-conversion, on the signal.

Signal separator 402 separates a signal component corresponding to the link (e.g., Uu link) between base station 300 and terminal 400 from the signal input from receiver 401, based on the resource pool-configuration information input from resource pool configurator 409, and outputs the separated signal component to Uu demodulator 404.

In addition, signal separator 402 separates signal components of sidelink from the signal input from receiver 401, based on the resource pool-configuration information. Signal separator 402 then outputs, for example, a PSCCH signal among the signal components of sidelink to SCI receiver 403. Signal separator 402 also separates a PSSCH signal addressed to terminal 400 from the signal components of sidelink input from receiver 401 based on PSSCH resource allocation information input from SCI receiver 403, and outputs the separated signal to SL demodulator 406.

SCI receiver 403 demodulates and decodes the SCI input from signal separator 402. For example, when SCI receiver 403 attempts to demodulate and decode the SCI and successfully decodes the SCI (i.e., when SCI is detected), SCI receiver 403 identifies, based on the resource allocation information of PSSCH addressed to terminal 400 included in the SCI and the frequency resource size configuration information input from Frequency resource-size configurator 408, a candidate for the size of a frequency resource to which the PSSCH is mapped among frequency resources reserved for terminal 400. Frequency resource-size configurator 301 then determines the frequency resource (e.g., any of all, some, or none of the reserved frequency resources) to which PSSCH is mapped, based on, for example, the bit included in the SCI and the candidate for the frequency resource size, and outputs, to signal separator 402, PSSCH resource assignment information indicating the frequency resource and the time resource to which PSSCH is assigned. Incidentally, SCI receiver 403 may determine whether the information included in the SCI is information addressed to terminal 400, based on, for example, destination information included in the SCI.

Uu demodulator 404 performs demodulation processing on the signal input from signal separator 402, and outputs the resulting demodulated signal to Uu error correction decoder 405.

Uu error correction decoder 405 decodes the demodulated signal input from Uu demodulator 404, outputs the obtained higher layer signaling to Frequency resource-size configurator 408 and resource pool configurator 409, and outputs the obtained received data signal (or referred to as a Uu received data signal).

SL demodulator 406 performs demodulation processing on the signal input from signal separator 402, and outputs the resulting demodulated signal to SL error correction decoder 407.

SL error correction decoder 407 decodes the demodulated signal input from SL demodulator 406, and performs error detection such as the CRC on the decoded signal. When the decoded signal has no error, SL error correction decoder 407 outputs the obtained received data signal (or referred to as a sidelink received data signal).

Frequency resource-size configurator 408, for example, configures a candidate for the size of a frequency resource to which the PSCCH addressed to terminal 400 is assigned, based on the frequency resource size configuration information included in the higher layer signaling input from Uu error correction decoder 405. Frequency resource-size configurator 408 outputs, to SCI receiver 403 and SCI generator 410, the frequency resource size configuration information indicating the configured candidate for the frequency resource size.

Resource pool configurator 409, for example, configures a resource pool (e.g., time resource and frequency resource) used by terminal 400 for sidelink based on the resource pool-configuration information included in the higher layer signaling input from Uu error correction decoder 405. The resource pool to be configured may include, for example, one or both of a resource used by terminal 400 for transmission and a resource used by terminal 400 for reception. Resource pool configurator 409 outputs resource pool-configuration information to SCI generator 410, signal separator 402, and signal assigner 415.

SCI generator 410, for example, generates SCI including information on the frequency resource to which PSSCH is assigned. In one example, SCI generator 410 may generate SCI based on the information input from resource pool configurator 409 (e.g., information indicating the resource available for sidelink), the information input from Frequency resource-size configurator 408, and the amount of resources of data included in a transmission buffer (not illustrated). Further, SCI generator 410 may generate SCI including information indicating which of the candidates for the frequency resource size PSSCH is assigned to (i.e., information indicating any of candidates for the frequency resource size) among the reserved frequency resources in the slot that transmits the SCI. The SCI may also include, for example, information on the determined resource, information for identifying transmitter terminal 400 (e.g., transmission source ID), and information for identifying receiver terminal 400 (e.g., transmission destination ID). SCI generator 410 outputs the generated SCI to signal assigner 415.

For example, when the mode of sidelink communication is "Mode 2," terminal 400 generates SCI in SCI generator 410. Further, for example, in a case where base station 300 generates SCI and transmits the SCI to terminal 400 when the mode of sidelink communication is "Mode 1," terminal 400 may generate SCI based on the SCI transmitted from base station 300.

Uu error correction encoder 411 takes a Uu-link transmission data signal (UL data signal) as input, performs error correction encoding on the transmission data signal, and outputs the encoded signal to Uu modulator 412.

Uu modulator 412 modulates the signal input from Uu error correction encoder 411, and outputs the modulated signal to signal assigner 415.

SL error correction encoder 413 takes a sidelink transmission data signal (sidelink data signal) as input, performs error correction encoding on the transmission data signal, and outputs the encoded signal to SL modulator 414.

SL modulator 414 modulates the signal input from SL error correction encoder 413, and outputs the modulated signal to signal assigner 415.

Signal assigner 415 assigns, to a sidelink resource, a PSCCH signal including the SCI and a PSSCH signal including the sidelink data signal input from SL modulator 414, based on, for example, the information input from resource pool configurator 409 and the information input from SCI generator 410. Signal assigner 415 also assigns the signal input from Uu modulator 412 to a Uu-link resource (e.g., uplink data channel (Physical Uplink Shared Channel: PUSCH)), for example. Signal assigner 415 outputs the signal assigned to the resource to transmitter 416.

Transmitter 416 performs radio transmission processing, such as up-conversion, on the signal input from signal assigner 415 and transmits the signal.

In the example illustrated in FIG. 21, terminal 400 receives the higher layer signaling including the frequency resource size configuration information and the resource pool-configuration information; however, the present disclosure is not limited to this. For example, at least one of the frequency resource size configuration information and the resource pool-configuration information may be configured by the application layer called Pre-configured, for example, or may be configured in the SIM in advance. In this case, terminal 400 may use the preliminary configured information without receiving the frequency resource size configuration information or the resource pool-configuration information. For example, terminal 400 may recognize the resource available between base station 300 and terminal 400 and the resource available for sidelink based on the preliminary configured resource pool-configuration information, and may use the information on the resources in signal separator 402 and signal assigner 415.

Further, in FIG. 21, a description has been given with the case where the demodulator, the error correction decoder, the error correction encoder and the modulator are provided with configuration units different between in the Uu link and the sidelink; however, the present disclosure is not limited to this, and they may be provided with configuration units common in the Uu link and the sidelink.

[Operation of Terminal 400]

Next, an Operation Example of terminal 400 (see FIG. 21) will be described.

Figure 22:
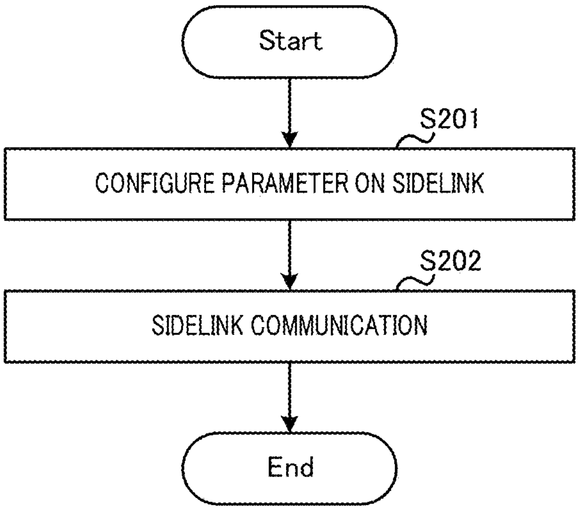
FIG. 22 is a flowchart illustrating an Operation Example of the terminal.

FIG. 22 is a flowchart illustrating exemplary processing in terminal 400.

Terminal 200 (e.g., transmitter terminal and receiver terminal) that performs transmission and reception in sidelink configures a parameter on the sidelink (S201). The parameter on the sidelink may include, for example, configurations of a time resource, a frequency resource (e.g., sub-channel), SL BWP, a resource pool, and a channel mapped in each slot.

The parameter on the sidelink may be indicated from the transmitter terminal to the receiver terminal by, for example, SCI. Alternatively, the parameter on the sidelink for terminal 200 may be specified in a specification (or standard), may be configured in the application layer called Pre-configured, may be configured in the SIM in advance, may be configured in a higher layer such as SIB called configured or other RRC, or may be configured in MAC, for example.

Terminal 200 performs sidelink communication (e.g., transmission and reception of data) based on the configured parameter (S202).

Next, an exemplary configuration method of the frequency resource (e.g., sub-channel) will be described.

In the present embodiment, for example, the transmitter terminal transmits, to the receiver terminal, SCI including information indicating a mapping method for PSSCH to the frequency resource reserved for the sidelink communication. The information indicating the mapping method for PSSCH to the reserved frequency resource may include, for example, information that PSSCH is mapped to either all of the frequency resources or some of the frequency resources, or that no PSSCH is mapped (i.e., none of the reserved frequency resources is used), among the reserved frequency resources.

Terminal 400 (e.g., transmitter terminal and receiver terminal) may determine, for example, the frequency resource to which PSSCH is mapped in each of the reserved time resources (e.g., slots), based on this indication.

Note that, the information indicating the reserved frequency resources and the information indicating the mapping method for PSSCH to the reserved frequency resources are different from each other. Thus, even when, for example, in a certain slot, PSSCH is assigned to some of the reserved frequency resources or no PSSCH is assigned, terminal 400 can identify the reserved frequency resource in another slot subsequent to the slot.

Thus, according to the present embodiment, for example, even when Standalone PSCCH or Single sub-channel of PSCCH+PSSCH is applied, terminal 400 can dynamically configure the assignment in the reserved frequency resource, and thus, the probability that PSCCH in which the SCI is transmitted collides with PSSCH of another UE can be reduced.

Note that, the candidate for the frequency resource size may be specified in a specification (or standard), may be configured in the SIM in advance, may be configured in the application layer called Pre-configured, may be configured in a higher layer such as SIB called configured or other RRC, or may be configured in MAC.

Moreover, one or more candidates for the frequency resource size may be configured. Further, the candidate for the frequency resource size may be selected (i.e., indicated) by the SCI from among all of the candidates for the frequency resource size. Besides, from among a plurality of predetermined candidates, options of the candidates for the frequency resource size may be indicated to terminal 400, and terminal 400 may select the candidate by the SCI from among the options. The options of the frequency resource size may be indicated, for example, in a higher layer such as RRC or in MAC.

Hereinafter, an Operation Example of terminal 400 will be described.

Operation Example 4-1 (Standalone PSCCH)

In Operation Example 4-1, an example in which Standalone PSCCH is applied will be described.

In Operation Example 4-1, for example, one-bit information (e.g., any of bit "0" and bit "1") is configured (i.e., added) to the SCI.

In the one-bit information, bit "0" may indicate, for example, mapping (i.e., assignment or use) of PSSCH to frequency resource (in other words, reserved frequency resource) allocated by "Frequency resource location of initial transmission and retransmission."

Meanwhile, in the one-bit information, bit "1" may indicate that, for example, PSSCH is not mapped (i.e., unassigned or unused) to the frequency resource allocated by "Frequency resource location of initial transmission and retransmission" in a slot in which the SCI including the one-bit information is transmitted or received.

For example, the transmitter terminal can indicate, to the receiver terminal, that PSSCH is not mapped in the slot in which the SCI is received (e.g., slot #0 in (a) of FIG. 18) by configuring the one-bit information included in the SCI to bit "1."

Further, the transmitter terminal can reserve, for the reception terminal, the frequency resource of PSSCH in the slot (e.g., slot #2 or #3 in (a) of FIG. 18) subsequent to the slot in which the SCI is received (e.g., slot #0 in (a) of FIG. 18), by using resource allocation information different from the one-bit information included in the SCI (e.g., "Frequency resource location of initial transmission and retransmission").

Operation Example 4-2 (Single Sub-Channel of PSCCH+PSSCH)

In Operation Example 4-2, an example in which Single sub-channel of PSSCH+PSSCH is applied will be described.

In Operation Example 4-2, for example, the one-bit information (e.g., any of bit "0" and bit "1") is configured (i.e., added) to the SCI.

In the one-bit information, bit "0" may indicate, for example, mapping (i.e., assignment or use) of PSSCH to the frequency resource (in other words, reserved frequency resource) allocated by "Frequency resource location of initial transmission and retransmission."

Meanwhile, in the one-bit information, bit "1" may indicate that, for example, the mapping of PSSCH to some of the frequency resources (e.g., one sub-channel) allocated by "Frequency resource location of initial transmission and retransmission" in a slot in which the SCI including the one-bit information is transmitted or received.

For example, the transmitter terminal can indicate, to the receiver terminal, that PSSCH is mapped to the one-sub-channel in the slot in which the SCI is received (e.g., slot #0 in (b) of FIG. 18) by configuring the one-bit information included in the SCI to bit "1."

Further, the transmitter terminal can reserve, for the reception terminal, the frequency resource of PSSCH in the slot (e.g., slot #2 or #3 in (b) of FIG. 18) subsequent to the slot in which the SCI is received (e.g., slot #0 in (b) of FIG. 18), by using resource allocation information different from the one-bit information included in the SCI (e.g., "Frequency resource location of initial transmission and retransmission").

In Operation Example 4-2, the one-sub-channel has been described as an example of some of the frequency resource indicated by the one-bit information, but the present disclosure is not limited to this. For example, some of the frequency resources indicated by the one-bit information may be a plurality of sub-channels or a plurality of PRBs in the frequency resources allocated by "Frequency resource location of initial transmission and retransmission."

Figure 23:
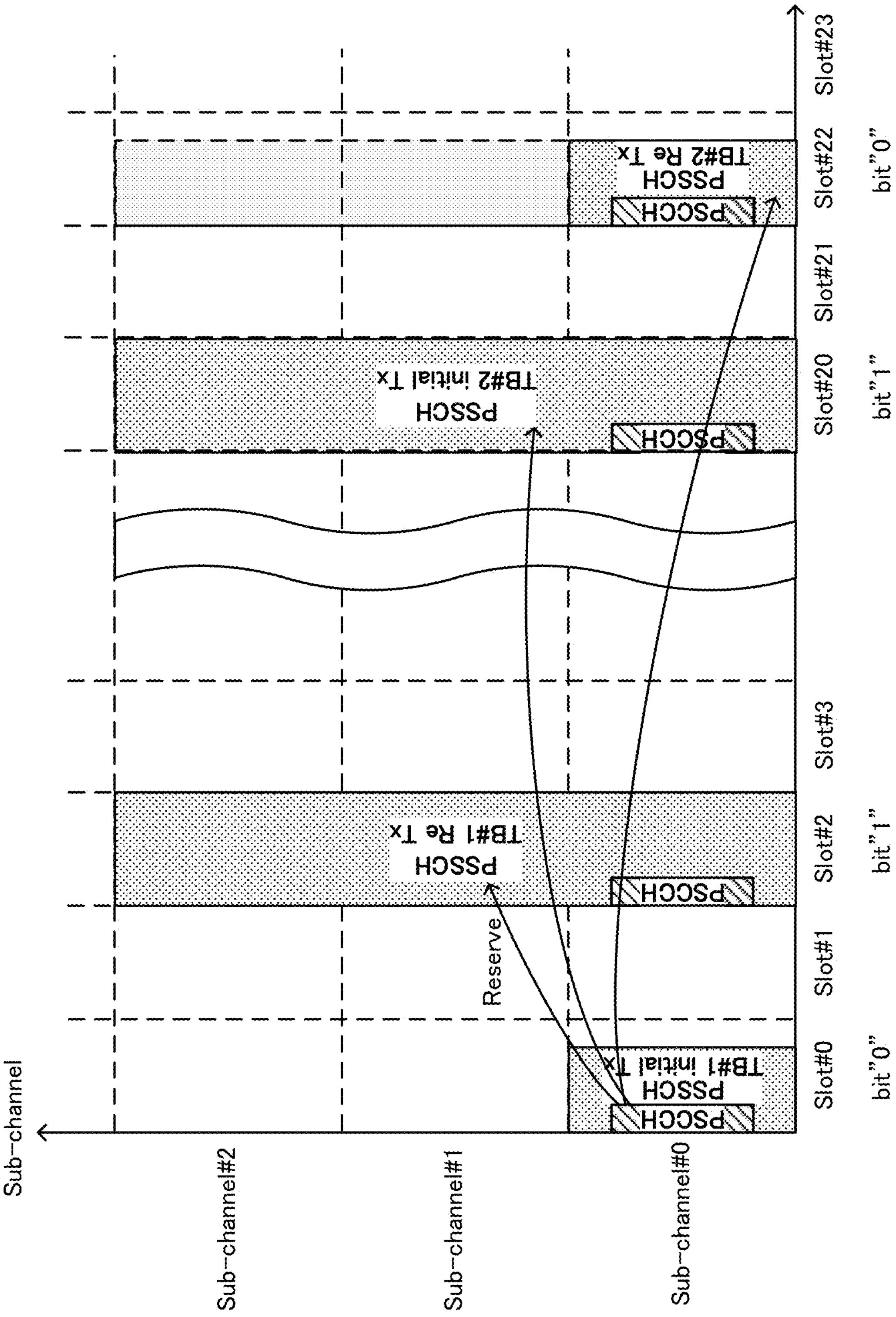
FIG. 23 illustrates an example of resource allocation in Operation Example 4-2.

Further, Operation Example 4-2 may be applied to the retransmission of TB as well as the initial transmission of TB. FIG. 23 illustrates an example in which Operation Example 4-2 is applied to the retransmission of TB. For example, in FIG. 23, in slot #0, bit "0" is indicated, and the frequency resource of the initial transmission of TB #1 is configured to some of frequency resources (e.g., one sub-channel). Moreover, for example, in FIG. 23, in slot #2, bit "1" is indicated, and the frequency resource of the retransmission of TB #1 is configured to frequency resources (e.g., three sub-channels) reserved for terminal 400. Furthermore, for example, in FIG. 23, in slot #20, bit "1" is indicated, and the frequency resource of the initial transmission of TB #2 is configured to the frequency resources (e.g., three sub-channels) reserved for terminal 400. Further, for example, in FIG. 23, in slot #22, bit "0" is indicated, and the frequency resource of the retransmission of TB #2 is limited to some of frequency resources (e.g., one sub-channel).

In FIG. 23, terminal 200 can assign TBs to some of the reserved frequency resources in both the initial transmission and the retransmission. This resource allocation can reduce the amount of resources to be used when all of the reserved frequency resources need not be allocated in the retransmission, and thus, interference and the probability of collision with resources transmitted by another UE can be reduced.

Operation Example 4-3

In Operation Example 4-3, an example of configuring a plurality of frequency resource sizes will be described.

For example, a bit (e.g., bit included in the SCI) that indicates the mapping of PSSCH to some or all of frequency resources among the frequency resources (e.g., sub-channels) allocated by "Frequency resource location of initial transmission and retransmission" are configured (i.e., added).

For example, a case will be described where two-bit information are configured.

The two-bit information may indicate, for example, a proportion of resources (i.e., frequency resource size), to which PSSCH is mapped, relative to the entirety of the frequency resource allocated by "Frequency resource location of initial transmission and retransmission," as follows.

bit "00:" All of resources bit "01:" ½ of resources bit "10:" ¼ of resources bit "11:" one sub-channel For example, in a case of bit "01" or bit "10;" that is, ½ of resources or ¼ of resources, terminal 400 may divide the number of sub-channels assigned by "Frequency resource location of initial transmission and retransmission" into two or four to determine the number of sub-channels to which PSSCH is mapped. In this case, when the number resulting from division is not an integer, terminal 400 may round down a fractional part to calculate the number of sub-channels as Floor (the numbers of sub-channels), or may round up the fractional part to calculate the number of sub-channels as Ceil (the numbers of sub-channels), for example.

Further, for example, in a case of bit "01;" that is, ½ of resources, terminal 400 may divide the number of sub-channels assigned by "Frequency resource location of initial transmission and retransmission" into two to generate two groups of sub-channels. Similarly, for example, in a case of bit "10;" that is, ¼ of resources, terminal 400 may divide the number of sub-channels assigned by "Frequency resource location of initial transmission and retransmission" into four to generate four groups of sub-channels. Terminal 400 then may select any one of the groups of sub-channels.

Note that, the candidates for frequency resource sizes (e.g., all resources, ½ of resources, ¼ of resources, or one sub-channel) are merely examples and may be other values. In addition, the candidates for frequency resource sizes may include the case where no PSSCH is assigned (PSSCH is unused) as in Operation Example 4-1.

The number of bits of information indicating the frequency resource size is not limited to two bits and may be another number of bits. For example, the number of bits in the SCI may be increased as the number of types of frequency resource size is greater.

Thus, even when PSSCH is mapped to some of sub-channels among the reserved frequency resources in a certain slot (e.g., a first slot) in the reserved time resources (e.g., slots), terminal 400 can reserve the frequency resource of PSSCH in a slot (e.g., subsequent slot) different from the slot in which the SCI is received.

Operation Examples 4-1 to 4-3 have been Each Described, Thus Far.

According to the present embodiment, terminal 200 determines one or more sub-channels to which PSSCH is mapped in each of a plurality of reserved slots based on, for example, indication information on use of a plurality of reserved sub-channels (e.g., use of all, use of some, or unuse).

This determination of the sub-channels allows terminal 400 to assign PSSCH based on the frequency resource size different in each of the plurality of reserved slots even when, for example, Standalone PSCCH or Single sub-channel of PSSCH+PSSCH is applied.

According to the present embodiment, even when, as in NR, there are more traffic types than in LTE, the frequency resource size can be dynamically configured. Thus, it is possible to improve efficiency of resource allocation (e.g., allocation or reservation of frequency resource) in radio communication (e.g., sidelink communication).

[Selection Method of Sub-Channel]

A description will be given of an exemplary selection method of one or more sub-channels configured to some of the frequency resources to which PSSCH is mapped among the reserved frequency resources.

For example, in Operation Example 4-2 and Operation Example 4-3, the sub-channel to be selected may be a sub-channel including the SCI. In V2X, for example, it is considered to include a PSCCH area in a PSSCH area. In this case, when a sub-channel transmitting PSCCH and a sub-channel transmitting PSSCH are identical, the number of sub-channels occupied by PSSCH and PSCCH can be reduced. For example, when PSSCH is mapped to one sub-channel, the sub-channel to be selected may be configured to one sub-channel including PSCCH. Further, when a plurality of sub-channels is selectable as in Operation Example 4-3, for example, among the groups of sub-channels obtained by dividing "Frequency resource location of initial transmission and retransmission," a group of sub-channels including PSCCH may be selected.

In addition, for example, in Operation Example 4-2 and Operation Example 4-3, the sub-channel to be selected may include a sub-channel having the lowest or highest sub-channel number among the frequency resources allocated by "Frequency resource location of initial transmission and retransmission." Further, when a plurality of sub-channels is selectable as in Operation Example 4-3, for example, among the groups of sub-channels obtained by dividing "Frequency resource location of initial transmission and retransmission," a group of sub-channels including a sub-channel having the lowest or highest sub-channel number may be selected.

Further, in Operation Example 4-2 and Operation Example 4-3, the sub-channel to be selected may include a sub-channel determined based on a value for identifying a UE, such as UE ID, RNTI, Layer-1 source ID, or Layer-1 destination ID, among the frequency resources allocated by "Frequency resource location of initial transmission and retransmission." For example, terminal 400 may select a sub-channel having a number obtained by adding, to the lowest sub-channel number among sub-channels assigned to terminal 400, a value of reminders resulting from dividing the value for identifying the UE by the number of sub-channels assigned to terminal 400. Further, when a plurality of sub-channels is selectable as in Operation Example 4-3, terminal 400 may select a group of sub-channels having a number obtained by adding, to the lowest sub-channel group number, a value of reminders resulting from dividing the value for identifying the UE by the number of sub-channel groups obtained by dividing "Frequency resource location of initial transmission and retransmission."

[TB Size (Transport Block Size)]

Meanwhile, for example, as in Operation Example 4-2 and Operation Example 4-3, when PSSCH is mapped to some of sub-channels, the amount of resources to which PSSCH is mapped is less than the amount of resources when PSSCH is mapped to all of the plurality of reserved sub-channels. Further, in NR, TB size is calculated based on, for example, the amount of resources in the time domain and the frequency domain to be allocated and the MCS indicated by the control signal (e.g., DCI).

Thus, for example, when the TB mapped to some of the frequency resources allocated to terminal 400 is initially transmitted and the TBS is calculated based on the amount of resources at the time of initial transmission, the number of systematic bits transmittable at the retransmission may be reduced even in a case where the amount of resources for the retransmission is larger than the amount of resources at the time of initial transmission. Under this situation, the PSSCH mapped to the resource for the retransmission becomes excessively high-quality, and the utilization efficiency of resources is reduced.

Accordingly, in the present embodiment, the TBS may be calculated based on the size of an entirety of the sub-channel indicated by "Frequency resource location of initial transmission and retransmission" when, for example, as in Operation Example 4-2 and Operation Example 4-3, the mapping method indicated by the SCI is the mapping of PSSCH to some of the sub-channels. In other words, regardless of the frequency resource (e.g., sub-channel) to which PSSCH is mapped, the TBS may be calculated based on the size of the entire reserved frequency resource.

This determination of TBS prevents the PSSCH mapped to the resource for the retransmission from becoming excessively high-quality. In addition, for example, the transmitter terminal can determine the number of systematic bits to be transmitted in consideration of the amount of resources for the retransmission at the time of initial transmission, and can configure the MCS.

Embodiment 5

In Embodiment 4, a method has been described in which the frequency resource size to which PSSCH is mapped is explicitly indicated by bits included in the SCI. In contrast, in the present embodiment, a method will be described in which the frequency resource size to which PSSCH is mapped is implicitly indicated.

According to the present embodiment, terminal 400 can indicate a plurality of frequency resource sizes to which PSSCH is mapped without increasing the number of bits of the SCI.

A base station and a terminal according to the present embodiment have the same basic configuration as those of base station 300 and terminal 400 according to Embodiment 4.

Hereinafter, a description will be given of an exemplary configuration method of a frequency resource (e.g., sub-channel) according to the present embodiment.

Operation Example 5-1

In Operation Example 5-1, "priority indication" or "QoS indication" included in the SCI is used to indicate the frequency resource size (i.e., mapping method for PSSCH). Note that, it is called "priority indication" in LTE, but it is possibly called differently in the SCI of NR (e.g., "QoS indication").

It has been studied to include information such as priority, latency, or reliability in "priority indication" or "QoS indication." It has been studied to perform control such as allocation of resources (resource allocation), collision-avoidance between terminals (congestion control), a transmission method in case of occurrence of plural data in a terminal (resolution of in-device coexistence issues), or transmission power control (power control) on the basis of "priority indication" or "QoS indication."

In Operation Example 5-1, terminal 400 may determine the frequency resource size of PSSCH based on, for example, "priority indication" or "QoS indication." In other words, the information included in "priority indication" or "QoS indication" is associated with the frequency resource size (i.e., mapping method for PSSCH).

For example, terminal 400 identifies the latency required for terminal 400 (i.e., the desired amount of delay) or the required reliability based on "priority indication" or "QoS indication."

Terminal 400 may then assign PSSCH to all of the reserved frequency resources when, for example, the identified latency is short or the identified reliability is high (e.g., when less than a threshold value). On the other hand, terminal 400 may not allocate the reserved frequency resources to PSSCH or assign PSSCH to some frequency resources when the identified latency is long or the identified reliability is low (e.g., when not less than the threshold value). Note that, some of the frequency resources may be configured based on any of Operation Examples 4-1 to 4-3, for example.

Note that, the frequency resource size to which PSSCH is mapped when the latency is short or the reliability is high is not limited to all of the reserved frequency resources, and the frequency resource size may be configured, for example, to a size larger than the frequency resource size to which PSSCH is mapped when the latency is long or the reliability is low.

For example, the mapping of PSSCH to all of the reserved frequency resources can improve the received quality of PSSCH as compared to the mapping of PSSCH to some of the reserved frequency resources, and thus, it becomes easier to meet the latency or reliability required for terminal 400.

The mapping between "priority indication" or "QoS indication" and the frequency resource size may be specified in a specification (or standard), may be configured in the SIM, may be configured in the application layer called Pre-configured, may be configured in a higher layer such as SIB called configured or other RRC, or may be configured in MAC.

Besides, terminal 400 may determine whether the TB included in the received PSSCH is the TB of the initial transmission or the TB of the retransmission based on, for example, Retransmission index included in the SCI.

According to Operation Example 5-1, terminal 400 can indicate the frequency resource size without using a new bit. Further, for example, terminal 400 can map PSSCH to the frequency resource size based on the frequency resource size suitable for a parameter corresponding to the configured value in LTE (e.g., required latency or reliability).

Operation Example 5-2

In Operation Example 5-2, Redundancy Version (RV) included in the SCI is used to indicate the frequency resource size (i.e., mapping method for PSSCH).

As described in Embodiment 2 (Operation Example 2-2), in NR, the retransmission control by indication of RV and New Data Indicator (NDI) is considered for the SCI as well as the DCI, for example.

As described in Embodiment 2, for example, in the circular buffer illustrated in FIG. 15, the greater the number of bits transmittable in one transmission is, the more likely the bit string corresponding to RV3 or RV1 is included in the bit string corresponding to RV0 or RV2, for example. In other words, for example, in FIG. 15, terminal 400 (e.g., receiver terminal) possibly receives the bit included in a bit string corresponding to RV3 or RV1 by receiving the bit string corresponding to RV0 or RV2.

Hence, it is assumed that the reception property in terminal 400 is hardly deteriorated even in a case where some of the plurality of RVs (e.g., one RV) is used to indicate that no PSSCH is mapped (i.e., none of the reserved frequency resources is used) as in Operation Example 4-1 or to indicate the mapping of PSSCH to some of the reserved frequency resource as in Operation Example 4-2.

Thus, in Operation Example 5-2, terminal 400 may determine the frequency resource size of PSSCH based on, for example, RV. That is, RV is associated with the frequency resource size (i.e., mapping method for PSSCH).

As Example 1 of Operation Example 5-2, terminal 400 may indicate the frequency resource size by using the bit used for indication of RV3 as follows. Note that, in the following, by way of example, RV0 is indicated by bit "00," RV1 is indicated by bit "01," RV2 is indicated by bit "10," and RV3 is indicated by bit "11."

In Example 1, bit "11" may indicate, instead of RV3, the mapping of PSSCH to some of the reserved frequency resources, or no mapping of PSSCH (i.e., none of the reserved frequency resources is used), and RV0.

00: RV0 and PSSCH is mapped to all of the reserved frequency resources

01: RV1 and PSSCH is mapped to all of the reserved frequency resources

10: RV2 and PSSCH is mapped to all of the reserved frequency resources

11: RV0 and PSSCH is mapped to some of the reserved frequency resources or no PSSCH is mapped Incidentally, for example, bit "11" may be associated with a small frequency resource size, as compared to bits 00, 01 and 10. In other words, for example, bits 00, 01 and 10 may be associated with a large frequency resource size (e.g., all or some of the reserved frequency resources), as compared to bit "11."

For example, when PSSCH is mapped to all of the reserved frequency resources, any of RV0, RV1, and RV2 can be configured, whereas when PSSCH is mapped to some of the reserved frequency resources, one of RV0s can be configured. However, when PSSCH is mapped to some of the reserved frequency resources, it is assumed to be the initial transmission of the TB. Thus, even in a case where the RV configurable when PSSCH is mapped to some of the reserved frequency resources is one of the RVs that are likely to be used at the time of initial transmission, the retransmission efficiency is hardly deteriorated.

In Example 1, a case has been described in which bit "11" corresponding to RV3 is used to indicate the frequency resource size different from the bits corresponding to the other RVs, but a bit corresponding to another RV different from RV3 (e.g., RV1) may be used to indicate the interval different from the bits corresponding to the other RVs.

Furthermore, as Example 2 of Operation Example 5-2, two of the plurality of RVs (e.g., RV1 and RV3) may be used to indicate the mapping of PSSCH to some of the reserved frequency resources as in Operation Example 4-2. In the case of Example 2, instead of RV1 and RV3, RV0 or RV2 may be configured as follows:

00: RV0 and PSSCH is mapped to all of the reserved frequency resources

01: RV0 and PSSCH is mapped to some of the reserved frequency resources

10: RV2 and PSSCH is mapped to all of the reserved frequency resources

11: RV2 and PSSCH is mapped to some of the reserved frequency resources

In the manner described above, when the mapping of PSSCH to some of the reserved frequency resources is indicated instead of the indication of two states of RV (e.g., RV1 and RV3), terminal 400 can support an operation of mapping PSSCH to some of the reserved frequency resources not only at the time of initial transmission (e.g., in RV0) but also at the time of retransmission (e.g., in RV2).

In addition, for example, when all of the reserved frequency resources need not be allocated in the retransmission, terminal 400 can reduce the amount of resources to be used by selecting the mapping of PSSCH to some of the reserved frequency resources, and thus, interference and the probability of collision with resources transmitted by another UE can be reduced.

Incidentally, in Operation Example 5-2, the RV may indicate no mapping of PSSCH, instead of (or in addition to) indicating the mapping of PSSCH to some of the reserved frequency resources.

Operation Example 5-3

In Operation Example 5-3, "RV" and "Retransmission index" included in the SCI are used to indicate the frequency resource size (i.e., mapping method for PSSCH).

"Retransmission index" is information indicating whether it is the initial transmission or the retransmission.

In Operation Example 5-3, terminal 400 may determine the frequency resource size of PSSCH based on, for example, "RV" and "Retransmission index" (e.g., information indicating retransmission of data). In other words, combinations of "RV" and "Retransmission index" (transmission type) are associated with the frequency resource size (i.e., mapping method for PSSCH).

For example, depending on whether it is the initial transmission or the retransmission, the types of available RVs is limited, and the mapping of PSSCH to some of the reserved frequency resources is thus indicated instead.

For example, in a bit string of three bits composed of RV with two-bits and Retransmission index with one-bit, the front two bits are used for "RV," and the last one-bit is used for "Retransmission index." Further, for example, "Retransmission index" (e.g., the third bit of the three bits) indicates the initial transmission in the case of zero and indicates the retransmission in the case of one. Further, for example, for "RV," either RV0 or RV3 is configured for the initial transmission whereas either RV2 or RV1 is configured for the retransmission.

In this case, RV, an interval, and a transmission type (initial transmission or retransmission) may be configured for the bit string of three-bit (e.g., 000 to 111) as follows:

000: RV0, PSSCH is mapped to all of the reserved frequency resources, and initial transmission 001: RV2, PSSCH is mapped to all of the reserved frequency resources, and retransmission 010: RV0, PSSCH is mapped to some of the reserved frequency resources, and initial transmission 011: RV2, PSSCH is mapped to some of the reserved frequency resources, and retransmission 100: RV3, PSSCH is mapped to all of the reserved frequency resources, and initial transmission 101: RV1, PSSCH is mapped to all of the reserved frequency resources, and retransmission 110: RV3, PSSCH is mapped to some of the reserved frequency resources, and initial transmission 111: RV1, PSSCH is mapped to some of the reserved frequency resources, and retransmission For example, in the initial transmission, RV0 or RV3 is selected which may include more systematic bits as compared to RV1 and RV2 whereas, in the retransmission, RV1 or RV2 is selected which may include more parity bits not included in the initial transmission.

According to Operation Example 5-3, although the number of selectable RVs in each of the initial transmission and the retransmission is reduced, RVs suitable for each of the initial and the retransmission are included in the option; thus, the deterioration of the received quality in terminal 400 can be suppressed.

Incidentally, in Operation Example 5-3, "RV" and "Retransmission index" may indicate no mapping of PSSCH, instead of (or in addition to) indicating the mapping of PSSCH to some of the reserved frequency resources.

Operation Example 5-4

In Operation Example 5-4, an HARQ process number included in the SCI (or may be also referred to as HARQ process ID) is used to indicate the frequency resource size (i.e., mapping method for PSSCH).

In NR, supporting a plurality of processes has been considered, and the HARQ process ID may be indicated by the SCI.

In Operation Example 5-4, terminal 400 may determine the frequency resource size of PSSCH based on, for example, the HARQ process ID. In other words, the HARQ process ID is associated with the frequency resource size (i.e., mapping method for PSSCH).

For example, for each HARQ process, mapping of PSSCH to all of the reserved frequency resources or mapping of PSSCH to some of the reserved frequency resources may be configured.

Note that, for example, a configuration method for each HARQ process may be specified in a specification (or standard), may be configured in the SIM in advance, may be configured in the application layer called Pre-configured, may be configured in a higher layer such as SIB called configured or other RRC, or may be configured in MAC.

Operation Examples 5-1 to 5-4 have been Each Described, Thus Far.

Note that, any two or more Operation Examples may be combined from among the Operation Example 5-1 to Operation Example 5-4.

In the present embodiment, the frequency resource size of PSSCH is implicitly indicated by the information specified for another purpose. Thus, according to the present embodiment, for example, in sidelink, new information need not be added to, e.g., a parameter specified in LTE in order to indicate the frequency resource size of PSSCH; thus, it is possible to reduce the overhead of signaling.

Embodiment 6

In NR V2X, for example, transmitting the SCI in two stages has been discussed.

For example, the SCI in the first stage (e.g., also referred to as first SCI) is mapped to PSCCH, and the SCI in the second stage (e.g., also referred to as second SCI) is mapped to a part of a PSSCH area.

The first SCI can be received, for example, in another terminal in addition to the receiver terminal (i.e., transmission destination terminal of the SCI). The other terminal may perform sensing to recognize a reservation status of the resource based on, for example, the first SCI.

In contrast, as for the second SCI, for example, a resource amount or a resource area is indicated by the first SCI. Further, it is also considered that the second SCI is received at the receiver terminal and not received in another terminal.

Thus, for example, by the first SCI including information available for sensing in another terminal different from the transmission destination terminal of the SCI and not including information not used for sensing, the number of bits of the first SCI can be further reduced. With such configuration of the first SCI, for example, the first SCI can be transmitted with a low coding rate (i.e., redundantly) and thereby can be easily received in another terminal.

Further, for example, the second SCI may be received in the receiver terminal alone which is the transmission destination terminal of the SCI, and thus, for example, the second SCI may be transmitted at a coding rate receivable in the receiver terminal.

In the present embodiment, a method for indicating the frequency resource by the SCI in two stages will be described.

A base station and a terminal according to the present embodiment have the same basic configuration as those of base station 300 and terminal 400 according to Embodiment 4.

Hereinafter, an Operation Example of terminal 400 according to the present embodiment will be described.

Operation Example 6-1

In Operation Example 6-1, for example, terminal 400 transmits, to the receiver terminal, the first SCI including information on the frequency resource in Embodiment 4.

According to Operation Example 6-1, for example, another terminal different from the receiver terminal can also receive the first SCI. The other terminal different from the receiver terminal can recognize, for example, the frequency resource to which PSSCH is mapped.

For example, the other terminal may use the information on the frequency resource to which PSSCH is mapped for interference measurement. For example, in Operation Example 4-1 of Embodiment 4, PSSCH is not mapped to the frequency resource, and thus, Operation Example 6-1 is effective.

Further, since terminal 400 can identify the frequency resource to which PSSCH is mapped from the first SCI, for example, when PSSCH is mapped to some of the frequency resources in Operation Example 4-2 or Operation Example 4-3 of Embodiment 4, the area to which the second SCI is assigned can be changed according to the area to which PSSCH is actually assigned.

Operation Example 6-2

In Operation Example 6-2, for example, terminal 400 transmits, to the receiver terminal, the second SCI including information on the frequency resource in Operation Example 4-2 or Operation Example 4-3 of Embodiment 4.

According to Operation Example 6-2, for example, the number of bits transmitted in the first SCI can be reduced, and the coding rate of the first SCI can be also reduced, which enhances the probability that the other terminal can receive the SCI.

Further, in Operation Example 6-2, the receiver terminal cannot identify the frequency resource to which PSSCH is mapped from the first SCI. Accordingly, the receiver terminal, for example, may configure the area to which the second SCI is assigned to the same sub-channel as PSCCH, assuming that PSSCH is mapped to some of the frequency resources in Operation Example 4-2 or Operation Example 4-3 of Embodiment 4.

Alternatively, in Operation Example 4-2 or Operation Example 4-3 of Embodiment 4, terminal 400 may configure the area to which the second SCI is assigned to a frequency domain having the lowest number of sub-channels.

Embodiment 7

In Embodiment 4, a description has been given of the method for indicating the frequency resource (i.e., frequency resource size) to which PSSCH is mapped among the frequency resources allocated by, for example, "Frequency resource location of initial transmission and retransmission" by the bits included in the SCI.

In the present embodiment, for example, a description will be given of a method for making it possible to allocate different frequency resources in a plurality of slots by including, in a single SCI, information on allocation of frequency resource in each of a plurality of time resources to be reserved (e.g., slots).

According to the present embodiment, for example, it is possible to improve the flexibility of frequency resource allocation as compared to Embodiment 4.

A base station and a terminal according to the present embodiment have the same basic configuration as those of base station 300 and terminal 400 according to Embodiment 4.

Hereinafter, an Operation Example of terminal 400 according to the present embodiment will be described.

Operation Example 7-1

In Operation Example 7-1, the SCI includes information on the allocation of frequency resources in a plurality of slots.

As an example, a case will be described where a single SCI includes information on the allocation of frequency resources for four slots. In this case, terminal 400 may indicate by the SCI, for example, information on the allocation of the frequency resources for the four slots among the reserved time resources.

Figure 24:
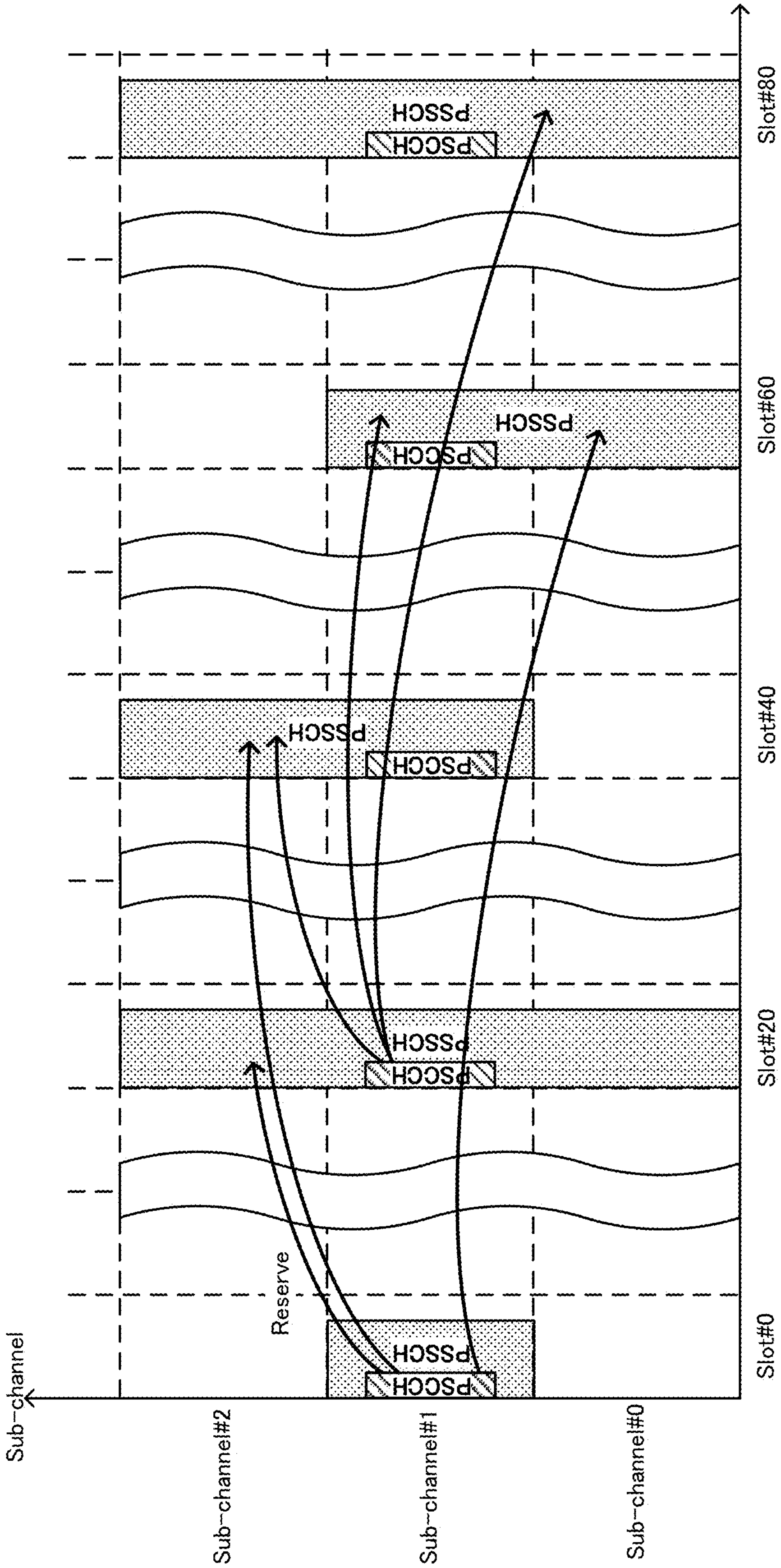
FIG. 24 illustrates an example of resource allocation in Operation Example 7-1.

FIG. 24 illustrates an example of resource allocation in Operation Example 7-1.

In FIG. 24, an interval indicated by "Resource reservation" included in the SCI is 20 ms, and the first allocated resource in the time domain is slot #0, for example.

As illustrated in FIG. 24, terminal 400 may include the following information in the information on the allocation of the frequency resources (e.g., resource indication value (RIV)) in the SCI of slot #0.

Sub-channel #1

Sub-channels #0, #1, and #2

Sub-channels #1 and #2

Sub-channels #0 and #1

The frequency resources for the above four slots indicated in slot #0 correspond to slot #0, slot #20, slot #40, and slot #60, respectively.

Terminal 400 that has received the SCI in slot #0 can recognize the frequency resource allocation for four slots from slot #0. In other words, terminal 400 can reserve, for example, the frequency resources for four slots from slot #0 based on the single SCI. Further, as in the above example, the frequency resources for the four slots can be configured for each slot, for example.

Further, as illustrated in FIG. 24, terminal 400 may include the following information in the information on the allocation of the frequency resources (e.g., RIV) in the SCI of slot #20.

Sub-channels #0, #1, and #2

Sub-channels #1 and #2

Sub-channels #0 and #1

Sub-channels #0, #1, and #2

The frequency resources for the above four slots indicated in slot #20 correspond to slot #20, slot #40, slot #60, and slot #80, respectively.

Terminal 400 that has received the SCI in slot #20 can recognize the frequency resource allocation for four slots from slot #20. In other words, terminal 400 can reserve, for example, the frequency resources for four slots from slot #20 based on the single SCI. Further, as in the above example, the frequency resources for the four slots can be configured for each slot, for example.

According to Operation Example 7-1, the frequency resources in the plurality of slots can be flexibly reserved by the single SCI.

Incidentally, the above-described allocation of the frequency resources (e.g., sub-channels) for the four slots is an example, and may be another allocation of the sub-channels. Further, the number of slots that can indicate the frequency resources by the single SCI is not limited to four slots, and may be another number of slots.

Operation Example 7-2

In Operation Example 7-2, the SCI includes information on the allocation of frequency resources in a plurality of slots.

As an example, a case will be described where a single SCI includes information on the allocation of frequency resources for four slots. In this case, terminal 400 may indicate by the SCI, for example, information on the allocation of the frequency resources for the four slots among the reserved time resources.

Figure 25:
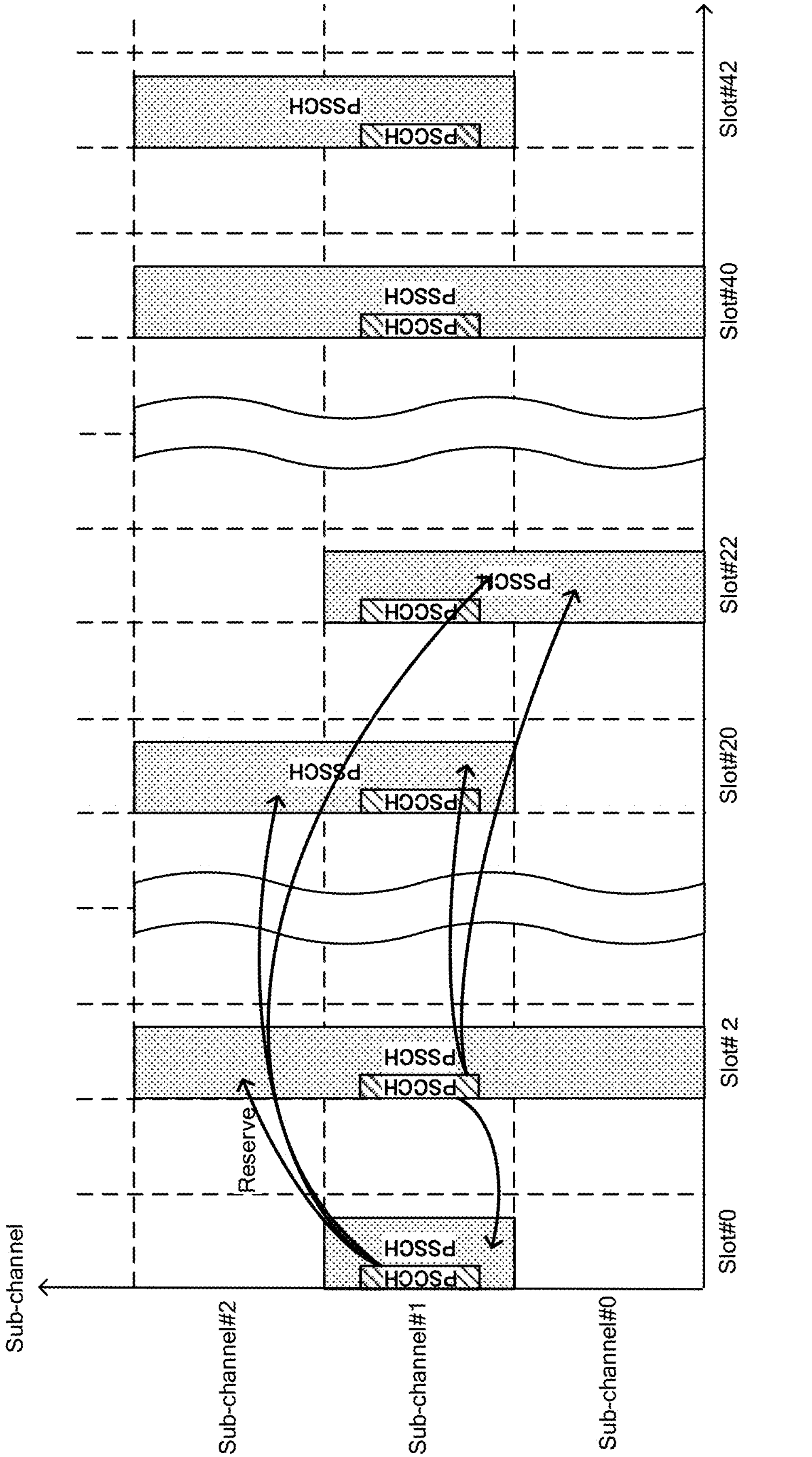
FIG. 25 illustrates an example of resource allocation in Operation Example 7-2.

FIG. 25 illustrates an example of resource allocation in Operation Example 7-2.

In FIG. 25, an interval indicated by "Resource reservation" included in the SCI is 20 ms, a time interval (or gap) between the initial transmission and the retransmission indicated by "Time gap between initial transmission and retransmission" is two slots, and the first allocated resource in the time domain is slot #0, for example.

As illustrated in FIG. 25, terminal 400 may include the following information in the information on the allocation of the frequency resources (e.g., RIV) in the SCI of slot #0.

Sub-channel #1

Sub-channels #0, #1, and #2

Sub-channels #1 and #2

Sub-channels #0 and #1

The frequency resources for the above four slots indicated in slot #0 correspond to slot #0, slot #2, slot #20, and slot #22, respectively. Incidentally, in FIG. 25, slot #2 and slot #22 are resources for the retransmission to data (e.g., PSSCH) to be transmitted in slot #0 and slot #20.

Terminal 400 that has received the SCI in slot #0 can recognize the frequency resource allocation for four slots from slot #0. In other words, terminal 400 can reserve, for example, the frequency resources for four slots from slot #0 based on the single SCI. Further, as in the above example, the frequency resources for the four slots can be configured for each slot, for example.

In Operation Example 7-2, for example, terminal 400 may also indicate the frequency resource for the initial transmission in slot #2 and slot #22, which are the resources for the retransmission illustrated in FIG. 25. This is because terminal 400 calculates TBS based on the amount of frequency resources at the initial transmission.

For example, as illustrated in FIG. 25, terminal 400 may include the following information in the information on the allocation of the frequency resources (e.g., RIV) in the SCI of slot #2.

Sub-channel #1

Sub-channels #0, #1, and #2

Sub-channels #1 and #2

Sub-channels #0 and #1

The frequency resources for the above four slots indicated in slot #2 correspond to slot #0, slot #2, slot #20, and slot #22, respectively. The frequency resources for the above four slots indicated in slot #2 (at the time of retransmission) are the same as the frequency resources for the four slots indicated in slot #0 (at the time of initial transmission), for example.

Similarly, in slot #22, which is a resource for retransmission, for example, frequency resources similar to the frequency resources for the four slots indicated in slot #20, which is a resource for the initial transmission, may be indicated. Similarly, in slot #42, which is a resource for retransmission, for example, frequency resources similar to the frequency resources for the four slots indicated in slot #40, which is a resource for the initial transmission, may be indicated.

According to Operation Example 7-2, for example, in FIG. 25, even when the SCI of slot #0 cannot be received due to the Half duplex issue or other factors, terminal 400 (receiver terminal) can calculate, based on the SCI of slot #2, the TBS of PSSCH of slot #2 from the frequency resource of slot #0 and thus can receive PSSCH of slot #2.

Further, according to Operation Example 7-2, the frequency resources in the plurality of slots can be flexibly reserved by the single SCI.

Incidentally, the above-described allocation of the frequency resources (e.g., sub-channels) for the four slots is an example, and may be another allocation of the sub-channels. Further, the number of slots that can indicate the frequency resources by the single SCI is not limited to four slots, and may be another number of slots.

Operation Example 7-3

In Operation Example 7-3, the SCI includes information on the allocation of frequency resources in a plurality of slots. Moreover, in Operation Example 7-3, the allocation of frequency resources included in the SCI is periodically repeated for every certain time interval (e.g., interval).

As an example, a case will be described where a single SCI includes information on the allocation of frequency resources for two slots. In this case, terminal 400 may indicate by the SCI, for example, information on the allocation of the frequency resources for the two slots among the reserved time resources.

For example, it is assumed that an interval indicated by "Resource reservation" included in the SCI is 20 ms and the first allocated resource in the time domain is slot #0. In this case, terminal 400 may include the following information in the information on the allocation of the frequency resources (e.g., resource indication value (RIV)) in the SCI of slot #0.

Sub-channel #1

Sub-channels #0, #1, and #2

For example, among the frequency resources for the above-described two slots indicated in slot #0, sub-channel #1 corresponds to slots #0, #40, #80, and so forth with a period of 40 ms, which is an interval twice as long as the interval of 20 ms, starting from the first slot (e.g., slot #0). Meanwhile, among the frequency resources for the above-described two slots indicated in slot #0, sub-channels #0, #1, and #2 correspond to slots #20, #60, #100, and so forth with a period of 40 ms, which is an interval twice as long as the interval of 20 ms, starting from the second slot (e.g., slot #20).

Further, terminal 400 may include the following information in the information on the allocation of the frequency resources (e.g., resource indication value (RIV)) in the SCI of slot #20.

Sub-channels #0, #1, and #2

Sub-channel #1

Similarly, for example, among the frequency resources for the above-described two slots indicated in slot #20, sub-channels #0, #1, and #2 correspond to slots #20, #60, and #100, and so forth with a period of 40 ms, which is an interval twice as long as the interval of 20 ms, starting from the first slot (e.g., slot #20). Meanwhile, among the frequency resources for the above-described two slots indicated in slot #20, sub-channel #1 corresponds to slots #40, #80, and #120, and so forth with a period of 40 ms, which is an interval twice as long as the interval of 20 ms, starting from the second slot (e.g., slot #40).

Figure 26:
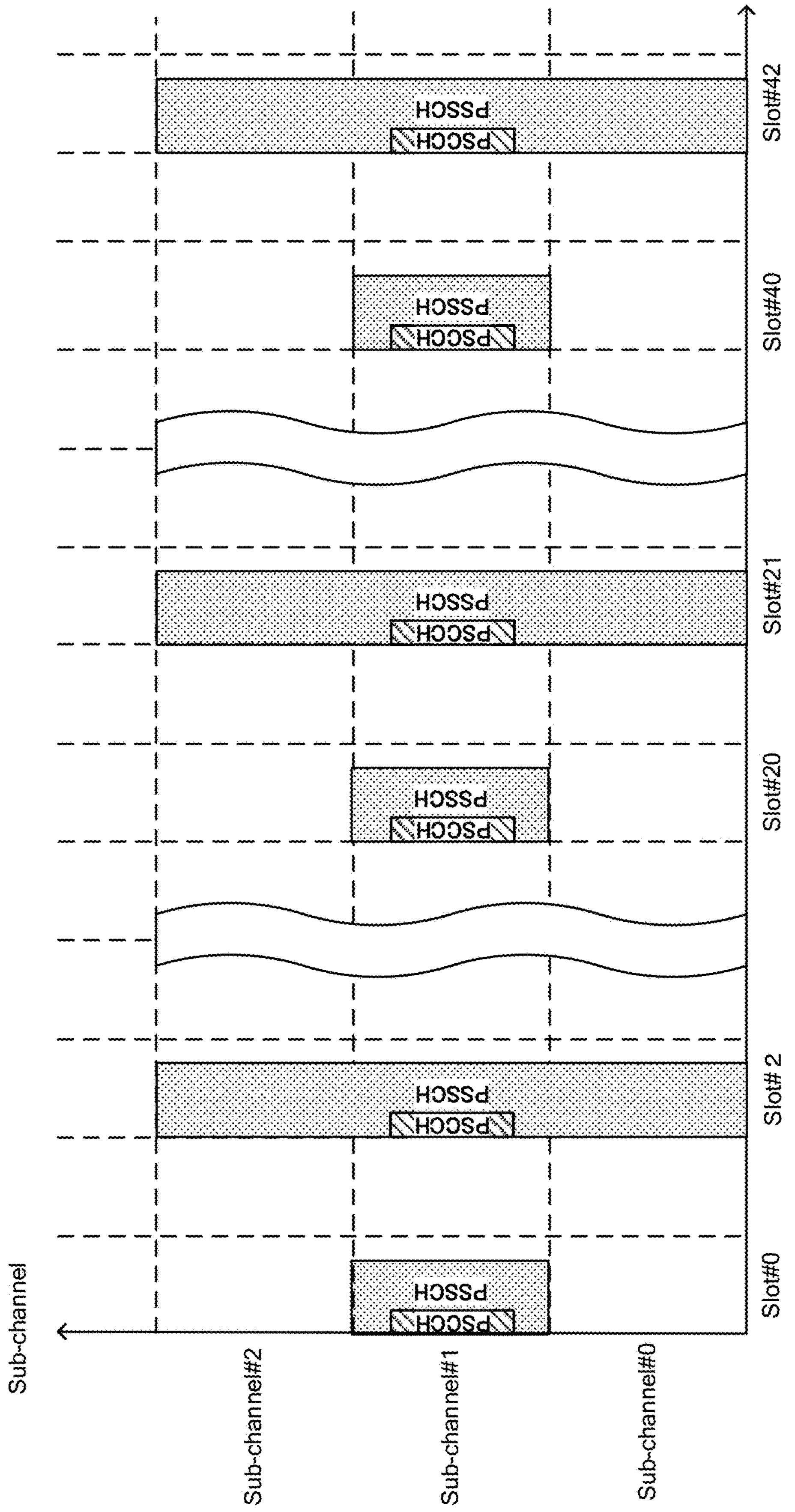
FIG. 26 illustrates an example of resource allocation in Operation Example 7-3.

Further, as a variation of Operation Example 7-3, the frequency resources may be made different between the resources for the initial transmission and the resources for retransmission as illustrated in FIG. 26.

For example, in FIG. 26, terminal 400 may indicate by the SCI, information on the allocation of the frequency resources for the two slots among the reserved time resources.

In FIG. 26, an interval indicated by "Resource reservation" included in the SCI is 20 ms, and the first allocated resource in the time domain is slot #0, for example.

As illustrated in FIG. 26, terminal 400 may include the following information in the information on the allocation of the frequency resources (e.g., RIV) in the SCI of slot #0.

Sub-channel #1

Sub-channels #0, #1, and #2

For example, among the frequency resources for the above-described two slots indicated in slot #0, sub-channel #1 corresponds to slot #0, slot #20, and slot #40, and so forth, which are resources for the initial transmission with a period of 20 ms-interval starting from the first slot (e.g., slot #0). Meanwhile, among the frequency resources for the above-described two slots indicated in slot #0, sub-channels #0, #1, and #2 correspond to slot #2, slot #22, and slot #42, and so forth, which are resources for the retransmission with a period of 20 ms-interval starting from the second slot (e.g., slot #2).

Further, as illustrated in FIG. 26, terminal 400 may include the following information in the information on the allocation of the frequency resources (e.g., RIV) in the SCI of slot #2.

Sub-channel #1

Sub-channels #0, #1, and #2

For example, among the frequency resources for the above-described two slots indicated in slot #2, sub-channel #1 corresponds to slot #0, slot #20, and slot #40, and so forth, which are resources for the initial transmission with a period of 20 ms-interval starting from the slot, which is the resource for the initial transmission corresponding to the retransmission resource of slot #2 (e.g., slot #0). Meanwhile, among the frequency resources for the above-described two slots indicated in slot #2, sub-channels #0, #1, and #2 correspond to slot #2, slot #22, and slot #42, and so forth, which are resources for the retransmission with a period of 20 ms-interval starting from slot #2.

In other words, in FIG. 26, the frequency resources for the above two slots indicated in slot #2 (at the time of retransmission) are the same as the frequency resources for the two slots indicated in slot #0 (at the time of initial transmission), for example.

Furthermore, in Operation Example 7-3, the TBS may be calculated according to, for example, the amount of resources for the initial transmission, may be calculated according to the amount of resources for the retransmission, or may be defined in advance. Alternatively, the TBS may be calculated according to, for example, the greater amount of resources of the resources for the initial transmission and the resources for the retransmission.

Incidentally, the above-described allocation of the frequency resources (e.g., sub-channels) for the two slots is an example, and may be another allocation of the sub-channels. Further, the number of slots that can indicate the frequency resources by the single SCI is not limited to two slots, and may be another number of slots.

Operation Example 7-4

In Operation Example 7-4, one configuration is selected (i.e., indicated) by the SCI from among the configurations (e.g., patterns of frequency resources) of frequency resource allocation in a plurality of time resources.

Incidentally, the plurality of configurations (i.e., the plurality of patterns) of frequency resource allocation may be specified in a specification (or standard), may be configured in the SIM, may be configured in the application layer called Pre-configured, may be configured in a higher layer such as SIB called configured or other RRC, or may be configured in MAC.

FIG. 27 illustrates examples of four patterns (patterns A, B, C, and D) of the frequency resource allocation. Each of the four patterns illustrated in FIG. 27 includes, for example, the allocation of frequency resources for the four slots.

Terminal 400 may indicate, to the receiver terminal, by the SCI (e.g., two-bit information), the selected pattern from among the four patterns, for example.

According to Operation Example 7-4, since the configurations of the frequency resource allocation for the plurality of slots can be indicated by the pattern, the number of indication bits in the SCI can be reduced as compared with the case where the frequency resource allocation for each of the plurality of slots is individually indicated.

Meanwhile, terminal 400 may indicate, by the SCI, for example, an association between the slot in which the SCI is transmitted and the first to fourth slots illustrated in FIG. 27.

For example, in the slot in which the SCI is transmitted, slot #0 which is the current slot corresponds to the third slot illustrated in FIG. 27, and when the interval is 20 ms and Pattern B is indicated, the following allocation is performed in order from the current slot (third slot).

slot #0: sub-channels #3 and #4 (third slot)

slot #20: sub-channels #3 and #4 (fourth slot)

slot #40: sub-channels #1 and #2 (first slot)

slot #60: sub-channels #1 and #2 (second slot)

The receiver terminal may identify frequency resources in the plurality of slots based on, for example, information indicating the pattern and information indicating the association between the slot included in the pattern and the slot in which the SCI is transmitted.

The frequency allocation can be cyclically configured by, for example, making different the association between the slot in which the SCI is transmitted and the slots illustrated in FIG. 27.

Incidentally, the above-described allocation of the frequency resources (e.g., sub-channels) for the four slots is an example, and may be another allocation of the sub-channels. Further, the number of slots that can indicate the frequency resources by the single SCI is not limited to four slots, and may be another number of slots. The number of patterns is not limited to the four patterns, and may be another number of patterns.

Operation Examples 7-1 to 7-4 have been Each Described, Thus Far.

Embodiments of the present disclosure have been each described, thus far.

OTHER EMBODIMENTS

1. In Embodiments 1 to 3 related to the configuration of time resources, information on intervals may be included, for example, in the first SCI. When the information on the intervals is included in the first SCI, another terminal different from the receiver terminal can easily receive (i.e., monitor or sense) the SCI, so that an interval of transmission time can be easily grasped and collision of resources can be reduced.

Alternatively, in Embodiments 1 to 3 described above, the information on the intervals may be included in the second SCI, for example. When the information on the intervals is included in the second SCI, an increase in the number of bits in the first SCI can be suppressed, and thus, the communicable distance determined by the first SCI can be increased.

2. In Embodiments 4 to 7 related to the configuration of frequency resources, no mapping of PSSCH or the mapping of PSSCH to some of the reserved frequency resources is significantly effective when, for example, it is applied to the transmission for which a resource is not reserved (e.g., initial transmission). Thus, for example, the above-described embodiments may be applied at the initial transmission of TB, or when SCI that initially reserves a resource is transmitted.

3. In V2X, for example, another terminal may transmit a signal in a resource reserved for a terminal due to the Half duplex issue described above. Thus, in Embodiments 4 to 7 related to the configuration of frequency resources, no mapping of PSSCH or the mapping of PSSCH to some of the reserved frequency resources is effective to avoid collision with a resource transmitted from another terminal even after a resource reservation. Consequently, for example, the above-described embodiments may be applied to the retransmission or to the initial transmission of the next TB after the resource reservation, as well as to the initial transmission.

4. In one embodiment of the present disclosure, the maximum number of resources reserved at one time by a terminal may be limited to a certain number, e.g., two, four, eight. Moreover, for the maximum value, a fixed value may be defined by the specification (or standard), may be preconfigured in the application layer, or may be configured in a higher layer (e.g., MAC).

5. Terminals that transmit and receive on sidelink may include, for example, a terminal that performs transmission processing and no reception processing, a terminal that performs reception processing and no transmission processing, or a terminal that performs both transmission and reception.

6. In a case where a configuration for sidelink is configured in terminals 200 and 400 in advance, the configuration for the sidelink may be specified in a specification (or standard), may be configured in the application layer called Pre-configured, may be configured in the SIM mounted on terminals 200 and 400, may be configured in a higher layer such as SIB called configured or other RRC, or may be configured in MAC, for example.

7. Although consecutive slots have been described in each of Operation Examples, the slots need not be consecutive in time. For example, an interval may be configured using slots included in the resource pool in the sidelink.

8. An exemplary embodiment of the present disclosure is not limited to being applied to sidelink communication (i.e., direct communication between a plurality of terminals), and may be applied to Uu link communication (i.e., communication between base stations 100 and 300 and terminals 200 and 400, respectively). For example, in a case where there is a restriction on the number of symbols in Uu link communication, an exemplary embodiment of the present disclosure may be applied. In this case, for example, the sidelink channel mapping described in each of the above embodiments may be replaced by Uu link channel mapping. For example, the PSCCH may be replaced by a Physical Downlink Control Channel (PDCCH), the PSSCH may be replaced by a Physical Downlink Shared Channel (PDSCH) or Physical Uplink Shared Channel (PUSCH), the PSFCH may be replaced by a Physical Uplink Control Channel (PUCCH), and the PSBCH may be replaced by a Physical Broadcast Channel (PBCH).

9. In the above-described embodiments, for example, Mode 2 may be configured as the mode of the sidelink communication whereas Model may not be configured. In Mode 2, terminals 200 and 400 can receive an SCI transmitted by another terminal and thereby can avoid transmission using the same resource as that indicated in the SCI. For example, terminals 200 and 400 can share reservation information of resources with the other terminal by indicating the intervals to the other terminal.

10. Operation Examples in the above embodiments may be used in combination. For example, by combining at least one of Embodiments 1 to 3 related to a determination method of a time resource and at least one of Embodiments 4 to 7 related to a determination method of a frequency resource, a time resource and a frequency resource may be determined.

11. The time resource unit is not limited to slots, and may be, for example, a time resource unit such as a frame, subframe, slot, subslot, or symbol, or may be another time resource unit. The frequency resource unit is not limited to sub-channels, and may be, for example, a frequency resource unit such as a bandwidth part (BWP), a resource block (e.g., PRB), a resource block groups (RBG), a sub-carrier, or a resource element group (REG), or may be another frequency resource unit.

The present disclosure can be realized by software, hardware, or software in cooperation with hardware. Each functional block used in the description of each embodiment described above can be partly or entirely realized by an LSI such as an integrated circuit, and each process described in the each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI here may be referred to as an IC, a system LSI, a super LSI, or an ultra LSI depending on a difference in the degree of integration.

However, the technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing.

If future integrated circuit technology replaces LSIs as a result of the advancement of semiconductor technology or other derivative technology, the functional blocks could be integrated using the future integrated circuit technology. Biotechnology can also be applied.

The present disclosure can be realized by any kind of apparatus, device or system having a function of communication, which is referred to as a communication apparatus. The communication apparatus may comprise a transceiver and processing/control circuitry. The transceiver may comprise and/or function as a receiver and a transmitter. The transceiver, as the transmitter and receiver, may include an RF (radio frequency) module including amplifiers, RF modulators/demodulators and the like, and one or more antennas. Some non-limiting examples of such a communication apparatus include a phone (e.g., cellular (cell) phone, smart phone), a tablet, a personal computer (PC) (e.g., laptop, desktop, netbook), a camera (e.g., digital still/video camera), a digital player (digital audio/video player), a wearable device (e.g., wearable camera, smart watch, tracking device), a game console, a digital book reader, a telehealth/telemedicine (remote health and medicine) device, and a vehicle providing communication functionality (e.g., automotive, airplane, ship), and various combinations thereof.

The communication apparatus is not limited to be portable or movable, and may also include any kind of apparatus, device or system being non-portable or stationary, such as a smart home device (e.g., an appliance, lighting, smart meter, control panel), a vending machine, and any other "things" in a network of an "Internet of Things (IoT)."

The communication may include exchanging data through, for example, a cellular system, a wireless LAN system, a satellite system, etc., and various combinations thereof.

The communication apparatus may comprise a device such as a controller or a sensor which is coupled to a communication device performing a function of communication described in the present disclosure. For example, the communication apparatus may comprise a controller or a sensor that generates control signals or data signals which are used by a communication device performing a communication function of the communication apparatus.

The communication apparatus also may include an infrastructure facility, such as a base station, an access point, and any other apparatus, device or system that communicates with or controls apparatuses such as those in the above non-limiting examples.

A terminal according to an embodiment of the present disclosure includes: control circuitry, which, in operation, determines first information and second information, the first information including a second value obtained by dividing, by a first value, an interval for a time resource to be reserved, the second information indicating one candidate, when a plurality of candidates is present for at least one side of an association between the second value and the first information, and/or the first value, the one candidate being a candidate among the plurality of candidates; and transmission circuitry, which, in operation, transmits the first information and the second information.

In an embodiment of the present disclosure, the second information indicates any of the plurality of candidates for the first value.

In an embodiment of the present disclosure, the second information indicates any of the plurality of candidates for the association.

In an embodiment of the present disclosure, the second information is information indicating priority of data, and the priority is associated with a candidate for the at least one side.

In an embodiment of the present disclosure, the second information is information indicating a redundancy version, and the redundancy version is associated with a candidate for the at least one side.

In an embodiment of the present disclosure, the second information includes information indicating a redundancy version and includes information indicating a transmission type of either initial transmission or retransmission of data, and a combination of the redundancy version and the transmission type is associated with a candidate for the at least one side.

In an embodiment of the present disclosure, the second information is information indicating a retransmission process number, and the retransmission process number is associated with the at least one of the candidates.

In an embodiment of the present disclosure, the interval is a time interval between data adjacent with each other in a time domain among data to be communicated by the terminal.

In an embodiment of the present disclosure, the interval is a time interval between a retransmission timing of first data and an initial transmission timing of second data to be transmitted after the first data.

A terminal according to an embodiment of the present disclosure includes: reception circuitry, which, in operation, receives first information and second information, the first information including a second value obtained by dividing, by a first value, an interval for a time resource to be reserved, the second information indicating one candidate, when a plurality of candidates is present for at least one side of an association between the second value and the first information, and/or the first value, the one candidate being among the plurality of candidates; and control circuitry, which, in operation, determines the interval based on the first information and the second information.

A communication method according to an embodiment of the present disclosure includes: determining, by a terminal, first information and second information, the first information including a second value obtained by dividing, by a first value, an interval for a time resource to be reserved, the second information indicating one candidate, when a plurality of candidates is present for at least one side of an association between the second value and the first information, and/or the first value, the one candidate being among the plurality of candidates; and transmitting, by the terminal, the first information and the second information.

A communication method according to an embodiment of the present disclosure includes: receiving, by a terminal, first information and second information, the first information including a second value obtained by dividing, by a first value, an interval for a time resource to be reserved, the second information indicating one candidate, when a plurality of candidates is present for at least one side of an association between the second value and the first information, and/or the first value, the one candidate being a candidate among the plurality of candidates; and determining, by the terminal, the interval based on the first information and the second information.

The disclosure of Japanese Patent Application No. 2019-184039, filed on Oct. 4, 2019, including the specification, drawings and abstract, is incorporated herein by reference in its entirety.

INDUSTRIAL APPLICABILITY

An exemplary embodiment of the present disclosure is useful for mobile communication systems.

REFERENCE SIGNS LIST

100, 300 Base station
101, 208 Interval configurator
102, 209, 302, 409 Resource pool configurator
103, 303 Error correction encoder
104, 304 Modulator
105, 215, 305, 415 Signal assigner
106, 216, 306, 416 Transmitter
107, 201, 307, 401 Receiver
108, 202, 308, 402 Signal separator
109, 309 Demodulator
110, 310 Error correction decoder
200, 400 Terminal
203, 403 SCI receiver
204, 404 Uu demodulator
205, 405 Uu error correction decoder
206, 406 SL demodulator
207, 407 SL error correction decoder
210, 410 SCI generator
211, 411 Uu error correction encoder
212, 412 Uu modulator
213, 413 SL error correction encoder
214, 414 SL modulator
301, 408 Frequency resource-size configurator

The invention claimed is:

1. A communication apparatus, comprising:

circuitry, which, in operation, sets a plurality of resource reservation interval candidates indicated by higher layer signaling per resource pool; and a transmitter, which, in operation, transmits resource reservation information in Sidelink Control information (SCI), wherein the resource reservation information indicates (i) a resource reservation interval between resources respectively corresponding to a current Transport Block (TB) and a subsequent TB, and (ii) a time gap between an initial transmission of the current TB and a retransmission of the current TB, wherein the resource reservation interval is selected from among the plurality of resource reservation interval candidates, wherein the resource reservation information reserves first resources that are periodic with respect to a slot in which the current TB is transmitted and second resources that are not periodic with respect to the slot in which the current TB is transmitted, wherein the SCI includes first stage SCI and second stage SCI, wherein the resource reservation information is transmitted using the first stage SCI of the SCI, and wherein a number of information bits included in the SCI differs according to a number of the plurality of resource reservation interval candidates.

2. The communication apparatus, according to claim 1, wherein the SCI is contained in Physical Sidelink Control Channel (PSCCH), and the SCI is used for scheduling of Physical Sidelink Shared Channel (PSSCH).

3. The communication apparatus, according to claim 2, wherein the circuitry sets time resource assignment in the SCI, the time resource assignment indicates time resource of the PSSCH.

4. The communication apparatus, according to claim 1, wherein the plurality of resource reservation interval candidates is dynamically changed by higher layer signaling.

5. The communication apparatus, according to claim 1, wherein a time unit of the resource reservation interval is converted to a unit of slot.

6. The communication apparatus, according to claim 1, wherein the SCI contains a new data indicator that indicates further transmission or retransmission of data.

7. The communication apparatus, according claim 1, wherein a coding rate of the first stage SCI of the SCI is different from a coding rate of the second stage SCI of the SCI.

8. The communication apparatus, according claim 1, wherein a coding rate of the first stage SCI of the SCI is lower than a coding rate of the second stage SCI of the SCI.

9. The communication apparatus, according claim 1, wherein the SCI includes frequency information indicating N frequency resources reserved for N time resources, respectively, and wherein a maximum value of N for the N frequency resources reserved is determined from a set of multiple values that are each equal to or greater than 2, and is indicated by a higher layer signaling.

10. A communication method, comprising:

setting plurality of resource reservation interval candidates indicated by higher layer signaling per resource pool; and transmitting resource reservation information in Sidelink Control information (SCI), wherein the resource reservation information indicates (i) a resource reservation interval between resources respectively corresponding to a current Transport Block (TB) and a subsequent TB, and (ii) a time gap between an initial transmission of the current TB and a retransmission of the current TB, wherein the resource reservation interval is selected from among the plurality of resource reservation interval candidates, wherein the resource reservation information reserves first resources that are periodic with respect to a slot in which the current TB is transmitted and second resources that are not periodic with respect to the slot in which the current TB is transmitted wherein the SCI includes first stage SCI and second stage SCI, wherein the resource reservation information of is transmitted using the first stage SCI of the SCI, wherein a number of information bits included in the SCI is different according to a number of the plurality of resource reservation interval candidates.

11. The communication apparatus, according claim 1, wherein the circuitry determines N frequency resources reserved for N time resources, the N frequency resources being different from each other, the transmitter transmits frequency information on the N frequency resources in a same SCI, and a value of N is determined from a set of multiple values, and is indicated by a higher layer signaling.

12. The communication method, according claim 10, wherein a coding rate of the first stage SCI of the SCI is different from a coding rate of the second stage SCI of the SCI.

13. The communication method, according claim 10, wherein a coding rate of the first stage SCI of the SCI is lower than a coding rate of the second stage SCI of the SCI.

14. The communication method, according claim 10, wherein the SCI includes frequency information indicating N frequency resources reserved for N time resources, respectively, and wherein a maximum value of N for the N frequency resources reserved is determined from a set of multiple values that are each equal to or greater than 2, and is indicated by a higher layer signaling.

* * * * *